US009251032B2

(12) United States Patent
Kanemasa et al.

(10) Patent No.: US 9,251,032 B2
(45) Date of Patent: Feb. 2, 2016

(54) METHOD, COMPUTER PROGRAM, AND INFORMATION PROCESSING APPARATUS FOR ANALYZING PERFORMANCE OF COMPUTER SYSTEM

(75) Inventors: Yasuhiko Kanemasa, Kawasaki (JP); Motoyuki Kawaba, Kawasaki (JP); Calton Pu, Atlanta, GA (US); Qingyang Wang, Atlanta, GA (US)

(73) Assignees: FUJITSU LIMITED, Kawasaki (JP); THE GEORGIA TECH RESEARCH CORPORATION, Atlanta, GA (US)

( * ) Notice: Subject to any disclaimer, the term of this patent is extended or adjusted under 35 U.S.C. 154(b) by 853 days.

(21) Appl. No.: 13/373,047

(22) Filed: Nov. 3, 2011

(65) Prior Publication Data

US 2013/0116976 A1    May 9, 2013

(51) Int. Cl.
*G06F 11/30* (2006.01)
*G06F 11/34* (2006.01)
*G06F 11/32* (2006.01)

(52) U.S. Cl.
CPC ........ G06F 11/3419 (2013.01); G06F 11/3452 (2013.01); *G06F 11/323* (2013.01); *G06F 11/3442* (2013.01); *G06F 11/3495* (2013.01); *G06F 2201/875* (2013.01)

(58) Field of Classification Search
CPC ............................ G06F 11/3452; G06F 11/3419
USPC ....................................................... 702/186
See application file for complete search history.

(56) References Cited

U.S. PATENT DOCUMENTS

| 6,633,640 | B1 | 10/2003 | Cohen et al. | |
| 7,318,178 | B2 * | 1/2008 | Steinberg et al. | 714/47.2 |
| 8,140,300 | B2 * | 3/2012 | Dunne et al. | 702/186 |
| 2002/0082807 | A1 | 6/2002 | Turicchi, Jr. et al. | |
| 2011/0246585 | A1 * | 10/2011 | Scarpelli et al. | 709/206 |

FOREIGN PATENT DOCUMENTS

| JP | 2001-268238 | 9/2001 |
| JP | 2002-215581 | 8/2002 |
| JP | 2004-302547 | 10/2004 |
| JP | 2006-11683 | 1/2006 |

OTHER PUBLICATIONS

Patent Abstracts of Japan, Publication No. 2006-011683, Published Jan. 12, 2006.

(Continued)

*Primary Examiner* — Sujoy Kundu
*Assistant Examiner* — Ricky Ngon
(74) *Attorney, Agent, or Firm* — Staas & Halsey LLP

(57) ABSTRACT

In an information processing apparatus, a calculation unit retrieves data that indicates processing periods of processes executed in each time window constituting an analysis period. The calculation unit then calculates a total processing time for each time window by adding up processing times spent for execution of processes. The calculation unit also calculates a total progress quantity for each time window by adding up progress quantities of the processes. A determination unit determines, based on the total processing time and total progress quantity of each time window, a threshold of the total processing times at which the ratio of an increase of the total progress quantity to an increase of the total processing time is equal to or smaller than a predetermined value. A detection unit detects time windows whose total processing times are equal to or longer than the threshold.

10 Claims, 48 Drawing Sheets

(56) References Cited

OTHER PUBLICATIONS

Patent Abstracts of Japan, Publication No. 2002-215581, Published Aug. 2, 2002.

Patent Abstracts of Japan, Publication No. 2001-268238, Published Sep. 28, 2001.

Patent Abstracts of Japan, Publication No. 2004-302547, Publication Oct. 28, 2004.

\* cited by examiner

FIG. 3
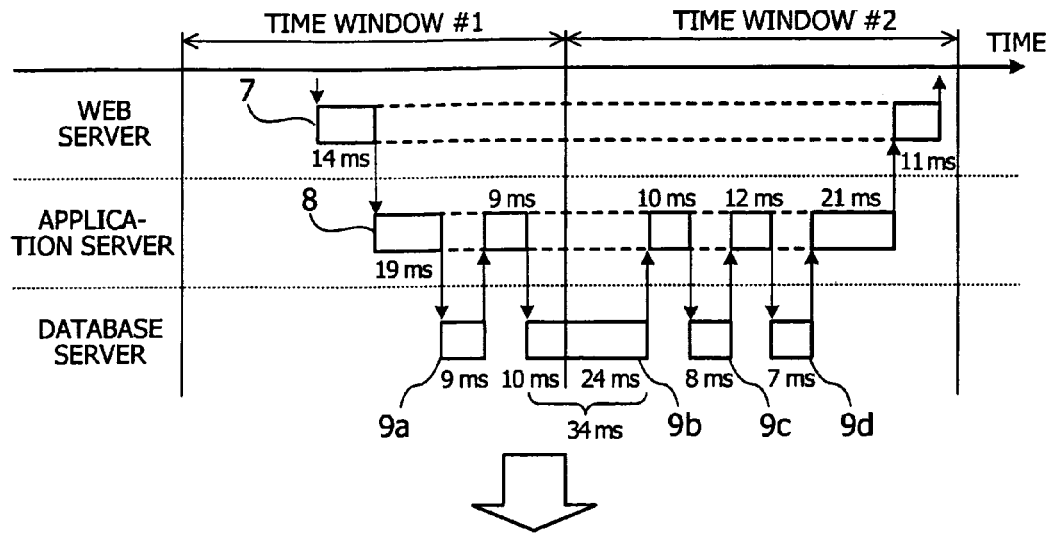
| TIME WINDOW | TIER: WEB SERVER | | TIER: APPLICATION SERVER | | TIER: DATABASE SERVER | |
|---|---|---|---|---|---|---|
| | TOTAL PROGRESS QUANTITY | TOTAL PROCESSING TIME | TOTAL PROGRESS QUANTITY | TOTAL PROCESSING TIME | TOTAL PROGRESS QUANTITY | TOTAL PROCESSING TIME |
| TIME WINDOW#1 | 0.56 | 14 | 0.394 | 28 | 1.29 | 19 |
| TIME WINDOW#2 | 0.44 | 11 | 0.606 | 43 | 2.71 | 39 |
| ... | ... | ... | ... | ... | ... | ... |
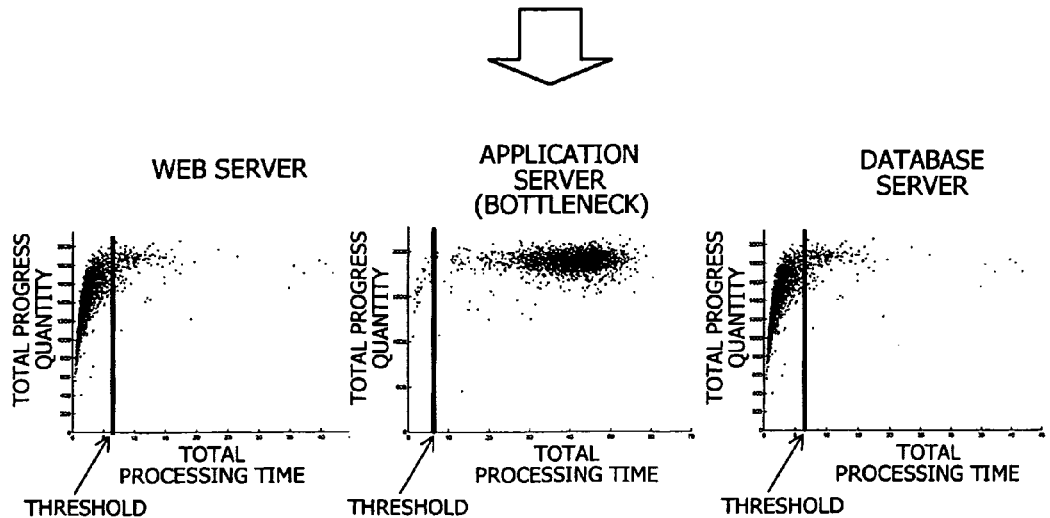

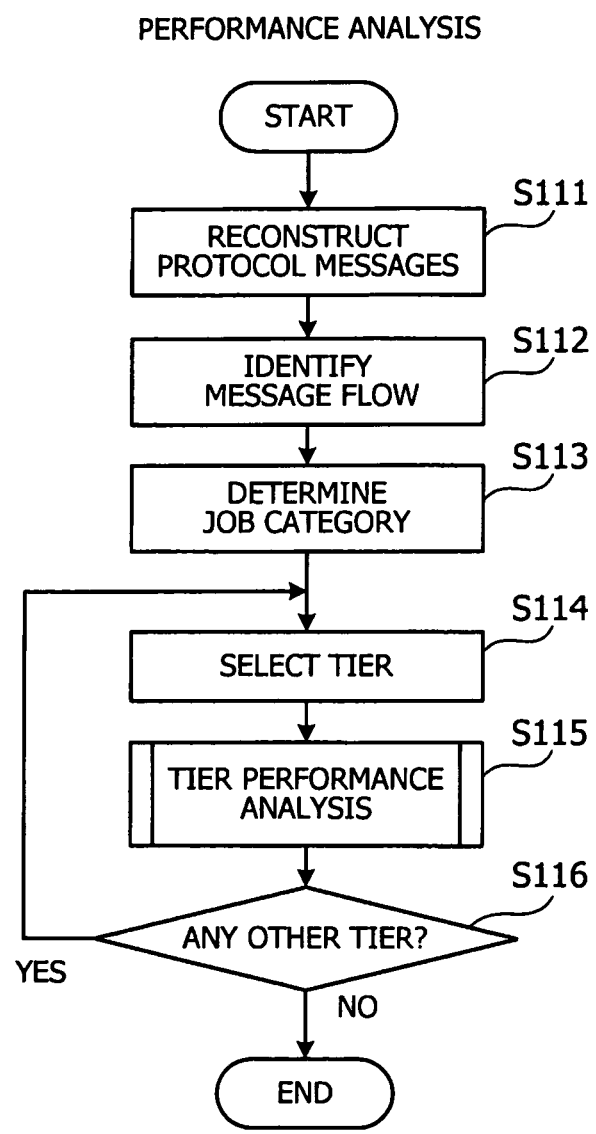

FIG. 10

122 MESSAGE DATA STORAGE UNIT

| | 122a | 122b | 122c | 122d | 122e | 122f | 122g |
|---|---|---|---|---|---|---|---|
| 1 | 2009/09/07 | 12:12:04.787360 | (132290-1) | 194.185.39.24:51272 -> 194.23.5.226:10443 | Request HTTP, POST /cgi-bin/AXXPF39437 type=0016& zid=AXXG13130& sid=LjgkVcFasr8A& uid=1192 | | |
| 2 | 2009/09/07 | 12:12:04.871576 | (132291) | 194.23.6.227:39931 -> 194.23.7.168:8002 TCP Connect | | | |
| 3 | 2009/09/07 | 12:12:04.872326 | (132289) | 194.23.6.230:39372 <-194.23.7.168:8002 TCP Close request_size=488 reply_size=528 | | | |
| 4 | 2009/09/07 | 12:12:04.872575 | (132291-28991) | 194.23.6.227:39931 -> 194.23.7.168:8002 Request IIOP,AXXG13130/INF/H01 | | | |
| 5 | 2009/09/07 | 12:12:04.882010 | (131268-307) | 194.23.8.169:52245 -> 194.23.8.198:1521 Request Oracle,select1 into :b0 from DUAL | | | |
| 6 | 2009/09/07 | 12:12:04.882560 | (131268-307) | 194.23.8.169:52245 <-194.23.8.198:1521 Response Oracle,16 | | | |
| 7 | 2009/09/07 | 12:12:04.883208 | (131268-308) | 194.23.8.169:52245 -> 194.23.8.198:1521 Request Oracle,DATA | | | |
| 8 | 2009/09/07 | 12:12:04.883657 | (131268-308) | 194.23.8.169:52245 <-194.23.8.198:1521 Response Oracle,6 | | | |
| 9 | 2009/09/07 | 12:12:04.887500 | (131268-309) | 194.23.8.169:52245 -> 194.23.8.198:1521 Request Oracle, select name into :b0 from customerwhere (branch_id=TO_NUMBER(:b1) and account_number=TO_NUMBER(:b2)) | | | |
| 10 | 2009/09/07 | 12:12:04.887900 | (131268-309) | 194.23.8.169:52245 <-194.23.8.198:1521 Response Oracle,16 | | | |
| 11 | 2009/09/07 | 12:12:04.888899 | (131268-310) | 194.23.8.169:52245 -> 194.23.8.198:1521 Request Oracle, select TO_CHAR(last_update, 'YYYY/MM/DD HH24:MI:SS' ) into :b0 from access_log where (branch_id=TO_NUMBER(:b1) and account_number=TO_NUMBER(:b2)) | | | |
| 12 | 2009/09/07 | 12:12:04.889199 | (131268-310) | 194.23.8.169:52245 <-194.23.8.198:1521 Response Oracle,16 | | | |
| 13 | 2009/09/07 | 12:12:04.891445 | (131268-311) | 194.23.8.169:52245 -> 194.23.8.198:1521 Request Oracle, select b.name,NVL(b.email,' ') ,NVL(TO_CHAR(b.last_logon_time, 'YYYY/MM/DD HH24:MI:SS' ), ' ') , TO_CHAR(a.balance,'FM999999999999999') ,TO_CHAR(a.account_type) into :b0,:b1,:b2,:b3,:b4 from account a ,customer b where ((((b.branch_id=a.branch_idand b.account_number=a.account_number) and b.branch_id=TO_NUMBER(:b5)) and b.account_number=TO_NUMBER(:b6)) | | | |
| 14 | 2009/09/07 | 12:12:04.891844 | (131268-311) | 194.23.8.169:52245 <-194.23.8.198:1521 Response Oracle,16 | | | |
| 15 | 2009/09/07 | 12:12:05.002368 | (131268-312) | 194.23.8.169:52245 -> 194.23.8.198:1521 Request Oracle, update access_logset last_update=TO_DATE(:b0, 'YYYY/MM/DD HH24:MI:SS' ) where (branch_id=TO_NUMBER(:b1) and account_number=TO_NUMBER(:b2)) | | | |
| 16 | 2009/09/07 | 12:12:05.003016 | (131268-312) | 194.23.8.169:52245 <-194.23.8.198:1521 Response Oracle,8 | | | |
| 17 | 2009/09/07 | 12:12:05.007109 | (131268-313) | 194.23.8.169:52245 -> 194.23.8.198:1521 Request Oracle,DATA | | | |
| 18 | 2009/09/07 | 12:12:05.008458 | (131268-313) | 194.23.8.169:52245 <-194.23.8.198:1521 Response Oracle,8 | | | |
| 19 | 2009/09/07 | 12:12:05.010455 | (132291-28991) | 194.23.6.227:39931 <-194.23.7.168:8002 Response IIOP,0 | | | |
| 20 | 2009/09/07 | 12:12:05.023634 | (132290-1) | 194.185.39.24:51272 <-194.23.5.226:10443 Response HTTP,200 | | | |

FIG. 12

EXEMPLARY JOB CATEGORIES OF HTTP PROTOCOL

| JOB CATEGORY | COMMAND | JOB DETAILS (LOCAL ADDRESS IN URL + CGI PARAMETERS TO RETAIN) |
|---|---|---|
| W1 | GET | /RUBBOS/SERVLET/EDU.RICE.RUBBOS.SERVLETS.STORIESOFTHEDAY |
| W2 | GET | /RUBBOS/SERVLET/EDU.RICE.RUBBOS.SERVLETS.VIEWSTORY |
| W3 | GET | /RUBBOS/SERVLET/EDU.RICE.RUBBOS.SERVLETS.SEARCH |
| W4 | GET | /RUBBOS/BROWSE.HTML |
| W5 | GET | /RUBBOS/SERVLET/EDU.RICE.RUBBOS.SERVLETS.SEARCH?TYPE=0 |
| W6 | GET | /RUBBOS/SERVLET/EDU.RICE.RUBBOS.SERVLETS.SEARCH?TYPE=1 |
| W7 | GET | /RUBBOS/SERVLET/EDU.RICE.RUBBOS.SERVLETS.VIEWCOMMENT?COMMENT_TABLE=COMMENTS |
| W8 | GET | /RUBBOS/SERVLET/EDU.RICE.RUBBOS.SERVLETS.OLDERSTORIES |
| W9 | GET | /RUBBOS/SERVLET/EDU.RICE.RUBBOS.SERVLETS.BROWSECATEGORIES |
| W10 | GET | /RUBBOS/SERVLET/EDU.RICE.RUBBOS.SERVLETS.BROWSESTORIESBYCATEGORY |
| W11 | GET | /RUBBOS/SERVLET/EDU.RICE.RUBBOS.SERVLETS.SEARCH?TYPE=2 |
| W12 | GET | /RUBBOS/SERVLET/EDU.RICE.RUBBOS.SERVLETS.VIEWCOMMENT?COMMENT_TABLE=OLD_COMMENTS |

FIG. 13

EXEMPLARY JOB CATEGORIES OF DATABASE PROTOCOL

| JOB CATEGORY | COMMAND | JOB DETAILS | (SQL STATEMENT ABSTRACTED BY USING CONVERSION RULES) |
|---|---|---|---|
| D1 | EXECREADREQ | SELECT .. FROM STORIES, USERS WHERE .. | |
| D2 | EXECREADREQ | SELECT .. FROM COMMENTS WHERE .. ORDER BY .. | |
| D3 | EXECREADREQ | SELECT .. FROM COMMENTS, USERS WHERE .. | |
| D4 | EXECREADREQ | SELECT .. FROM COMMENTS WHERE .. | |
| D5 | EXECREADREQ | SELECT .. FROM CATEGORIES | |
| D6 | EXECREADREQ | SELECT .. FROM STORIES WHERE .. ORDER BY .. | |
| D7 | EXECREADREQ | SELECT .. FROM OLD_COMMENTS WHERE .. | |
| D8 | EXECREADREQ | SELECT .. FROM OLD_COMMENTS WHERE .. ORDER BY .. | |
| D9 | EXECREADREQ | SELECT .. FROM OLD_COMMENTS, USERS WHERE .. | |
| D10 | EXECREADREQ | SELECT .. FROM OLD_STORIES, USERS WHERE .. | |

FIG. 23

143 NORMALIZED THROUGHPUT VALUE STORAGE UNIT

143a NORMALIZED THROUGHPUT VALUE TABLE

| JOB CATEGORY | AVERAGE PROCESSING TIME IN LIGHT LOAD CONDITIONS (ms) | NORMALIZED THROUGHPUT VALUE (PER JOB) |
|---|---|---|
| W1 | 22.2 | 1.00 |
| W2 | 13.4 | 0.604 |
| A1 | 50.4 | 1.00 |
| A2 | 23.6 | 0.468 |
| D1 | 5.4 | 1.00 |
| D2 | 20.1 | 3.72 |
| D3 | 4.3 | 0.796 |
| D4 | 17.2 | 3.19 |

WITHOUT EXCLUSION OF INDIRECT WAITING TIME

Load
(Number of Requests in Application Tier)

LOAD VERSUS THROUGHPUT IN APPLICATION SERVER
(Calculated on the basis of Normalized Per-Job Throughput Values)

LOAD VERSUS THROUGHPUT IN APPLICATION SERVER
(Calculated on the basis of Normalized Per-Message Throughput Values)

METHOD, COMPUTER PROGRAM, AND INFORMATION PROCESSING APPARATUS FOR ANALYZING PERFORMANCE OF COMPUTER SYSTEM

FIELD

The embodiments discussed herein relate to a method, computer program stored in a computer-readable medium, and information processing apparatus for analyzing performance of a computer system.

BACKGROUND

Some of the computer systems used today include a plurality of computers hierarchically organized to share the processing workload. Computer systems of this type are called "multi-tier systems." The computers constituting a multi-tier system are referred to herein as "servers." A known example of such multi-tier systems is a three-tier system which is formed from web servers to provide user interfaces, application servers to execute transactions, and database servers to manage datasets. Those servers work together to execute processing requests received from users and return the results back to the users. In this way, multi-tier systems allot a given work to a plurality of servers, so that the system workload can be distributed among them. Multi-tier systems also permit their reliability and responsiveness to be improved by deploying an adequate number of computers in each tier as necessary.

In a multi-tier system such as the web three-tier system mentioned above as a representative example, the end user may experience a slow system response due to some problem in a server. In such situations, it would be an important first step of troubleshooting to determine in which tier the problem lies. One of the methods commonly used for this purpose is to measure the processing times of servers on each tier and track their changes over time to detect problems.

For example, Japanese Laid-open Patent Publication No. 2006-11683 proposes a technique that creates transaction models, collects communication messages via a switch, and detects a series of messages whose progress matches with one of the transaction models. This technique makes it possible to identify a set of messages constituting a specific transaction and analyze the identified transaction. For example, the proposed technique enables tracking of processing operations that each application executes in response to a user request and continues until a response is returned.

The conventional method discussed above can be used to grasp the information on processing times spent by a server under analysis, but does not help in determining whether the server still has some headroom left in its processing capacity.

SUMMARY

According to an aspect of the invention, there is provided a computer-readable, non-transitory medium storing a program. The program causes a computer to execute a procedure including: retrieving data from a storage unit which indicates processing periods of processes executed by a target apparatus during a plurality of time windows constituting an analysis period; calculating, based on the retrieved data, a total processing time for each time window by adding up processing times spent for execution of the processes in said each time window; calculating, based on the retrieved data, a total progress quantity for each time window by adding up progress quantities of the processes executed in said each time window; determining, based on the total processing time and total progress quantity of each time window, a threshold of the total processing times at which a ratio of an increase of the total progress quantity to an increase of the total processing time is equal to or smaller than a predetermined value; and detecting time windows whose total processing times are equal to or longer than the threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates evaluation of spare capacity of servers according to the first embodiment;

FIG. 9 is a flowchart illustrating an example procedure of performance analysis;

FIG. 10 illustrates an example data structure of a message data storage unit;

FIG. 12 illustrates an example of job categories of HTTP protocol;

FIG. 13 illustrates an example of job categories of database protocol;

FIG. 23 illustrates an example data structure of a normalized throughput value storage unit;

DESCRIPTION OF EMBODIMENTS

Figure 1:
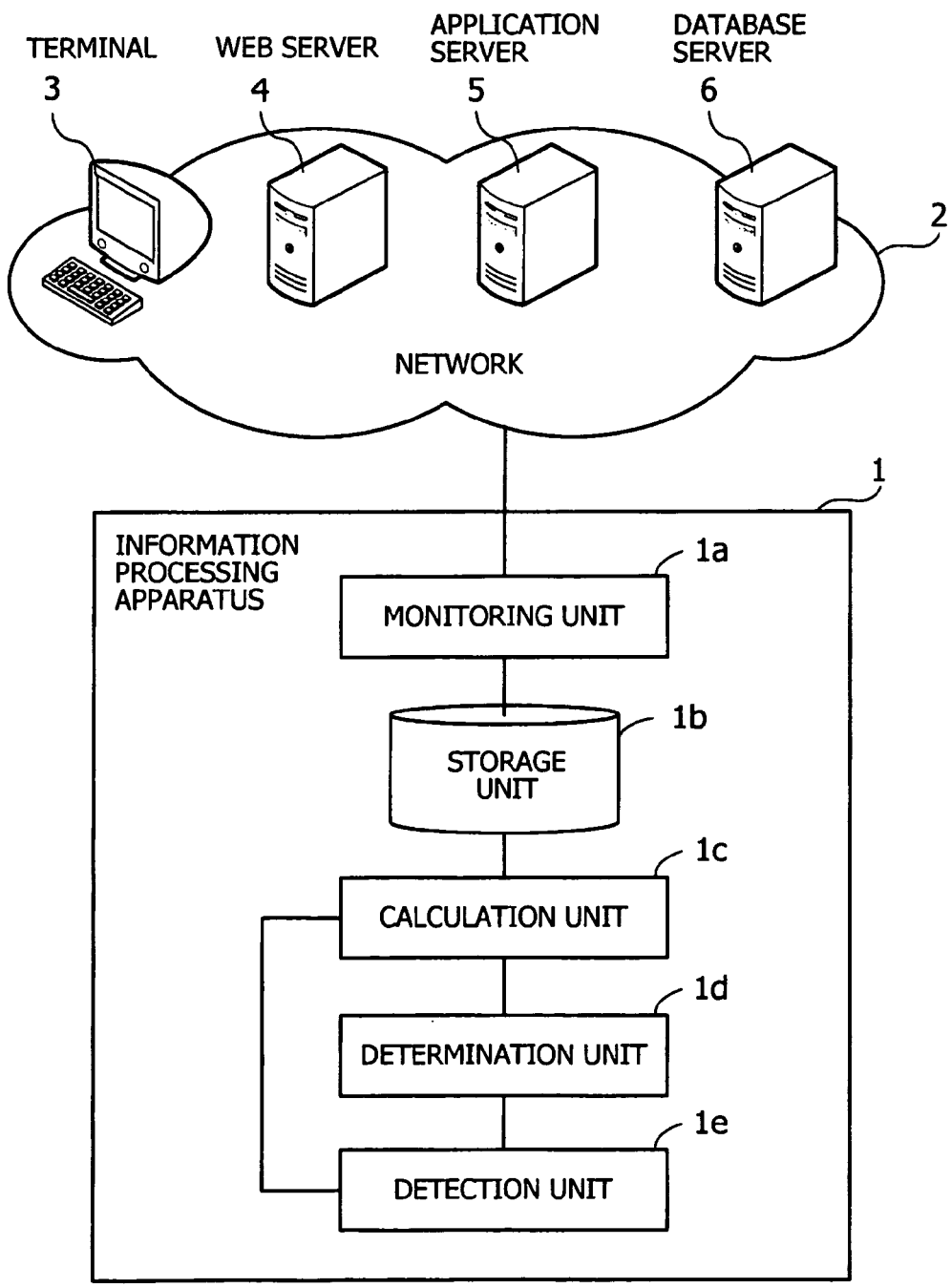
FIG. 1 illustrates an example of a system configuration according to a first embodiment.

Embodiments of the present invention will be described below with reference to the accompanying drawings, wherein like reference numerals refer to like elements throughout. Two or more of those embodiments may be combined together unless there is a contradiction in their features.

(a) First Embodiment

According to a first embodiment, the performance analysis investigates relationships between average total processing time and total progress quantity of processes executed in each unit time period, and determines that the processing performance has reached its limit when it is found that the total progress quantity does not increase in spite of an increase of total processing time.

FIG. 1 illustrates an example of a system configuration according to the first embodiment. The illustrated information processing apparatus 1 is designed to analyze each server constituting a web three-tier system, for example. More particularly, the information processing apparatus 1 executes a performance analysis of those servers via a network 2. Web three-tier system is a computer system that performs processing operations with a plurality of servers upon request from a terminal 3. For example, the illustrated web three-tier system is formed from a web server 4, an application server 5, and a database (DB) server 6.

The information processing apparatus 1 includes, for example, a monitoring unit 1a, a storage unit 1b, a calculation unit 1c, a determination unit 1d, and a detection unit 1e. The monitoring unit 1a monitors activities of the web server 4, application server 5, and database server 6 during a given analysis period to collect data that indicates execution times of each server. The monitoring unit 1a stores collected data in the storage unit 1b.

The storage unit 1b provides a storage space for data indicating the execution time of each process executed by the servers under analysis during the given analysis period. The calculation unit 1c retrieves this data out of the storage unit 1b and, based on that data, calculates a total progress quantity by adding up progress quantities of individual processes executed in a time window. Here the analysis period is divided into a plurality of time windows for the purpose of analysis. The calculation unit 1c performs the above calculation for each such time window. The calculation unit 1c also calculates, based on the retrieved data, a total processing time in each time window by adding up the times spent to execute the processes.

The determination unit 1d determines a threshold of total processing time on the basis of the calculated total processing time and total progress quantity of each time window. Specifically, this threshold is set at a point where the ratio of an increase of total progress quantity to an increase of total processing time is equal to or smaller than a specified value. The detection unit 1e then detects time windows whose total processing times are equal to or longer than the determined threshold.

Figure 2:
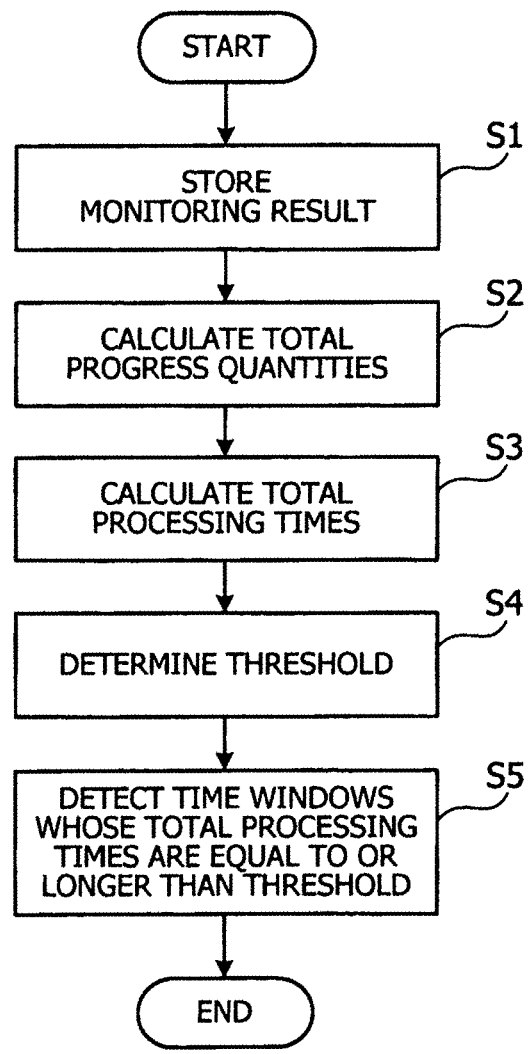
FIG. 2 is a flowchart illustrating an example procedure of an analysis according to the first embodiment.

With the structure described above, the illustrated system performs the following processing. FIG. 2 is a flowchart illustrating an example procedure of an analysis according to the first embodiment. Each step of FIG. 2 will now be described below in the order of step numbers.

(Step S1) The monitoring unit 1a monitors activities of the web server 4, application server 5, and database server 6 during a given analysis period. For example, the web server 4, application server 5, and database server 6 transmit and receive messages over the network 2. The monitoring unit 1a captures those messages from the network 2. Based on the captured messages, the monitoring unit 1a obtains information from those servers 4, 5, and 6 about how they have performed their respective processing operations. The monitoring unit 1a then stores those monitoring results in the monitoring results storage unit 1b.

(Step S2) Based on the data stored in the storage unit 1b, the calculation unit 1c calculates total progress quantities of each server under analysis. Specifically, the calculation unit 1c divides the analysis period into a plurality of time windows. Then, for each time window, the calculation unit 1c calculates progress quantities of individual processes executed by each server during that time window. The calculation unit 1c adds up the calculated progress quantities for each time window, and for each server, thereby obtaining total progress quantities.

(Step S3) Based on the data stored in the storage unit 1b, the calculation unit 1c calculates total processing times of each server under analysis. Specifically, the calculation unit 1c divides the analysis period into a plurality of time windows. Then, for each time window, the calculation unit 1c calculates the times that the servers spent to execute their respective processes during that time window. The calculation unit 1c adds up the calculated times for each time window, and for each server, thereby obtaining total processing times. It is noted here that each server may execute a plurality of processes in parallel, and for this reason, the calculated total processing times may exceed the length of a time window.

(Step S4) The determination unit 1d determines a threshold of total processing times, based on the total processing time and total progress quantity in each time window. Specifically, the determination unit 1d seeks a point where the ratio of an increase of total progress quantity to an increase of total processing time is equal to or smaller than a specified value. If such a point is found, then the determination unit 1d sets a threshold of total processing time at that point.

(Step S5) The detection unit 1e detects time windows whose total processing times are equal to or longer than the threshold.

The time windows detected in this way are interpreted as time periods where the progress of processing is slowed down. In other words, the server in question falls short of performance margins in those time periods. If a large number of time windows exceeding the threshold of total processing time are detected in a particular server, it means that the server's processing capacity is running out. Conversely, if almost no such threshold-exceeding time windows are detected in a server, it means that the server still has a sufficient amount of spare capacity in terms of the processing performance.

FIG. 3 illustrates evaluation of spare capacity of servers according to the first embodiment. Each server executes a process in response to a processing request therefor and returns a response when the requested process is completed. In the example of FIG. 3, the entire progress of a process from its request to response is expressed as a unit quantity of 1. In the case where a single process is executed across a plurality of time windows, this unit quantity, 1, is distributed among those time windows in proportion to their respective shares of the processing time of the process.

Specifically, the web server 4 receives a single processing request and executes a process 7 in two separate periods, i.e., one in time window #1 and the other in time window #2. This process consumes a first execution time of 14 ms in time window #1 and then a second execution time of 11 ms in time window #2. As noted above, a unit quantity of 1 is distributed to those two time windows in proportion to their execution times. Accordingly, the progress quantity in time window #1 is calculated to be 0.56, while that in time window #2 is calculated to be 0.44. These values will also be total progress quantities of the web server 4 in the example of FIG. 3 since only one process 7 is executed during time windows #1 and #2, invoked by a single processing request. That is, the total progress quantity amounts to 0.56 in time window #1 and 0.44 in time window #2.

The application server 5 receives a signal processing request and executes a process 8 in five separate periods during two consecutive time windows #1 and #2. More specifically, this process consumes execution times of 19 ms and 9 ms in time window #1, which add up to 28 ms. The process then consumes execution times of 10 ms, 12 ms, and 21 ms in time window #2, which add up to 43 ms. The proportional distribution of a unit quantity of progress in this case results in a progress quantity of 0.394 in time window #1 and 0.606 in time window #2. These values will also be total progress quantities of the application server 5 in the example of FIG. 3 since only one process 8 is executed during time windows #1 and #2, invoked by a single processing request. That is, the total progress quantity amounts to 0.394 in time window #1 and 0.606 in time window #2.

The database server 6, on the other hand, receives four processing requests and initiates one process for each of those requests during time windows #1 and #2, thus executing four processes 9a, 9b, 9c, and 9d in total. Here the process 9b corresponding the second processing request is executed across the two time windows #1 and #2. In this case, progress quantities are calculated through a proportional distribution of a unit quantity of 1, depending on the duration of actual processing times. As seen, the process 9b is executed for 10 ms in time window #1 and for 24 ms in time window #2, which add up to 34 ms. The proportional distribution thus allots a progress quantity of 0.29 to time window #1, and 0.71 to time window #2. In the example of FIG. 3, the first process 9a is completed in time window #1 and thus scores a unit quantity of 1. This is added together with the above-noted progress quantity 0.29 of the second process 9b, which makes a total progress quantity of 1.29 in time window #1. In time window #2, two processes 9c and 9d are completed and thus score a progress quantity of 1 for each. These two progress quantities are then added together with 0.71 of the process 9b, thus resulting in a total progress quantity of 2.71 in time window #2.

The total processing time is then calculated as a sum of execution times spent by a server during a single time window. In the present example, the web server 4 spent a total processing time of 14 ms in time window #1 and a total processing time of 11 ms in time window #2. The application server 5, on the other hand, spent a total processing time of 28 ms in time window #1 and a total processing time of 43 ms in time window #2. The database server 6 spent a total processing time of 19 ms in time window #1 and a total processing time of 39 ms in time window #2.

Now that the data is compiled in the above way, a threshold of total processing time is then calculated for each server. The threshold is where the ratio of an increase of total progress quantity to an increase of total processing time is equal to or smaller than a predetermined value. For example, this "predetermined value" is obtained by calculating the increase ratio of total progress quantity to total processing time in a time range where the observed total processing times are small and multiplying the increase ratio by a predetermined coefficient smaller than 1.

The above threshold is then used to detect time windows having longer total processing times. This detection is performed for each of the plurality of servers and by using their respective thresholds. Referring to the example of FIG. 3, the graphs (left and right) of the web server 4 and database server 6 indicate that only a small number of time windows are plotted in the region above the threshold line. Actually, such time windows are far less than half of the whole. By contrast, the graph (center) of the application server 5 indicates that almost all the time windows are plotted above the threshold of total processing time. This means that the application server 5 has little spare capacity and has become a bottleneck in the web three-tier system.

The term "bottleneck" in this context of the multi-tier system refers to a factor that hampers the system from increasing its overall processing performance. The multi-tier system includes a plurality of computers to share the processing workload in a hierarchical way. Isolating a bottleneck in such a system is to figure out which tier of the system has a problem when the system does not appear to perform as well as expected.

As can be seen from the above description, the first embodiment enables determination of which servers have a sufficient spare capacity and which servers do not. This feature of the first embodiment makes it easier to isolate a specific server causing a bottleneck in the multi-tier system.

While there are several conventional techniques, it has generally been difficult to isolate a server bottleneck in multi-tier systems. The following section of the description will discuss why the conventional methods are unsuccessful in detecting a computer that limits the processing performance of a multi-tier system.

Conventional methods applicable to bottleneck isolation for a multi-tier system in a working state may largely be divided into five categories. See the listing and brief description below:

First method: Monitoring the current usage of system resources

Second method: Monitoring the detailed internal activities of applications

Third method: Monitoring the external behavior (e.g., response times and the length of stay in each tier) of applications running on a computer Fourth method: Monitoring, from some place on the network, the external behavior (e.g., response times and the length of stay in each tier) of applications Fifth method: Conducting first a workload test of the system before it goes into service, and then isolating bottlenecks of the system in operation, based on the acquired knowledge about the relationship between workload and throughput Each of the above five methods will now be described in detail below.

(a1) First Method

For example, a special process (often called an "agent") is placed on each computer in the multi-tier system under analysis, and this agent process collects various measurements from the computer. The techniques of this type are referred to herein as the first method. The measurements include, for example, parameters representing how system resources are used in each machine, such as CPU usage and memory usage in the entire machine. Other examples of measurements are CPU usages of individual processes and the number of open files.

According to the first method, the data collected in each computer under analysis is stored in that computer's local storage device for the time being. Afterwards, another computer retrieves the stored data for the purpose of analysis, or alternatively, the computers under analysis send their data directly to another computer that executes analysis. In this way, the data is gathered for analysis, from every computer in a multi-tier system to a particular computer outside the multi-tier system. That particular computer then detects a bottleneck if any by analyzing the data of all computers in the system to discover relationships among data elements.

(a2) Second Method

Internal information of application software is collected for the purpose of analysis by using some functions integrated in the applications themselves or by modifying the applications. This approach is referred to herein as the second method. Specifically, the second method collects information about, for example, the processing time of database queries (in the case of database software), the number of concurrent user connections, start time and end time of each internal method, and the like. Those pieces of information may be obtained by sending a query from a dedicated process (e.g., agent) to the application of interest, or may be provided by the application itself in the form of log files and the like.

Similarly to the foregoing first method, the second method temporarily stores collected data in a local storage device of each computer, so that another computer can retrieve the data for the purpose of analysis. Then the latter computer analyzes the data to detect bottlenecks.

(a3) Third Method

The third method monitors external behavior of computers in a multi-tier system, generally by measuring their response times. Response times may be measured at every tier of the multi-tier system.

Specifically, the third method records transmission and reception of messages between an application and other computers. This recording is accomplished by using some functions integrated in that application or by modifying the application. Then the application investigates those records to extract the reception timestamp of each processing request and the transmission timestamp of each response and calculates response times from the extracted timestamps.

Similarly to the foregoing first method, the third method also stores collected data in a local storage device of each computer, so that another computer can retrieve the data for the purpose of analysis. Then the latter computer analyzes the data to detect bottlenecks.

(a4) Fourth Method

The fourth method also monitors external behavior of computers in a multi-tier system, typically by measuring their response times at each tier, as in the foregoing third method. The fourth method is different from the third method in its way of measuring response times. Specifically, the fourth method does not modify any computers constituting the multi-tier system, but uses another computer outside the multi-tier system to capture communication packets flowing over the network. The latter computer examines the captured communication packets to analyze what messages are exchanged among the constituent computers of the system. The response times of those computer can then be calculated from time records of those messages. Unlike the other methods discussed above, the fourth method changes nothing in the computers under analysis. This is advantageous since the monitoring operation never affects the behavior of those computers.

More details of the fourth method are described below. Communication packets on a computer network can be captured by using a port mirroring function in network switches. This port mirroring function makes a copy of Internet Protocol (IP) packets flowing through some particular ports of the network switch and forwards the copy to a specified output port, so that the computer connected to that output port can capture and record those IP packets.

At this stage, the captured data is in the form of IP packets, i.e., the segments of messages exchanged between server programs on different computers. To extract necessary information out of such data, the receiving computer has to recombine IP packets into an original message and then parse the message according to its protocol type. Further analysis of the message content enables the computer to find out a pair of messages (message pair), one for a processing request and the other for a response to that request. The detected message pair contains two timestamps, the time difference of which indicates the response time.

Each message further provides information about the details of processing requests. In the case of, for example, a HyperText Transfer Protocol (HTTP) request, the message contains a Uniform Resource Locator (URL) of the requesting host. In the case of a database request, the message contains a Structured Query Language (SQL) statement. On the basis of such message contents and response time information, the computer can determine how much time the server takes to respond in what kind of transaction. The computer can find a sign of bottleneck in a tier by tracking the temporal changes of its average response time. For example, when slower response is observed in a particular tier alone, the tier in question is likely to have some problem in its processing. As another approach, the computer may evaluate the data of response times by category of transactions. When a particular type of transactions solely indicates a drop of responsivity, it may suggest the presence of a bottleneck in some part relating to that transaction.

(a5) Fifth Method

The fifth method is based on a workload test that is previously conducted to collect data for analysis. The workload test uses, for example, a computer outside the multi-tier system as a workload generator to emulate actual workload conditions for the system. For example, the workload generator sends requests to the multi-tier system in a variety of patterns while changing the number of concurrent access users. The test results are observed by yet another computer, which measures the throughput of the multi-tier system for each different number of concurrent access users. The observing computer analyzes relationships between the number of concurrent access users and the throughput measurements, thereby determining the number of concurrent access users at which the throughput reaches its upper limit. This critical number of concurrent access users is recorded for later use. After such preparatory processing is finished, the fifth method monitors the multi-tier system in operation, keeping track of the number of concurrent access users. If the observed number of concurrent access users reaches the previously obtained critical number of concurrent access users, it means that the system has hit its performance limit.

While the first to fifth methods explained above may be used to detect bottlenecks in a multi-tier system, they still have some drawbacks as will be described below.

(a6) Drawbacks of First Method

The first method is unable to detect bottlenecks unless the system uses up a particular system resource. In other words, the monitoring of system resource usage alone may not always be sufficient to achieve the detection. More specifically, even if the system is not starved of resources, a computer may become a bottleneck in the following cases: (1) The parallelism of processing is restricted by software setups or so designed in user applications, and (2) Two or more resources are involved to cause a bottleneck in a complex way.

The second method noted above may be able to solve the problem of case (1) by monitoring detailed internal activities of applications, but it is only if the analyzer can obtain appropriate data from the system. Generally, applications have a large number of internal factors which are considered as potential causes of bottlenecks. It is practically impossible to keep capturing exhaustive details of all those factors because such operation consumes much time in writing records in storage devices, besides imposing great burden on the system.

(a7) Common Drawbacks of First to Third Methods

The first to third methods cannot detect bottlenecks that change themselves at very short intervals. It is noted that all the first to third methods rely on the self-measurement on each computer in the system, and this type of methods have a difficulty in conducting detailed analysis with very short time intervals for the following two reasons.

First, a large amount of data is produced on a computer as a result of measurement conducted in greater detail and at very short time intervals. The computer has thus to deal with a heavy burden of such data, no matter whether the collected data is stored in the computer's local storage devices for later retrieval or sent out straight to another computer vial the network. This means that the data collection process may considerably affect the behavior of applications running on the computer. When this is the case, the observed behavior of those applications is quite different from their usual behavior.

Secondly, computers have their own clocks, and those clocks may indicate different times from computer to computer in the exact sense. While such differences may be corrected by using a clock synchronization system such as the Network Time Protocol (NTP), small residual errors on the order of milliseconds are unavoidable. Those errors make it difficult to perform precise matching of time-stamped records collected from a plurality of computers, meaning that the time resolution of analysis is limited.

For the above reasons, the first to third methods are unsuitable for detailed analysis with a high time resolution. As a result of this inability, a relatively longer measurement interval is selected for the analysis. This setup, however, smoothes out variations of the measurements, thus making it impossible to detect transient bottlenecks that occur momentarily. It is also impossible, for similar reasons, to catch a bottleneck caused by dynamic factors that move from one tier to another in a shorter time than the measurement interval.

(a7) Drawbacks of Fourth Method

The fourth method observes external behavior of applications, such as their response times and processing times. However, this approach may lead to a mistake in isolating bottleneck locations. This is because of the lack of information on the internal operation of the computers being monitored. That is, the fourth method relies only on the observation of external behavior of computers while such behavior actually comes from their internal processing operations.

For example, the following situation is often encountered in a multi-tier system. When the system has a bottleneck in a certain tier, the response of that tier will greatly slow down as the number of processing requests increases far beyond the capacity of that tier. However, in the case where there is a mechanism to regulate the number of such processing requests at an appropriate level, the bottleneck tier would not be overwhelmed by excessive requests. The tier thus exhibits only a moderate slowdown in its responsivity. On the other hand, the tier above that bottleneck tier has to wait longer than usual each time it transmits a processing request downward, and this waiting time increases exponentially. The problem here is that the performance monitoring based on external behavior is unable to distinguish between increased waiting times and increased processing times in its true sense. As a result, the upper tier experiencing increased waiting times may be falsely taken as a bottleneck of the system.

(a8) Drawbacks of Fifth Method

The fifth method performs a load test of the system before it is put into operation, to obtain the knowledge of relationships between load and throughput. The knowledge obtained in this preparatory measurement is used to isolate bottlenecks the system may encounter during operation. The fifth method, however, has several drawbacks described below.

When applied to a multi-tier system, the fifth method can measure the load (the number of concurrent access users) on the topmost tier of the system, as well as the resulting throughput. The fifth method, however, cannot measure load-throughput relationships in each individual tier. Also the above-noted preparatory measurement has to perform the measurement repetitively with a varied amount of system load produced by using a load generator. Another factor to consider is that the multi-tier systems are dynamically scalable, and each tier can be scaled out by adding more computers. It is not practical for the fifth method, however, to conduct a preparatory measurement for every possible configuration of such a scalable system. Yet another factor to consider is that the workload on the tiers of a multi-tier system depends on what kinds of processes are running on the system at what mixture ratio and in what sequence or timing. However, it is very difficult and unrealistic to obtain complete data by conducting a preparatory test for every possible combination of those things.

A similar method could be applied to other tier than the topmost one by directing the workload generator to that tier to measure the relationships between load and throughput. However, it is hard to simulate a real-world load environment because of the high complexity of recent multi-tier systems. That is, a tier in the system receives a processing request from its upper tier and issues a load to its lower tier, where the timing and amount of the load depend not only on the specific application programs involved, but also on a complex mixture of other factors including hardware configuration and operating system implementation. For those reasons, it is difficult and unrealistic to fully understand such mechanisms and build an exact model of system workload. In conclusion, the fifth method can be used in pre-operation testing of a system, but is not suitable for real-time performance analysis and bottleneck isolation of the system.

As can be seen from the above discussion, none of the first to fifth methods can properly detect bottlenecks in a multi-tier system because of their respective drawbacks. In contrast to those methods, the method according to the first embodiment calculates total progress quantities and total processing times for each tier on the basis of precise message timestamps and other information, determines their relationships in a dynamic fashion, and isolates performance bottlenecks. The proposed techniques enables precise determination of whether the server of each tier is used up to its performance limit, thus solving or alleviating the aforementioned drawbacks of conventional methods.

For example, the first embodiment detects a bottleneck based on the data indicating process execution periods of each server, rather than each server's system resource consumption. This means that the first embodiment solves the foregoing problem of the first method, i.e., its inability to detect bottlenecks unless the system uses up a particular system resource.

According to the first embodiment, the analysis period divided into time windows, and the total processing time in each divided window is compared with a given threshold. The first embodiment solves the common drawback of the first to third methods, i.e., the inability to detect bottlenecks that change themselves at very short intervals.

Further the first embodiment uses two distinct measurement parameters, i.e., total processing time and total progress quantity, in its bottleneck detection. The foregoing fourth method, on the other hand, uses a single measurement parameter, i.e., response time/processing time, which may also be calculated from the two parameters of the first embodiment. As discussed above, the fourth method relies on the external behavior of applications and is apt to make a mistake in isolating bottleneck locations. One of the factors that cause this drawback is the possibility of mistaking mere increased waiting times for a bottleneck. That is, when a lower-tier server is slow in responding requests from an upper-tier server, the resulting increase of response waiting times could be mistaken as a bottleneck in the waiting server. The first embodiment isolates bottlenecks on the basis of two-dimensional relationships between total processing time and total progress quantity. This approach reduces the possibility of mistaking mere increased response waiting times for a bottleneck.

The first embodiment isolates bottlenecks in servers separately for each individual tier. This means that the first embodiment solves the above-described drawback of the fifth method, i.e., the inability to measure the relationship between load and throughput of individual tiers.

The monitoring unit $1a$, calculation unit $1c$, determination unit $1d$, and detection unit $1e$ illustrated in FIG. 1 may be implemented as computer programs executed by a central processing unit (CPU) of the information processing apparatus 1. The storage unit $1b$ may be implemented as part of a random access memory (RAM) or hard disk drive (HDD) in the information processing apparatus 1. It is also noted that the element-to-element connections seen in FIG. 1 are only an example of communication paths. There may be other communication paths than those illustrated in FIG. 1.

(b) Second Embodiment

This section describes a second embodiment. The second embodiment takes an approach of observing external behavior of applications on the network. Specifically, the second embodiment captures IP packets flowing over the network by using port mirroring functions of a switching hub and reconstructs protocol messages from the captured packets to obtain necessary measurement data. Those protocol messages conform to specific protocol standards. Where appropriate, those protocol messages are referred to simply as "messages."

The processing performance per unit time of a computer is called "throughput." The second embodiment uses this term "throughput" to refer to what has been described above as "total progress quantity" in the first embodiment. In the second embodiment, an average load of processes executed during a time window is calculated by dividing the total processing time in the first embodiment by the length of a time window. This value is used in the analysis as the load in that time window. Since the time windows have equal lengths, a performance analysis using load in place of the total processing time will result in the same outcomes as the first embodiment. Accordingly the second embodiment uses the load in each time window when executing an analysis such as evaluation of the spare capacity of a specified apparatus.

The following description assumes that the second embodiment is implemented in a web three-tier system as an example of a multi-tier system. This web three-tier system is a computer system formed from web servers, application servers, and database servers organized in a multiple-layer structure. A web browser is running on an end-user computer, which issues processing requests in the form of HTTP messages. Those processing requests are received by a web server. If the requests are directed to static content, the web server directly responds to them by sending the requested content back to the end-user computer. If the processing requests include a request for dynamic content that is to be produced by some programs, the web server forwards that request to an application server. Upon receipt of this request, the application server executes the requested processing with a program described in Java™ language or the like. During this processing the application server may need some data managed in a database, in which case the application server issues a request to a relevant database server to obtain the necessary data.

Figure 4:
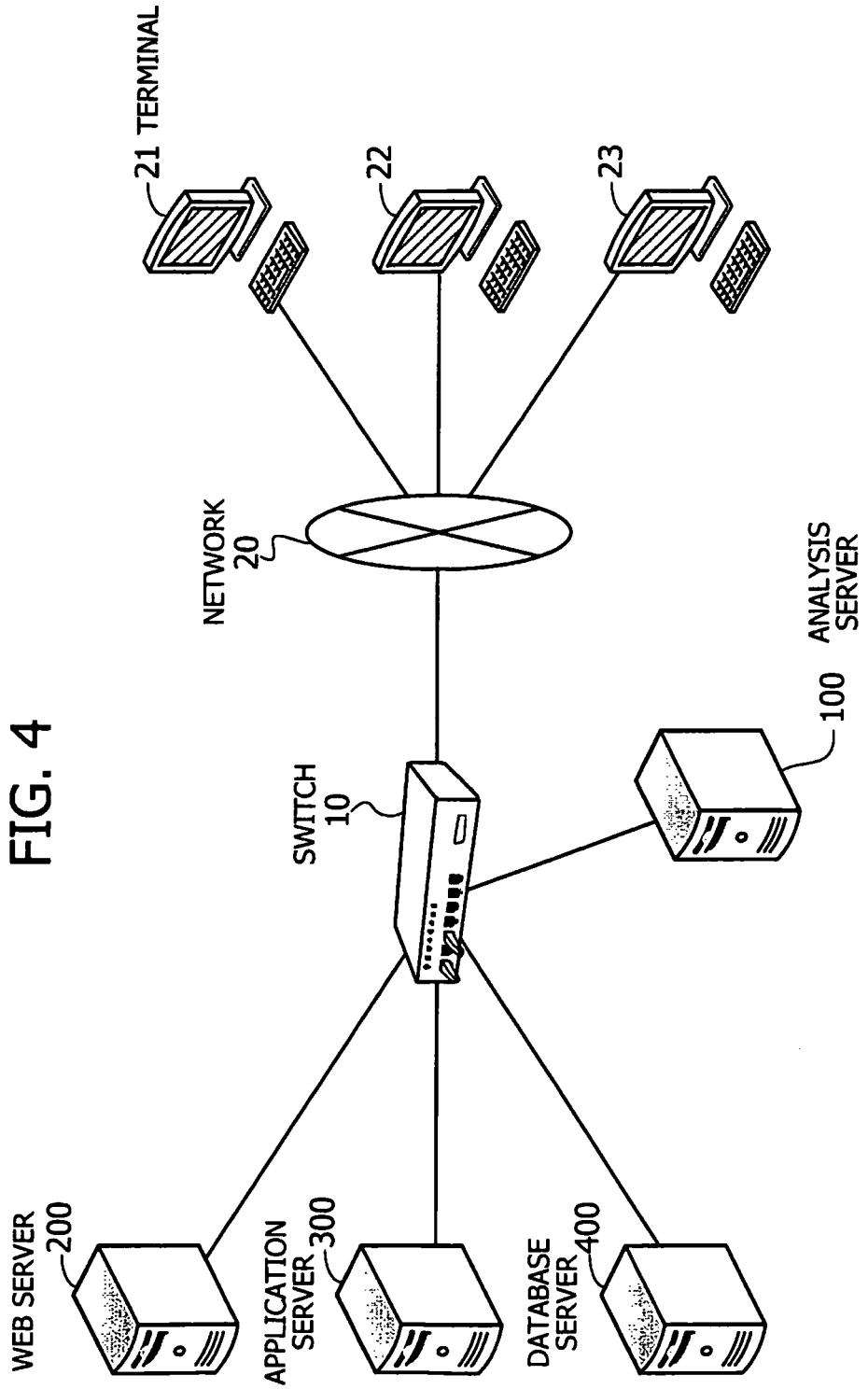
FIG. 4 illustrates an overall structure of a transaction system according to a second embodiment.

FIG. 4 illustrates an overall structure of a transaction system according to the second embodiment. The illustrated transaction system includes an analysis server 100, a web server 200, an application server 300, and a database server 400. The servers are linked to each other via a switch 10. The switch 10 is also connected to terminals 21, 22, and 23 via a network 20.

The terminals 21, 22, and 23 are allowed to make access to the web server 200 via the network 20 and switch 10. More specifically, the web server 200 provides a graphical user interface (GUI) for the users of those terminals 21, 22, and 23 to access the transaction system. The network 20 may be, for example, an intranet or the Internet. In the latter case, the switch 10 may also serve as a firewall, and the network segment accommodating the web server 200 may be handled as, for example, a demilitarized zone (DMZ).

The analysis server 100 manages operating status of the web server 200, application server 300, and database server 400, and to this end, the analysis server 100 is allowed to collect necessary data from the switch 10. Specifically, the switch 10 has a port mirroring function, which permits the analysis server 100 to collect communication packets exchanged among the web server 200, application server 300, and database server 400. The port mirroring function is to duplicate IP packets passing through specified ports on the switch 10 and forward a copy of those IP packets to another specified port. The analysis server 100 is connected to this destination port, so that the forwarded IP packets can be recorded and analyzed.

The analysis server 100 receives and records communication packets sent from the switch 10. This operation is referred to as "packet capturing." The switch 10 may be replaced with a repeater hub if its use is limited to the packet capturing. The analysis server 100 has a network interface capable of receiving IP packets, as well as a hard disk drive whose capacity is large enough to record those forwarded IP packets. Preferably, the analysis server 100 has a sufficient CPU performance for capturing IP packets. The analysis server 100 subjects the captured IP packets to a process of extracting messages.

The web server 200 accepts processing requests (messages) that web browsers on the terminals 21, 22, and 23 issue to the transaction system. It is assumed here that the web server 200 and terminals 21, 22, and 23 communicate messages in the HTTP protocol. The embodiment is, however, not limited by this assumption and may use other protocols as well. Where appropriate, the processing requests issued from terminals 21, 22, and 23 to the web server 200 will be referred to hereafter as "HTTP requests," and their corresponding responses will be referred to hereafter as "HTTP responses." Those requests and responses are an example of processing requests. In response to an HTTP request for static content from a terminal 21, 22, and 23, the web server 200 produces an HTTP response by itself and transmits it to the requesting terminal 21, 22, and 23. In the case of a request for dynamic content, the web server 200 produces a processing request (message) that specifies a necessary processing operation and sends it to the application server 300.

It is assumed that the web server 200 and application server 300 communicate messages by using the Internet Inter-ORB Protocol (IMP), where ORB stands for "Object Request Broker." The embodiment is, however, not limited by this assumption and may use other protocols as well. Where appropriate, the processing requests issued from the web server 200 to the application server 300 will be referred to hereafter as "IIOP requests," and their corresponding responses will be referred to hereafter as "IIOP responses."

The web server 200 produces an HTTP response when it receives an IIOP response corresponding to the previously sent IIOP request. The web server 200 transmits this HTTP response to the requesting terminal 21, 22, or 23.

The application server 300 produces a query for a necessary processing operation on the basis of an IIOP request received from the web server 200, and sends it to database server 400. Queries produced by the application server 300 are written in the form of, for example, SQL statements, and transmitted to the database server 400 by using a proprietary protocol specific to the database server 400. Where appropriate, such queries issued from the application server 300 to the database server 400 will be referred to hereafter as "DB requests," and their respective responses will be referred to hereafter as "DB responses." The application server 300 receives a DB response corresponding to a DB request that it has issued previously. Based on this DB response, the application server 300 creates an IIOP response and sends it back to the requesting web server 200.

The database server 400 receives a DB request from the application server 300 and executes SQL statements contained in the received DB request, making access to a database for data retrieval and update operations. Based on the result of this database access, the database server 400 creates a DB response and sends it back to the application server 300.

While the illustrated transaction system includes a single server for each tier (i.e., the web server 200, application server 300, and database server 400 for web tier, application tier, and database tier, respectively), the system is not limited by this specific number of servers. Each tier may have a plurality of servers, so as to distribute its workload among those servers.

The tiers exchange messages with each other. While there are several ways to collect those messages, the second embodiment is configured to capture IP packets flowing over the network to collect message information. More specifically, the second embodiment uses a switch 10 having a port mirroring function.

In the rest of the description, the wording "each server" refers to the web server 200, application server 300, and database server 400 individually. Also the wording "the servers" refers to those servers collectively. It is assumed that the web server 200 is located higher than the application server 300 and database server 400 in the tier hierarchy. It is also assumed that the application server 300 is located higher than the database server 400 in the tier hierarchy. The analysis server 100 is previously provided with the information defining such hierarchical relationships of servers.

Figure 5:
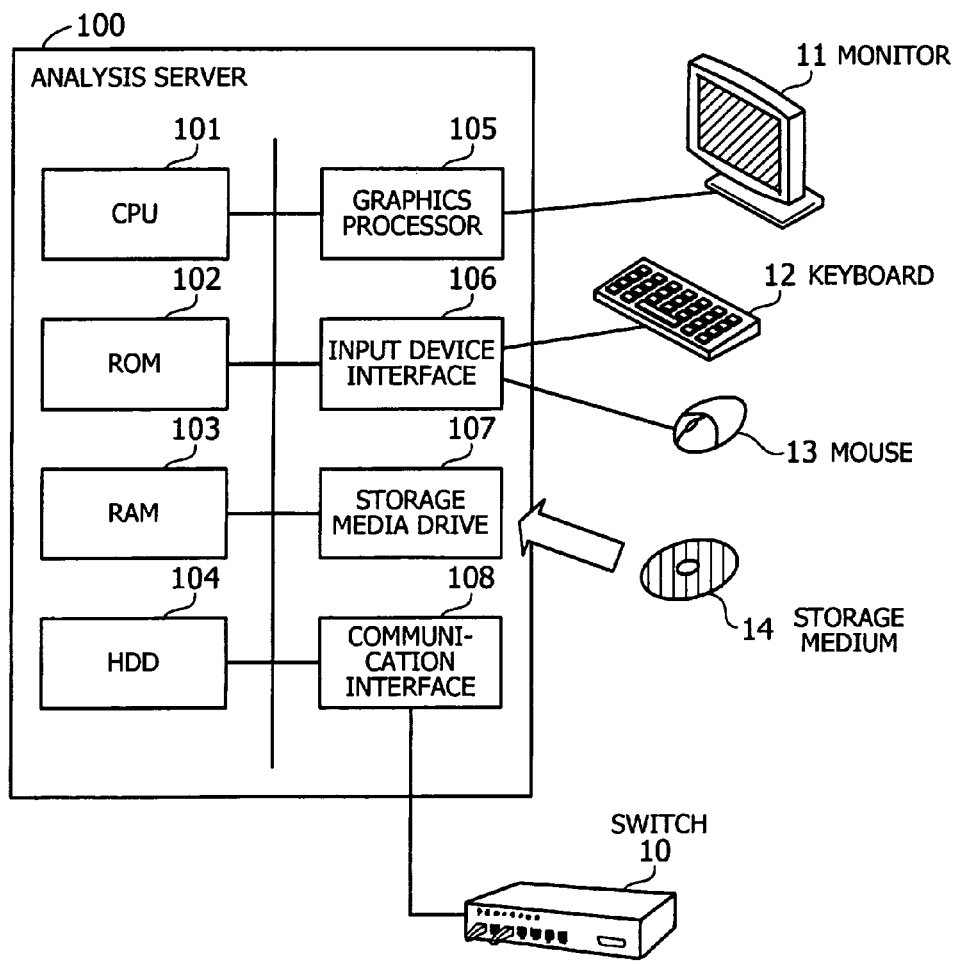
FIG. 5 illustrates an example hardware configuration of a computer used in the second embodiment.

FIG. 5 illustrates an example hardware configuration of a computer used in the second embodiment. The illustrated analysis server 100 includes a CPU 101, a read only memory (ROM) 102, a RAM 103, an HDD 104, a graphics processor 105, an input device interface 106, a storage media drive 107, and a communication interface 108.

The CPU 101 controls the entire system of the illustrated analysis server 100. The ROM 102 stores, for example, a basic input/output system (BIOS) program for the analysis server 100. The RAM 103 serves as temporary storage for at least part of operating system (OS) programs and application programs executed by the CPU 101, as well as for various data that the CPU 101 needs to execute processing. The HDD 104 stores OS programs and application programs. The HDD 104 also stores various data that the CPU 101 needs to execute processing. It is noted that other device such as a solid state drive (SSD) may be used in place of, or in addition to the HDD 104.

The graphics processor 105 is connected to a monitor 11. The graphics processor 105 produces video images in accordance with commands from the CPU 101 and displays them on a screen of the monitor 11. The input device interface 106 is connected to input devices such as a keyboard 12 and a mouse 13 and supplies signals from those input devices to the CPU 101.

The storage media drive 107 is a device used to read data out of a storage medium 14. For example, the functions that the analysis server 100 is supposed to provide may be encoded as computer programs to be run on a computer system. Those programs may be recorded on a computer-readable, non-transitory medium, such as the illustrated storage medium 14, for the purpose of distribution. It is noted that computer-readable, non-transitory media include all computer-readable media, with the sole exception being a transitory, propagating signal. The programs may also be stored in a program distribution server (not illustrated) which is linked to the network 20 directly or via the switch 10. In this case, the analysis server 100 can download programs from the program distribution server via the switch 10 or network 20.

The storage medium 14 may be, for example, a magnetic storage device, optical disc, magneto-optical storage medium, or semiconductor memory device. Magnetic storage devices include, for example, HDD, flexible disks (FD), and magnetic tapes. The optical discs include, for example, compact disc (CD), CD-Recordable (CD-R), CD-Rewritable (CD-RW), digital versatile disc (DVD), DVD-R, DVD-RW, and DVD-RAM. Magneto-optical storage media include magneto-optical discs (MO), for example. Semiconductor memory devices include, for example, flash memory such as Universal Serial Bus (USB) flash drives.

The communication interface 108 is connected to a switch 10 via a twisted pair (TP) cable, fiber-optic cable, or the like. The communication interface 108 communicates data with other information processing devices (not illustrated) via the switch 10. The communication interface 108 also receives from the switch 10 communication packets exchanged between the servers.

The above-described hardware platform may be used to realize the processing functions of the second embodiment. While FIG. 5 only illustrates the analysis server 100, the same hardware configuration also applies to the web server 200, application server 300, and database server 400, as well as to the terminals 21 to 23. Further, the information processing apparatus 1 discussed in the first embodiment can also be implemented on the computer hardware platform illustrated in FIG. 5.

Figure 6:
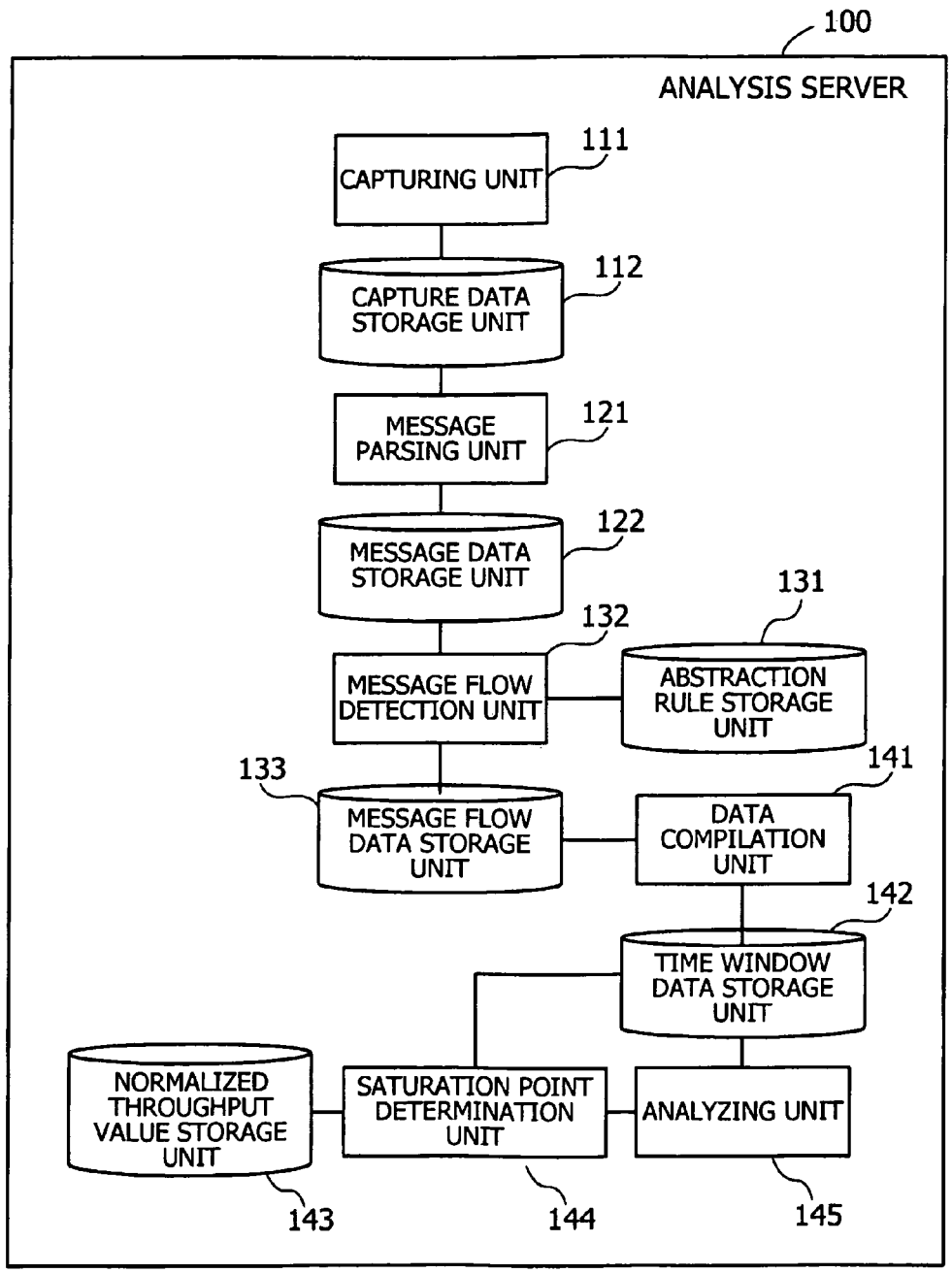
FIG. 6 is a block diagram illustrating an example of functions provided by an analysis server according to the second embodiment.

FIG. 6 is a block diagram illustrating an example of functions provided by an analysis server according to the second embodiment. Specifically, the analysis server 100 includes a capturing unit 111, a capture data storage unit 112, a message parsing unit 121, a message data storage unit 122, an abstraction rule storage unit 131, a message flow detection unit 132, a message flow data storage unit 133, a data compilation unit 141, a time window data storage unit 142, a normalized throughput value storage unit 143, a saturation point determination unit 144, and an analyzing unit 145.

The capturing unit 111, linked to a mirror port of the switch 10, receives a copy of each communication packet transmitted and received via the switch 10. The capturing unit 111 stores the received communication packets in a capture data storage unit 112, adding a time stamp indicating the current time to each communication packet to be stored. The capture data storage unit 112 provides a storage space for communication packets captured by the capturing unit 111, which may be implemented, for example, as part of the storage space of the RAM 103 or HDD 104 in the analysis server 100.

The message parsing unit 121 parses received packets to reconstruct original messages transmitted by the web server 200, application server 300, database server 400, and terminals 21, 22, and 23. The message parsing unit 121 then stores the reconstructed messages in a message data storage unit 122. The message data storage unit 122 provides a storage space for those reconstructed messages, which may be implemented, for example, as part of the storage space of the RAM 103 or HDD 104.

The abstraction rule storage unit 131 stores abstraction rules that describe how to abstract the content of request messages. For example, the abstraction rules include those for combining request messages requesting the same kind of processes (e.g., jobs that belong to a particular category) into a single form of content. The abstraction rules, when applied to each request message, permit the analysis server 100 to recognize request messages having common abstract content as being directed to the same job category. The abstraction rule storage unit 131 may be implemented, for example, as part of the storage space of the RAM 103 or HDD 104.

The message flow detection unit 132 determines the type of processes (jobs) initiated by the messages in the message data storage unit 122, on the basis of abstraction rules stored in the abstraction rule storage unit 131. For example, the message flow detection unit 132 executes the aforementioned abstraction of request messages with given abstraction rules and recognizes request messages having common abstract content as being directed to the same job category. After the abstraction of request messages, the message flow detection unit 132 extracts messages resulting from a transaction (a series of processing operations) executed by the web server 200, application server 300, and database server 400. For example, the message flow detection unit 132 has a set of transaction models which are previously defined. The message flow detection unit 132 searches the message data storage unit 122 to extract a combination of messages (a message flow) that matches with a specific transaction model.

Further, the message flow detection unit 132 stores the exacted message flows in a message flow data storage unit 133 as message flow datasets. Each stored message flow dataset includes request messages, each of which has an indication of job category to indicate what kind of job was executed by that message. The message flow data storage unit 133 provides a storage space for such message flow datasets. For example, the message flow data storage unit 133 may be implemented as part of the storage space of the RAM 103 or HDD 104.

The data compilation unit 141 first divides a given analysis period into a plurality of time windows with a fine granularity (i.e., a small time step size). The data compilation unit 141 then retrieves a message flow dataset from the message flow data storage unit 133 and compiles the records on an individual time window basis. For example, the data compilation unit 141 calculates a throughput value and a load value for each time window, and for each tier, based on the records stored in the message flow data storage unit 133. The data compilation unit 141 stores the calculated throughput values and load values in a time window data storage unit 142. The time window data storage unit 142 provides a storage space for storing such load-throughput pairs of time windows, separately for each tier. For example, the time window data storage unit 142 may be implemented as part of the storage space of the RAM 103 or HDD 104.

The normalized throughput value storage unit 143 provides a storage space for normalized per-job throughput values of different job categories. For example, the normalized throughput value storage unit 143 may be implemented as part of the storage space of the RAM 103 or HDD 104.

The saturation point determination unit 144 determines a saturation point. The term "saturation point" refers to a boundary that divides load values into to the following two ranges. In one range, throughput increases as load increases, whereas in the other range, there is little or no increase in throughput in spite of an increase of load. In other words, the saturation point is a threshold of load above which no more meaningful increase of throughput is expected even if the load is raised.

The analyzing unit 145 isolates a server causing a performance bottleneck of the multi-tier system. For example, the analyzing unit 145 evaluates the time duration in which the load exceeds the saturation point, and calculates the ratio of that duration to the given analysis period. If this ratio exceeds a predetermined threshold in a particular tier, then the analyzing unit 145 determines that the server in that tier is likely to be a bottleneck. The analyzing unit 145 then outputs its determination result by, for example, displaying a message on a screen of the monitor 11 to indicate which server is a bottleneck in the system.

Referring to FIG. 6, several functional blocks of the analysis server 100 are interconnected by solid lines representing a part of communication paths. It is noted that the analysis server 100 is not limited by this specific example illustrated in FIG. 6. The actual implementations of the analysis server 100 may have other communication paths.

It is also noted that the capturing unit 111, capture data storage unit 112, message parsing unit 121, message data storage unit 122, abstraction rule storage unit 131, and message flow detection unit 132 in FIG. 6 are an example implementation of the monitoring unit 1*a* discussed in FIG. 1. Also, the message flow data storage unit 133 in FIG. 6 is an example of the storage unit 1*b* discussed in FIG. 1. The data compilation unit 141 in FIG. 6 is an example of the calculation unit 1*c* discussed in FIG. 1. The saturation point determination unit 144 in FIG. 6 is an example of the determination unit 1*d* discussed in FIG. 1. The analyzing unit 145 in FIG. 6 is an example of the detection unit 1*e* discussed in FIG. 1.

Figure 7:
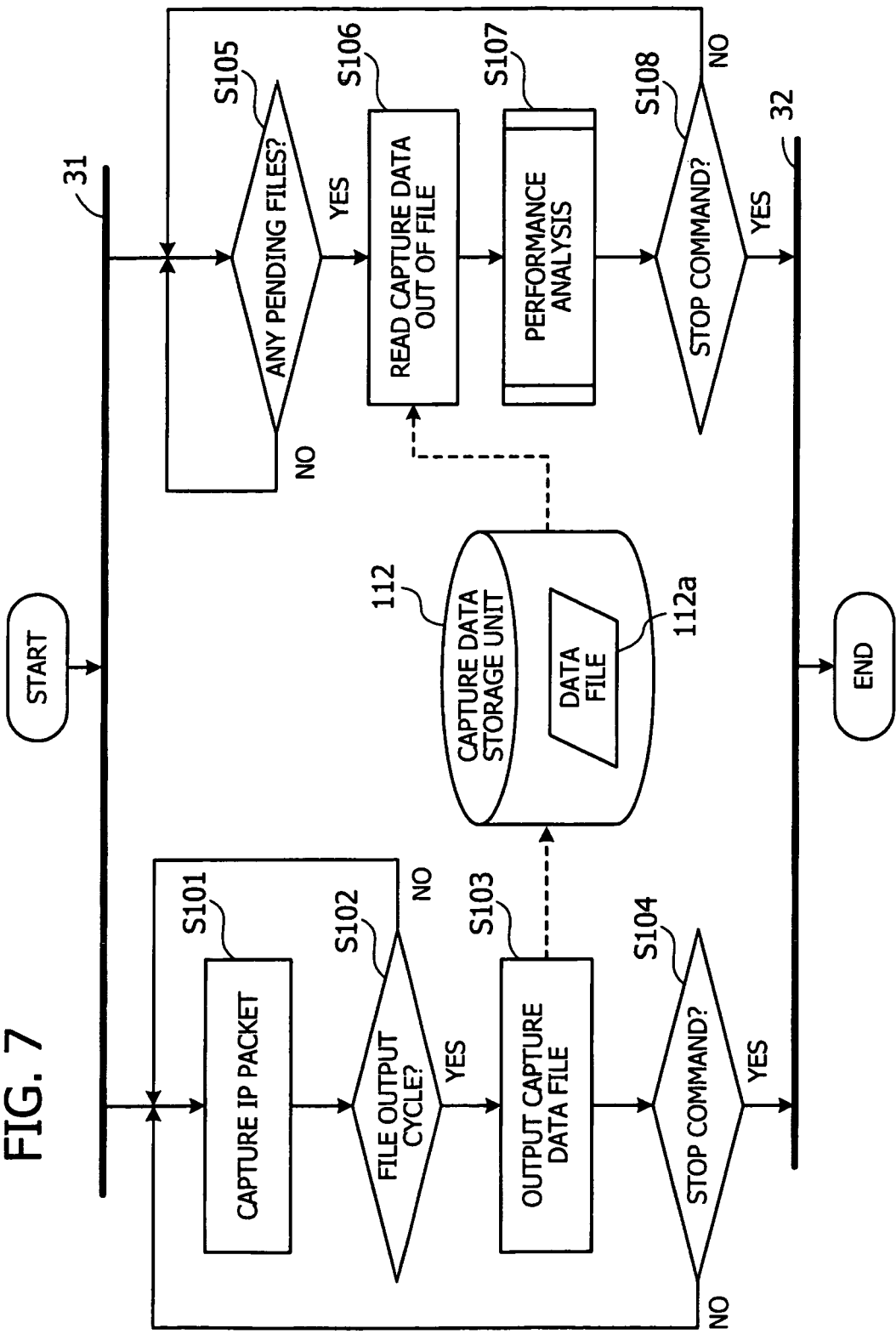
FIG. 7 is a flowchart illustrating an example of a data capturing process.

The operation of each function of FIG. 6 will now be discussed in greater detail below, beginning with a packet capturing process executed by the capturing unit 111. FIG. 7 is a flowchart illustrating an example of a data capturing process. As seen, the flowchart of FIG. 7 includes two synchronization bars 31 and 32 to represent parallel processing as in activity diagrams according to the Unified Modeling Language (UML). The upper synchronization bar 31 represents an operation called "fork," which indicates that the process flow is divided into two or more parallel flows. The lower synchronization bar 32, on the other hand, represents an operation called "join," which indicates that two or more process flows are joined together to a single flow.

Each step of FIG. 7 will now be described below in the order of step numbers.

(Step S101) The capturing unit 111 captures IP packets sent from a mirror port of the switch 10. For example, the capturing unit 111 temporarily stores captured IP packets in RAM 103, together with time stamps to record when the capturing unit 111 received each IP packet.

(Step S102) The capturing unit 111 determines whether a given file output cycle time has elapsed since the start of the capturing process or the previous output of a capture data file. The capturing unit 111 is previously configured to output a data file at intervals of, for example, 180 seconds. When this file output cycle time has elapsed, the capturing unit 111 proceeds to step S103. When it is in the middle of the cycle, the capturing unit 111 returns to step S101 to continue capturing IP packets.

(Step S103) The capturing unit 111 outputs the capture data from temporary storage (e.g., RAM 103) in the form of a data file 112*a*. For example, the capturing unit 111 creates a new data file 112*a* in the capture data storage unit 112 to output the captured data.

(Step S104) The capturing unit 111 determines whether a stop command is entered. For example, the analysis server 100 allows the administrator to submit a stop command through a keyboard 12 or a mouse 13 (FIG. 5). When there is a stop command, the capturing unit 111 terminates the capturing process. Otherwise, the capturing unit 111 goes back to step S101.

As a result of steps S101 to S104, a new file 112*a* containing capture data is created and stored in the capture data storage unit 112 at each file output cycle.

(Step S105) The message parsing unit 121 examines whether the capture data storage unit 112 contains any pending data files 112*a* that have not been subjected to the performance analysis. As the capturing unit 111 supplies the capture data storage unit 112 with such data files at regular intervals (i.e., file output cycles), the message parsing unit 121 finds a pending file at the same intervals.

(Step S106) The message parsing unit 121 reads capture data out of the newly selected data file 112*a* in the capture data storage unit 112.

(Step S107) The functional blocks constituting the analysis server 100 work together to execute a performance analysis. The details of this step will be described later.

(Step S108) The message parsing unit 121 determines whether a stop command is entered. For example, the analysis server 100 allows the administrator to submit a stop command through a keyboard 12 or a mouse 13 (FIG. 5). When there is a stop command, the message parsing unit 121 terminates the capturing process. Otherwise, the message parsing unit 121 goes back to step S105.

As can be seen from the above, the captured data is accumulated for a fixed period (e.g., 180 ms) and subjected to a performance analysis at fixed intervals. As an alternative method, the data collection process (steps S101 to S104) and the performance analysis (step S107) may be executed separately without synchronization. Preferably, however, the data collection process (steps S101 to S104) and the performance analysis (step S107) are executed together in a synchronized way, just as done in FIG. 7, so that collected data is immediately analyzed, and so that bottlenecks can be detected in real time.

Figure 8:
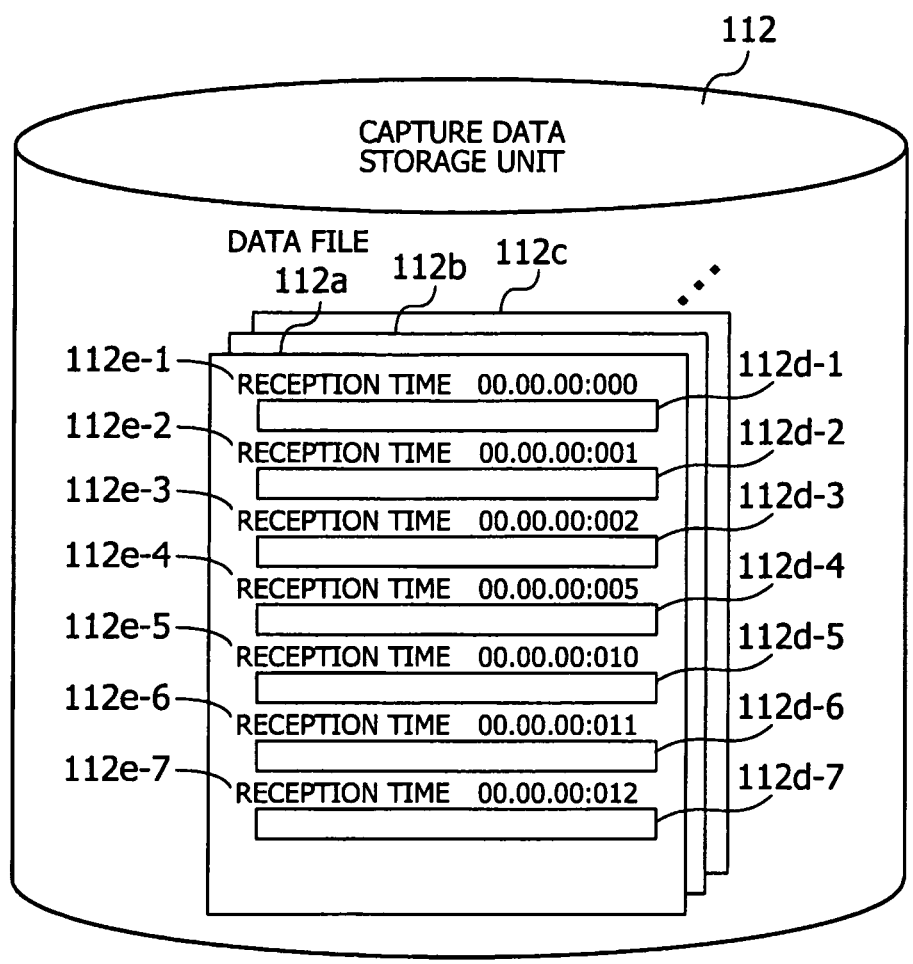
FIG. 8 illustrates an example data structure of a capture data storage unit.

FIG. 8 illustrates an example data structure of a capture data storage unit. The illustrated capture data storage unit 112 stores a plurality of data files 112*a*, 112*b*, 112*c*, and so on. The first data file 112*a* contains a plurality of IP packets 112*d*-1 to 112*d*-7. Each IP packet 112*d*-1 to 112*d*-7 is added a record of reception time 112*e*-1 to 112*e*-7. Other data files 112*b*, 112*c*, . . . also contain IP packets with reception time records similarly to the first data file 112*a*.

Referring now to FIG. 9 and subsequent drawings, the description will provide details of the performance analysis. FIG. 9 is a flowchart illustrating a procedure of performance analysis. Each step of FIG. 9 is described below in the order of step numbers.

(Step S111) The message parsing unit 121 reconstructs messages on the basis of IP packets contained in the currently selected data file, and stores the reconstructed messages in the message data storage unit 122 in their temporal order.

(Step S112) The message flow detection unit 132 investigates messages stored in the message data storage unit 122 to detect message flows. The term "message flow" refers to a series of messages transmitted and received in the multi-tier system as a consequence of a single transaction request.

According to the second embodiment, different tiers use different communication protocols to send messages. When the multi-tier system receives a request from one of the terminals 21 to 23, various messages are issued from relevant tiers with different protocols. Many of those messages, however, lack the information necessary for associating themselves with others. The second embodiment solves this problem by using a model matching technique to detect associations between those different protocol messages. For example, the message flow detection unit 132 has a prepared set of message flow models, so that the messages in the message data storage unit 122 can be compared with those models. If a group of messages matches with a particular model, the message flow detection unit 132 identifies that group of messages as a message flow.

(Step S113) The message flow detection unit 132 determines the job category of processes that the server of each tier executes in response to request messages in a detected message flow. The message flow detection unit 132 achieves this by, for example, performing abstraction of each request message according to abstraction rules stored in the abstraction rule storage unit 131, and then combining request messages having the same abstracted content as a single job category. Here the detected job category is given a specific identifier (job category name). The message flow detection unit 132 then stores such message flows in the message flow data storage unit 133 while adding job category names to request messages.

(Step S114) The saturation point determination unit 144 selects a specific tier for the performance analysis. For example, the saturation point determination unit 144 has a listing of protocols which are used to send request messages to the server of each tier constituting the multi-tier system. The listing includes protocol names such as "HTTP," "IIOP," and "Database" for a web three-tier system. The saturation point determination unit 144 selects the tiers corresponding to those protocol names one by one.

(Step S115) The saturation point determination unit 144 and analyzing unit 145 work together to execute a performance analysis of the selected tier. Details of this step will be described later with reference to FIG. 16.

(Step S116) The saturation point determination unit 144 determines whether every tier has been subjected to the tier performance analysis. For example, the saturation point determination unit 144 determines that there is no more tier to process when it has selected all tiers specified by the given listing of protocol names. When there is a pending tier, the saturation point determination unit 144 returns to step S114 to select that tier. Otherwise, the saturation point determination unit 144 exits from the present process of performance analysis.

As described above, the procedure of performance analysis begins with reconstruction of messages. The reconstructed messages are then stored in the message data storage unit 122. FIG. 10 illustrates an example data structure of this message data storage unit 122. The illustrated message data storage unit 122 contains a plurality of reconstructed messages in the temporal order, which are also referred herein to as "time series data." Placed on the left of those messages in FIG. 10 are line numbers indicating their locations within the message data storage unit 122. It is noted that FIG. 10 focuses on the processing requests and responses of tiers, as well as their associated messages, while omitting other messages which may actually be stored in the message data storage unit 122.

Each line of message text is formed from the following data fields: date field 122a, time field 122b, session number field 122c, source address field 122d, destination address field 122e, command type field 122f, and message field 122g. The date field 122a contains a date code indicating when the message was captured. The time field 122b contains a time code indicating at what time of day the message was captured. The session number field 122c contains a session number which is used to manage resources for message transmission and reception in the transaction system under analysis. The source address field 122d contains an IP address and a port number which indicate the source computer of the message. The destination address field 122e contains an IP address and a port number which indicate the destination computer of the message. The command type field 122f indicates the request/response property and protocol type (e.g., HTTP, IIOP, Database query) of a command. The message field 122g contains specific details of the message. For example, when the command type field 122f indicates that the message is a request, the message field 122g provides detailed content of that request.

The above-described data of messages in the message data storage unit 122 permits the message flow detection unit 132 to recognize what kind of messages were sent to which servers. The IP addresses seen in the message data storage unit 122 of FIG. 10 are each associated with a specific host device in the system of FIG. 4 as follows. IP address "194.23.5.226" identifies the web server 200. IP address "194.23.7.168" identifies the application server 300. IP address "194.23.8.198" identifies the database server. IP address "194.185.39.24" identifies the terminal 22.

The above message parsing unit 110 is configured to fill in the date field 122a and time field 122b with the information obtained from time stamps of communication packets which are recorded at the time of capturing. The embodiments are, however, not limited by this specific configuration. In the case where, for example, communication packets carry with themselves a piece of information indicating their creation time or transmission time at the source server, the analysis server 100 may use that time information to populate the date field 122a and time field 122b. It is preferable, in this case, that the clocks in the servers are precisely synchronized with each other.

The message flow detection unit 132 detects a specific message flow from reconstructed messages and identifies the job category of jobs executed in response to request messages in the messages flow. The job category refers to a group of requests that initiate similar kinds of processing operations. To determine such job categories, the message flow detection unit 132 performs abstraction of given request messages on the basis of abstraction rules provided in the abstraction rule storage unit 131.

Figure 11:
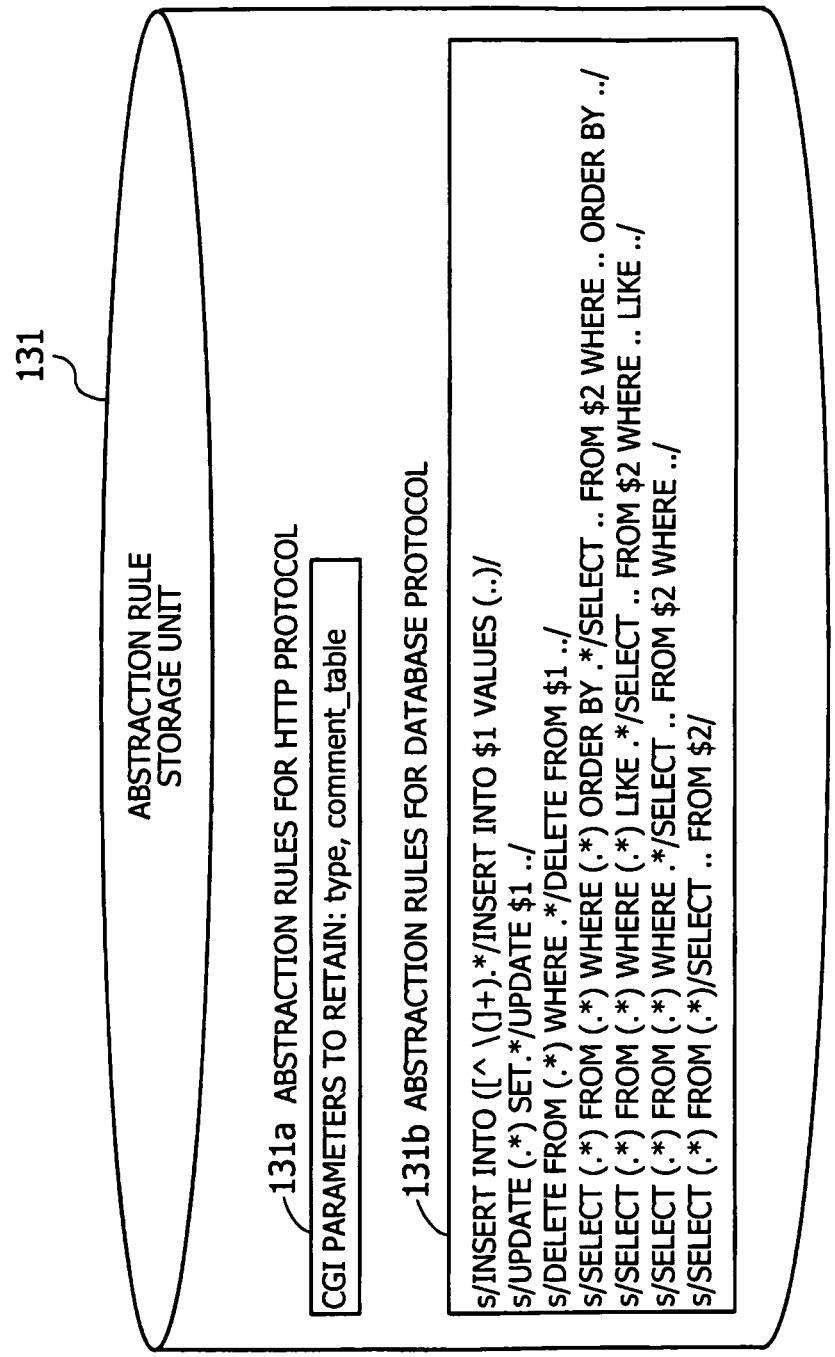
FIG. 11 illustrates an example data structure of an abstraction rule storage unit.

FIG. 11 illustrates an example data structure of an abstraction rule storage unit. The illustrated abstraction rule storage unit 131 stores a set of abstraction rules for each different protocol. In the case of, for example, HTTP protocol messages, the message flow detection unit 132 determines job categories from a command name, local address in URL, and Common Gateway Interface (CGI) parameters designated as "to retain." Command names include "GET" and "POST," for example. Local address in URL is what remains when the first portion "protocol_name: //host_name: port_number" is removed from a given URL. The illustrated abstraction rules 131a for HTTP protocol specify which CGI parameters to retain. In the example of FIG. 11, the abstraction rules 131a specify that two parameters named "type" and "comment_table" are to be retained while others are to be removed.

In the case of database protocol messages, the message flow detection unit 132 first replaces their protocol-specific command names and SQL statements in accordance with replacement rules described by using regular expressions, thereby abstracting the given messages. The message flow detection unit 132 then determines job categories based on the abstracted message content. That is, the illustrated abstraction rules 131b for database protocol define several specific replacement rules by using regular expressions. In the example of FIG. 11, those replacement rules follow the syntax of the Perl programming language. See, for example, the first line "s/INSERT INTO [(^ ¥(]+).*/INSERT INTO $1 VALUES ( . . . )/" of the replacement rules. The topmost letter "s" indicates a replacement. Character string "INSERT INTO ([^ ¥(]+).*" delimited by the first "/" and second "/" is the source string to be replaced with another string. Character string "INSERT INTO $1 VALUES ( . . . )" delimited by the second "/" and third "/" is the replacement string that is to replace the source string. The source string contains a character string inside the parentheses, which will be recorded as a variable. In the case of the first line, this variable is described as a regular expression "[^ ¥(]" representing one or more repetitions of any character other than the left parenthesis "(". Such character strings enclosed by the parentheses "(" and ")" are numbered and recorded in the left-to-right order. That is, the n-th recorded character string is given a variable named $n, where n is an integer greater than zero. Those variables are specified in the replacement string so that corresponding character strings in the source string will be inserted to the variables' respective positions in the replacement string.

Request messages are abstracted according to the above-described abstraction rules. The message flow detection unit 132 then recognizes request messages having the same abstracted content as being of the same job category. FIG. 12 illustrates an example of job categories of HTTP protocol. In this example, a variety of job category names for HTTP protocol are each associated with a specific command name and abstracted job details. For example, job category "W1" is associated with a command named "GET" and a description of job details which reads "/RUBBOS/SERVLET/EDU-.RICE.RUBBOS.SERVLETS.STORIESOFTHEDAY."

FIG. 13 illustrates an example of job categories of database protocol. In this example, a variety of job time names for the database protocol are each associated with a specific command name and abstracted job details. For example, job category "D1" is associated with a command named "EXECREADREQ" and a description of job details which reads "SELECT . . . FROM STORIES, USERS WHERE . . . . . "

Upon completion of the abstraction processing of messages, the message flow detection unit 132 seeks associated messages to detect a message flow formed from such associated messages. More specifically, a message flow is a time series of associated messages that are issued by the tiers using their specific protocols during the course of conducting a single particular transaction. Suppose, for example, that an upper-tier protocol sends a message to a lower-tier server. This message invokes some processing in the receiving server, thus causing the lower-tier protocol to send some messages. In this case, the initiating message from the upper-tier protocol is associated with the resulting messages from the lower-tier protocol. Such message-associating operation is conducted throughout the layer protocols, from the lowest to the highest, thereby reproducing the entire sequence of message exchanges that constitute a transaction. The detection of message flows may be achieved by using, for example, a method described in Japanese Laid-open Patent Publication No. 2006-011683.

Figure 14:
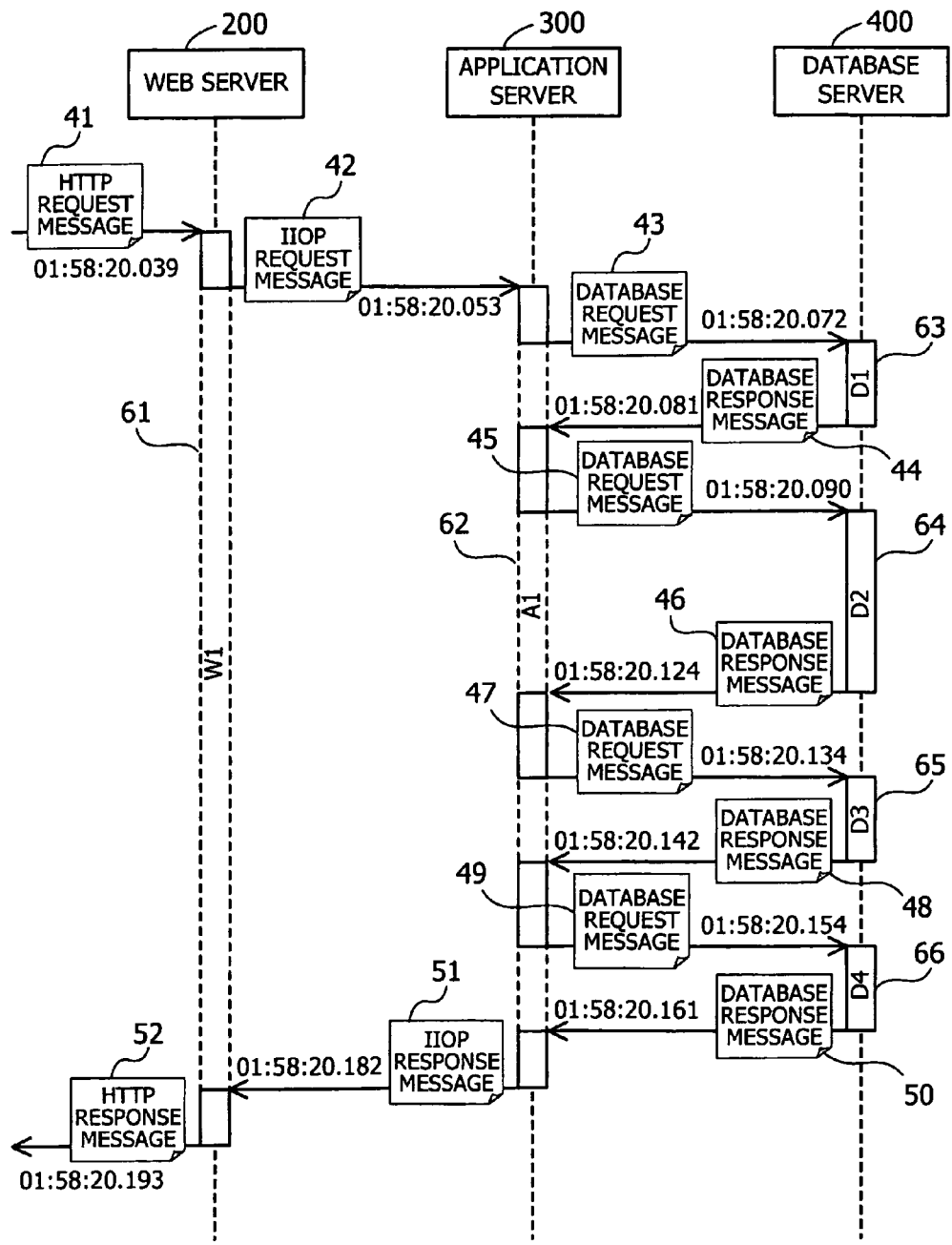
FIG. 14 illustrates an example message flow in which job categories are identified.

FIG. 14 illustrates an example message flow in which job categories are identified. In this FIG. 14, each solid-line box represents the period in which a server execute processing related to a given job, while each broken-line box represents the period in which the server is engaged in some other things not related to that job. The latter period actually means, for example, when the server waits for a response message from a lower-layer server after having sent a request message to that server.

In the example of FIG. 14, the web server 200 starts executing a job 61 of job category W1 in response to an HTTP request message 41. During this course, the web server 200 sends an IIOP request message 42 to the application server 300. In response to this IIOP request message 42, the application server 300 starts executing a job 62 of job category A1. During the job 62, the application server 300 sends a database request message 43 to the database server 400. The database server 400 thus starts executing a job 63 of job category D1 in response to the database request message 43. Upon completion of this job 63, the database server 400 then sends a database response message 44 to the application server 300.

Subsequently, the application server 300 sends more database request messages 45, 47, and 49 to the database server 400, and the database server 400 returns response messages 46, 48, and 50 back to the application server 300 individually. During this course, the database server 400 executes jobs 64, 65, and 66 initiated by the database request messages 45, 47, and 49, respectively.

The database response message 50 permits the application server 300 to resume the pending job 62 of job category A1. Upon completion of this job 62, the application server 300 sends an IIOP response message 51 to the web server 200. The IIOP response message 51 permits the web server 200 to resume its pending job 61 of job category W1. Upon completion of this job 61, the web server 200 sends HTTP response message 52 to the terminal that originally issued the HTTP request message 41.

Figure 15:
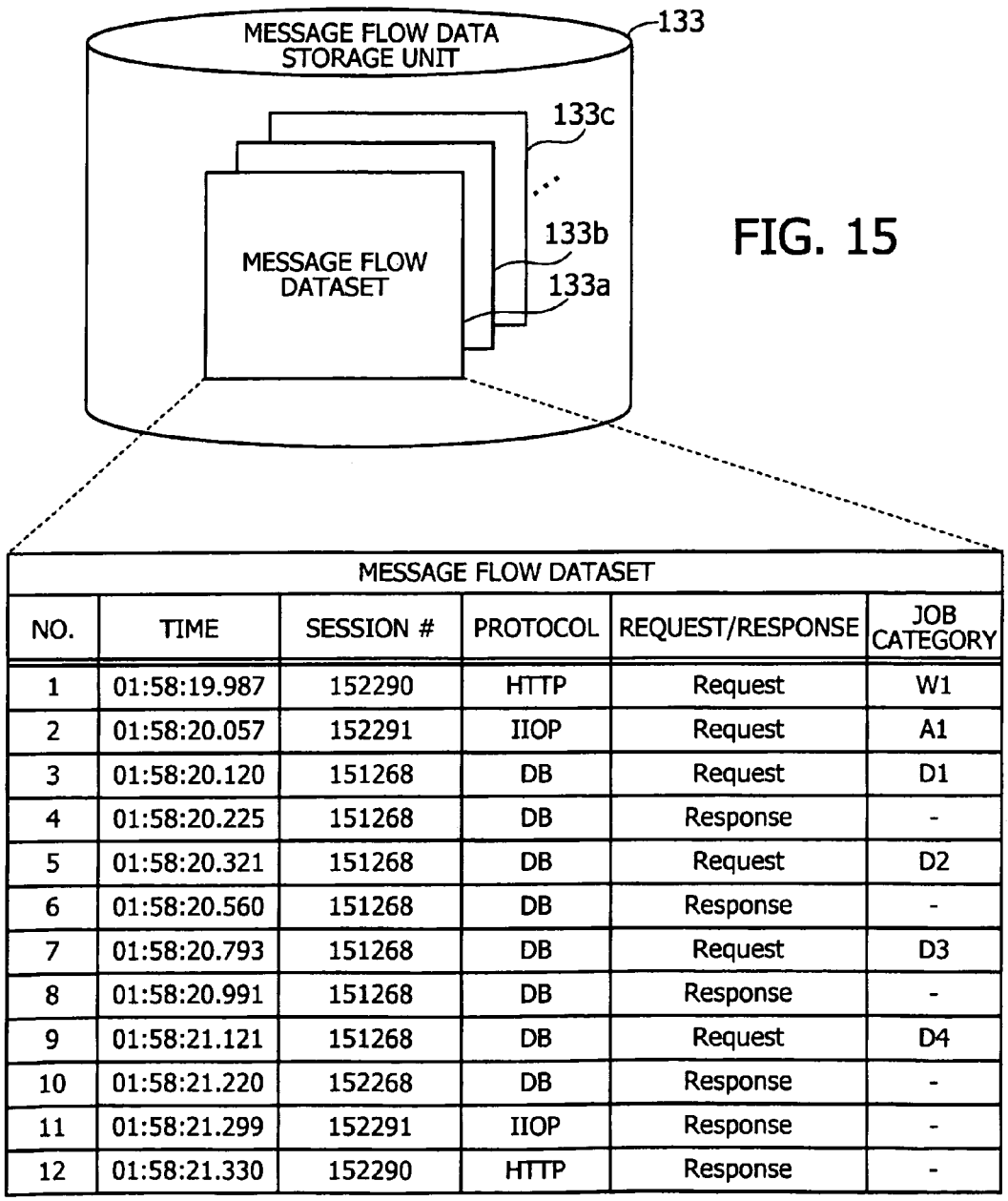
FIG. 15 illustrates an example data structure of a message flow data storage unit.

The message flow detection unit 132 stores the information describing message flows in the message flow data storage unit 133. This information, or message flow datasets, includes job category information. FIG. 15 illustrates an example data structure of a message flow data storage unit. The illustrated message flow data storage unit 133 stores a plurality of message flow datasets 133a, 133b, 133c, . . . corresponding to different transactions.

Specifically, each record of the message flow dataset 133a has multiple data fields named as follows: "Number" (No.), "Time," "Session Number" (Session#), "Protocol," "Request/Response," and "Job category." The data values arranged in the horizontal direction are associated with each other, thus forming a record describing one message.

The number field contains a number for distinguishing the record from others. The time field indicates the capture time of a communication packet of the message. The session number field contains a session number for distinguishing a specific session used to transmit the message. The protocol field indicates the protocol of the message. The request/response field indicates whether the message is a request or a response. The job category field contains a job category name indicating what type of job is requested by the message if it is a request message. For example, the illustrated message flow dataset 133a includes a record with the following values: "1" in number field, "01: 58: 19.987" in time field, "152290" in session number field, "HTTP" in protocol field, "Request" in request/response field, and "W1" in job category field.

It is noted here that the time field in the example dataset of FIG. 15 indicates the time with a precision on the order of milliseconds. The embodiments are, however, not limited by this specific example. The time may be recorded in smaller time units (e.g., microseconds). It is also noted, the session number field of message flow datasets contains only a minimum amount of information necessary for identifying a particular request-response pair, whereas the original session number includes more information as seen from the session number field 122c in FIG. 10. The rest of this description uses the term "session number" to refer to its simplified version used in the message flow dataset 133a.

Each message flow dataset contains communication time information of individual messages constituting a message flow, which was measured on the basis of captured packets. When a processing request message arrives at a certain tier, and it causes the tier to send a processing request message to a lower tier, the relationship of those events can be recognized as the successive events of message transmission in the message flow. For example, when the message flow includes a request message of protocol "IIOP" followed by a request message of protocol "Database," this means that the latter "Database" request message was issued in connection with the former "IIOP" request message. Also, when it is observed that an upper tier issues a request message to a lower tier and receives a response message within a certain period, request messages produced by the lower tier during that period are considered to be caused by the upper tier's request message.

The second embodiment captures IP packets flowing over the network, obtains information about transmitted messages from the captured packets, and produces message flow datasets each indicating a series of processing operations. Advantageously the proposed method imposes no extra burden on the system under observation, thus making it possible to observe the real behavior of the system. Also the second embodiment captures data at a single server, and with a single source of time stamps, thus being free from the problem of time-base differences among servers.

It is noted that the second embodiment assumes that the messages carry no particular information that associates them with each other. For this reason, the message flow detection unit 130 uses, for example, a model-matching technique with transaction models. As another possible implementation, messages may be configured to have some indication of their association. For example, the topmost server (web server 200) may place an identifier of an ongoing transaction in its messages, so as to indicate that those messages are transmitted as part of a specific transaction invoked by a received request message. In this case, the message flow detection unit 130 produces a message flow by extracting messages having the same identifier.

As mentioned above, the second embodiment creates message flow datasets by using the method proposed in Japanese Laid-open Patent Publication No. 2006-011683. The second embodiment, however, is not limited by the specific method described in the Japanese Laid-open Patent Publication No. 2006-011683. There are several other methods to obtain the exact transmission and reception times of each message flowing among a plurality of tiers related to individual transactions.

For example, one method uses log files of messages transmitted and received by the web server 200, application server 300, and database server 400 constituting a three-tier Web system. In this method, each server 200, 300, and 400 associates a received message with messages produced in connection with the received message and stores information on such association of messages as log records in an HDD or other storage device. The analysis server 100 collects those log records from the web server 200, application server 300, and database server 400.

The above-described alternative method relies on the web server 200, application server 300, and database server 400 in providing association between a received request message and its consequent request messages to low-tier servers. This makes it easier for the analysis server 100 to find upper-tier messages and their associated lower-tier messages in a single transaction, and to create message flow datasets. To apply this method, however, it is preferable that the internal clocks of the web server 200, application server 300, and database server 400 are precisely synchronized with each other.

Figure 16:
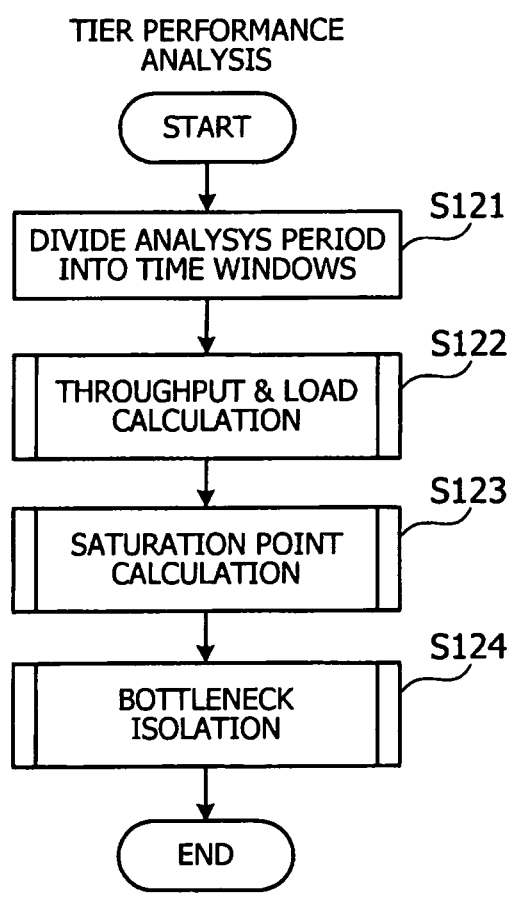
FIG. 16 is a flowchart illustrating an example procedure of tier performance analysis.

When every possible message flow is detected from messages in the message data storage unit 122 and made available in the message flow data storage unit 133, the analysis server 100 then proceeds to performance analysis of each tier constituting the web three-tier system. FIG. 16 is a flowchart illustrating an example procedure of a tier performance analysis. Note that this procedure analyzes a specific tier that is already selected. Each step of FIG. 16 is described below in the order of step numbers.

(Step S121) The data compilation unit 141 divides a given analysis period with a sufficiently fine granularity. This "analysis period" refers to a time period in which the capturing of IP packets has been conducted. The currently selected time series data in the capture data storage unit 112 has been produced from those IP packets. The dividing of the analysis period produces a plurality of time windows. The saturation point determination unit 144 then stores details of each time window in the time window data storage unit 142.

(Step S122) The data compilation unit 141 calculates throughput and load values in each time window. Details of this step S122 will be described later with reference to FIG. 21.

(Step S123) The saturation point determination unit 144 calculates a saturation point. Details of this step S123 will be described later with reference to FIG. 27.

(Step S124) The analyzing unit 145 determines whether the currently selected tier is a performance bottleneck. Details of this step S124 will be described later with reference to FIG. 28. The analyzing unit 145 then exits from the present process of tier performance analysis.

The following sections (b1) to (b4) will describe each step of FIG. 16 in greater detail.

(b1) Time Window Definition

The data compilation unit 141 divides a given analysis period into a plurality of time windows with a sufficiently fine granularity. In actual implementations of the second embodiment, it is considered appropriate to select a sufficiently small step size for the time windows since the load may vary in a very short time comparable to the average processing time of jobs.

Figure 17:
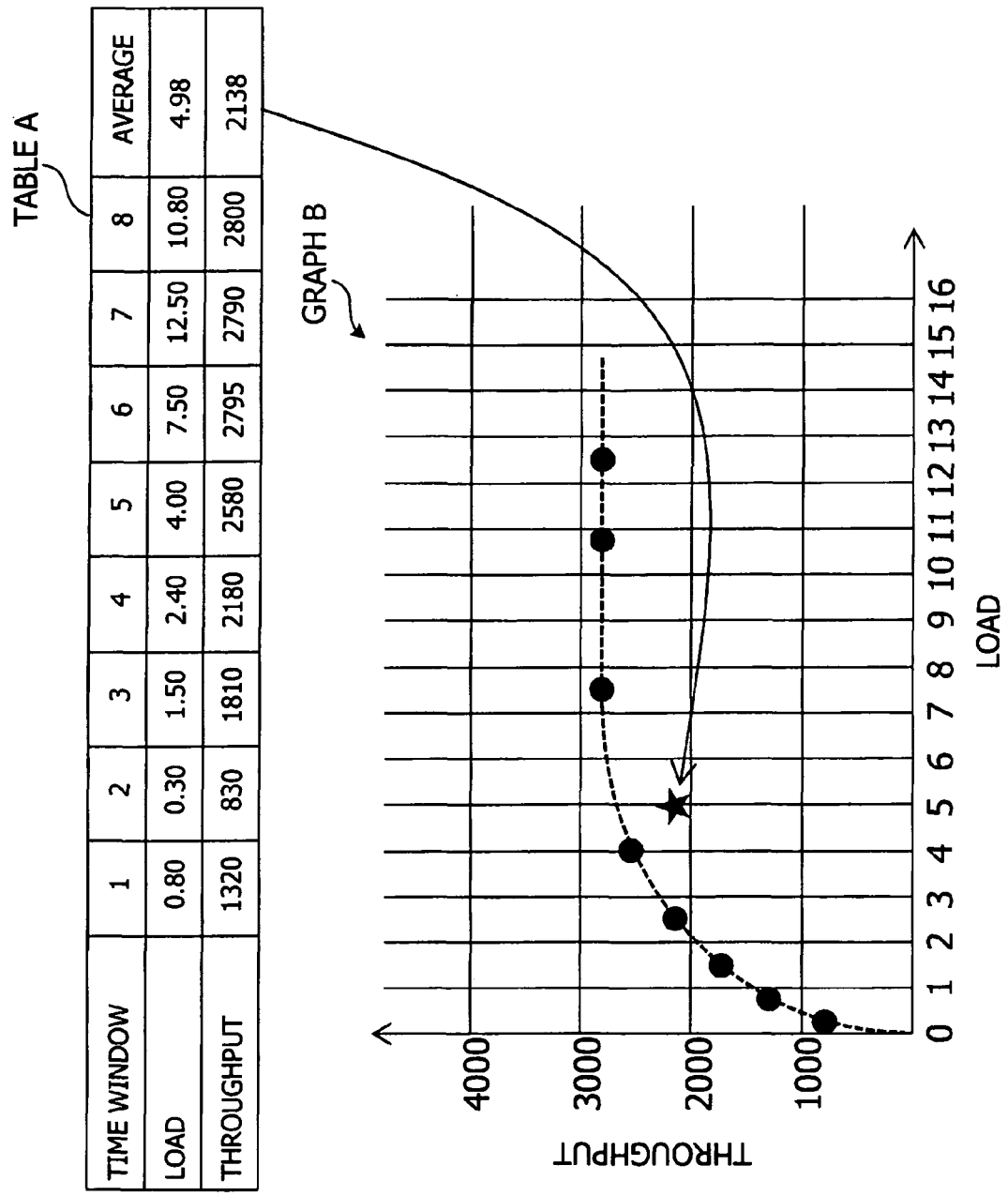
FIG. 17 illustrates a relationship between load and throughput.

Generally, the throughput varies with load as seen in FIG. 17. Specifically, FIG. 17 illustrates a relationship between load and throughput. The upper half gives an example of load and throughput values in tabular form (Table A), where the time windows have a sufficient granularity. The lower half illustrates a graph of load versus throughput (Graph B).

As can be seen from FIG. 17, the load values exhibit significant variations when the time window length is sufficiently small. As an example of longer time windows, suppose that eight time windows. #1 to #8 in FIG. 17A are combined into a single time window. The load value of this new time window is calculated as an average of those in the original windows, which is indicated by the star symbol in FIG. 17. As a result of this averaging, however, the analysis would overlook the significant variations of load values and thus fail to recognize the true relationship between the load and throughput. To avoid this problem, an appropriate step size of time windows is selected in such a way that the load does not change so much within a single time window. Preferably, the step size is as small as the average job processing time. For example, the length of time windows is set to 100 ms.

Figure 18:
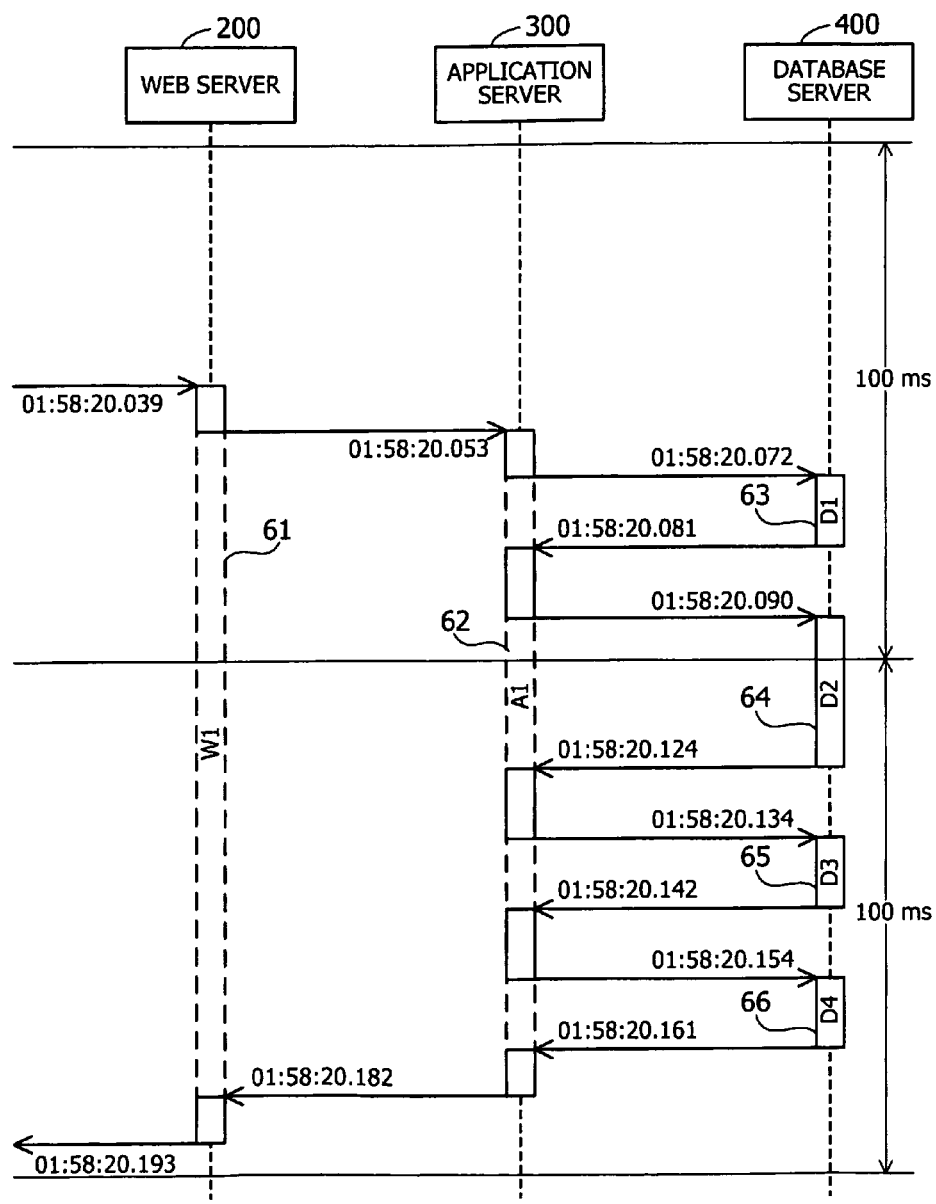
FIG. 18 illustrates an example of time windows.

FIG. 18 illustrates an example of time windows. In the example of FIG. 18, the analysis period is divided into a plurality of time windows with a length of 100 ms. According to the second embodiment, the time window length is previously set as a configuration parameter of the data compilation unit 141. As can be seen from FIG. 18, each job execution period is distributed at least one of those time windows. The resulting time series data of each time window is short in length.

Figure 19:
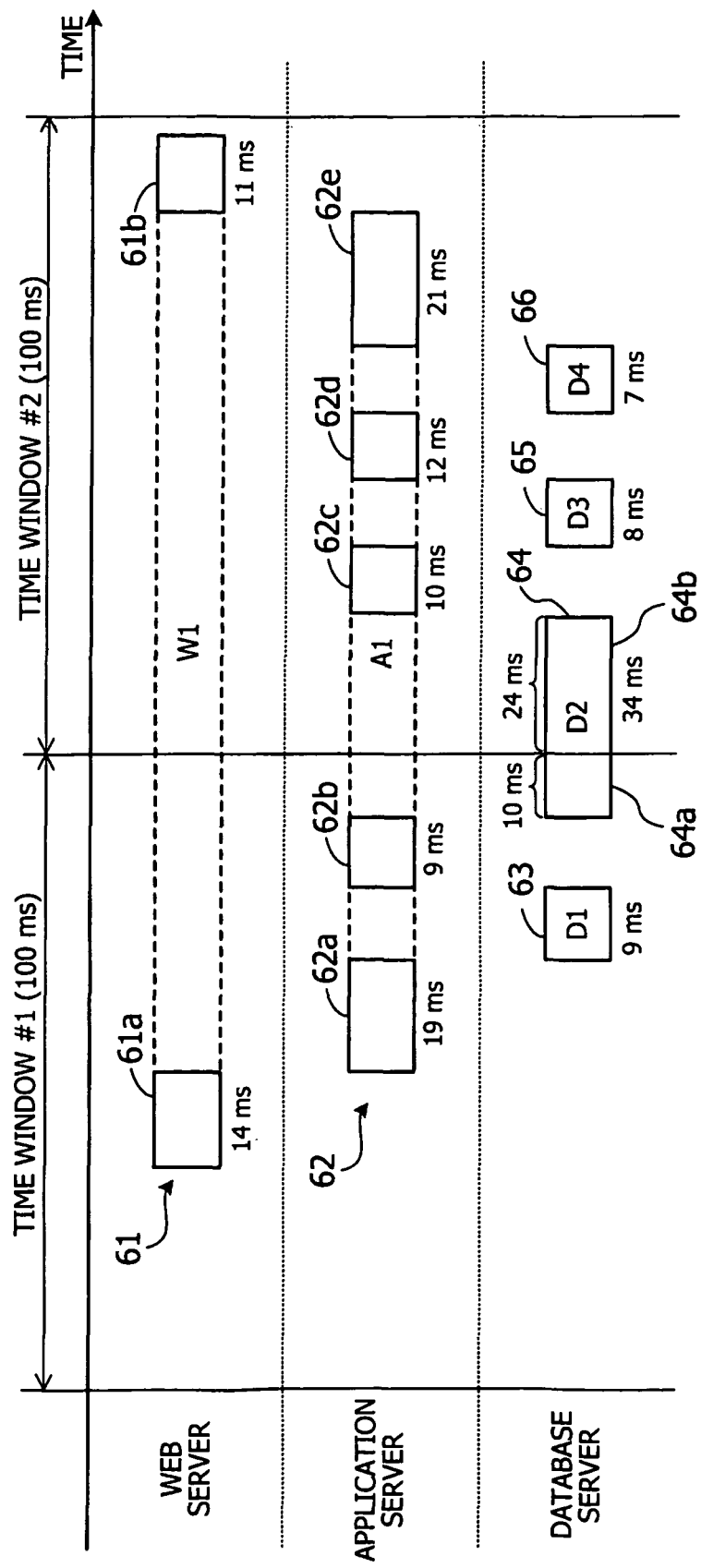
FIG. 19 illustrates several examples of how execution periods are distributed to successive time windows.

FIG. 19 illustrates several examples of how execution periods are distributed among successive time windows. The web server 200 executes a job 61 in two discrete execution periods 61a and 61b. The first execution period 61a belongs to time window #1 since it is entirely contained in that window. The second execution period 61b belongs to time window #2 since it is entirely contained in that window period.

The application server 300, on the other hand, executes its job 62 in five discrete execution periods 62a, 62b, 62c, 62d, and 62e. The first and second execution periods 62a and 62b belong to time window #1 since they are entirely contained in that window period. The third to fifth execution periods 62c, 62d, and 62e belong to time window #2 since they are entirely contained in that window period.

The database server 400 executes four jobs 63 to 66, each in a single continuous execution period. The first job 63 belongs to time window #1 since it is executed within that window period. The third and fourth jobs 65 and 66 belong to time window #2 since they are both executed within that window period. The second job 64, on the other hand, is executed across time window #1 and time window #2. As in this example, an execution period may extend beyond the boundary of time windows, in which case the execution period of that job belongs to a plurality of time windows. This type of execution period will be divided into two or more periods such that each divided period belongs to a different time window. Regarding the job 64, its execution period is divided into two portions, a first execution period 64a belonging to time window #1 and a second execution period 64b belonging to time window #2. These two divided execution periods 64a and 64b are thus distributed to separate time windows.

Figure 20:
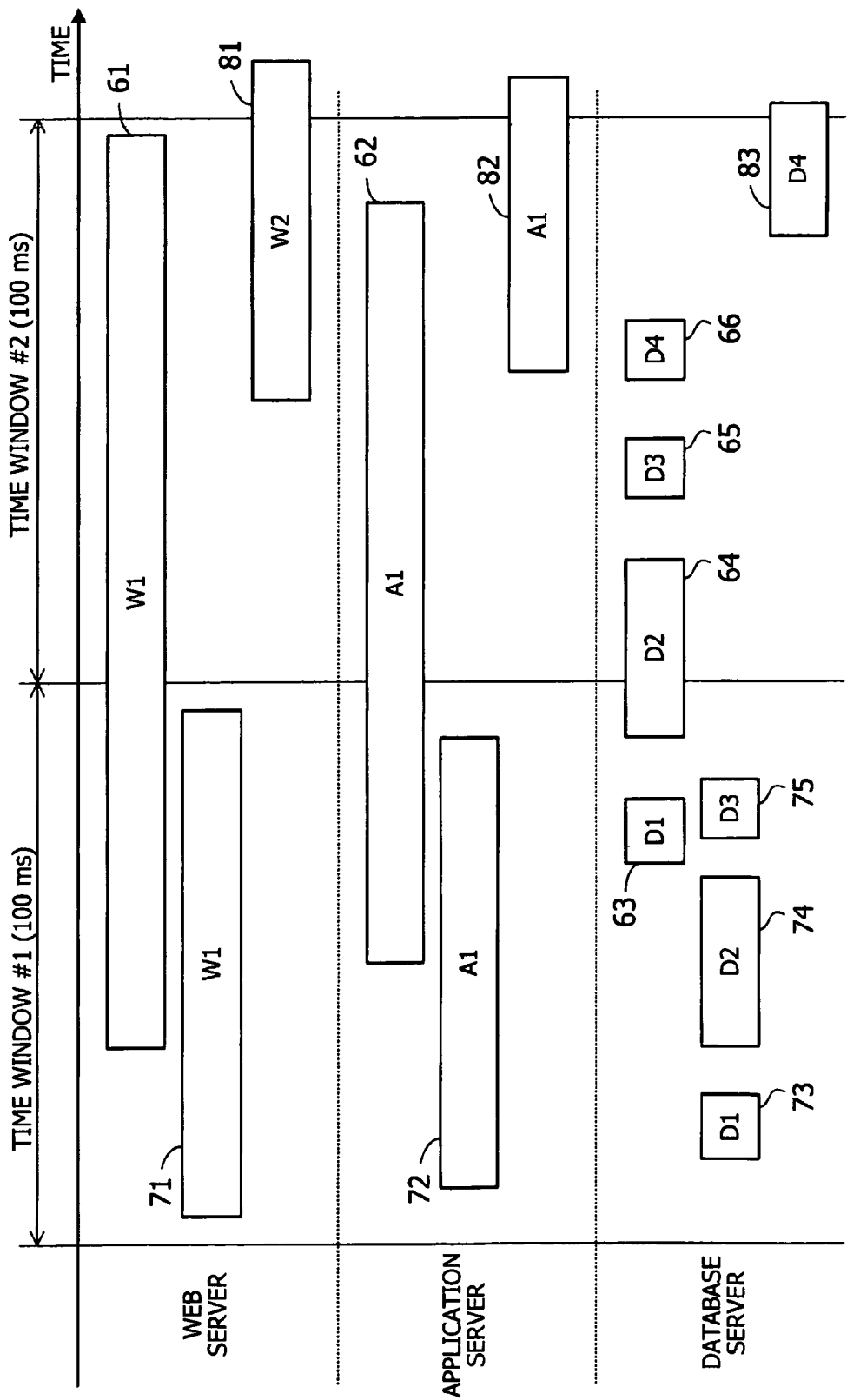
FIG. 20 illustrates an example how processes are executed in parallel.

The foregoing examples of FIG. 18 and FIG. 19 illustrate a series of processing operations initiated by a single transaction. The servers, however, may execute a plurality of transactions in a parallel fashion. FIG. 20 illustrates an example how processes are executed in parallel. In this example of FIG. 20, the system is executing three transactions in parallel during the period of time windows #1 and #2. Specifically, jobs 61 to 66 accomplish one transaction. Jobs 71 to 75 accomplish another transaction. Jobs 81 to 83 accomplish yet another transaction. The letters seen in each box indicate the category of the job. The execution periods of those jobs in parallel transactions are distributed across time windows, depending on which time window contains which execution period, similarly to the case of FIG. 19.

Figure 21:
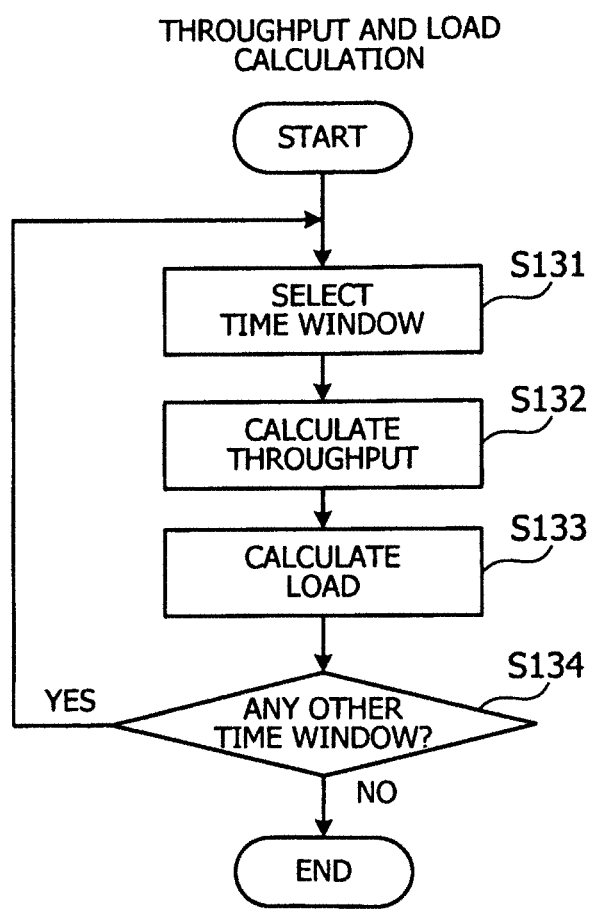
FIG. 21 is a flowchart illustrating an example procedure of throughput and load calculation.

The calculation of throughput and load will now be described in detail below. FIG. 21 is a flowchart illustrating an example procedure of calculating throughput and load. Each step of FIG. 21 is described below in the order of step numbers.

(Step S131) The data compilation unit 141 selects a time window that has not been subjected to the calculation. For example, the data compilation unit 141 selects the entries of time windows in the time window data storage unit 142 one by one, from the topmost entry to the endmost entry.

(Step S132) The data compilation unit 141 calculates a throughput value in the selected time window. For example, the data compilation unit 141 calculates a weighted sum of throughput values of individual jobs depending on their respective job categories, thereby outputting an accurate throughput value of the selected time window in which a plurality of jobs with different processing workloads are handled. For the purpose of weighting, the data compilation unit 141 uses normalized per-job throughput values determined for different job categories, as will be described in a separate section. The data compilation unit 141 stores the calculated throughput value in the time window data storage unit 142, for example.

(Step S133) The data compilation unit 141 calculates a load in the selected time window. For example, the data compilation unit 141 first calculates a sum of processing times in the selected time window, for the jobs executed by the server in the tier of interest. The data compilation unit 141 then divides the sum by the time window length to obtain a load value in the time window. This load value thus represents an average load in a given time window. The data compilation unit 141 stores the calculated load value in the time window data storage unit 142, for example.

(Step S134) The data compilation unit 141 determines whether there are any other time windows that have not been subjected to the calculation. For example, the data compilation unit 141 checks the remaining entries of time windows in the time window data storage unit 142. If the last entry has already been reached, the data compilation unit 141 determines that there are no pending time windows. When a pending time window is found, the data compilation unit 141 returns to step S131 to continue the process. When there is no pending process, the data compilation unit 141 exits from this process of throughput and load calculation.

Figure 22:
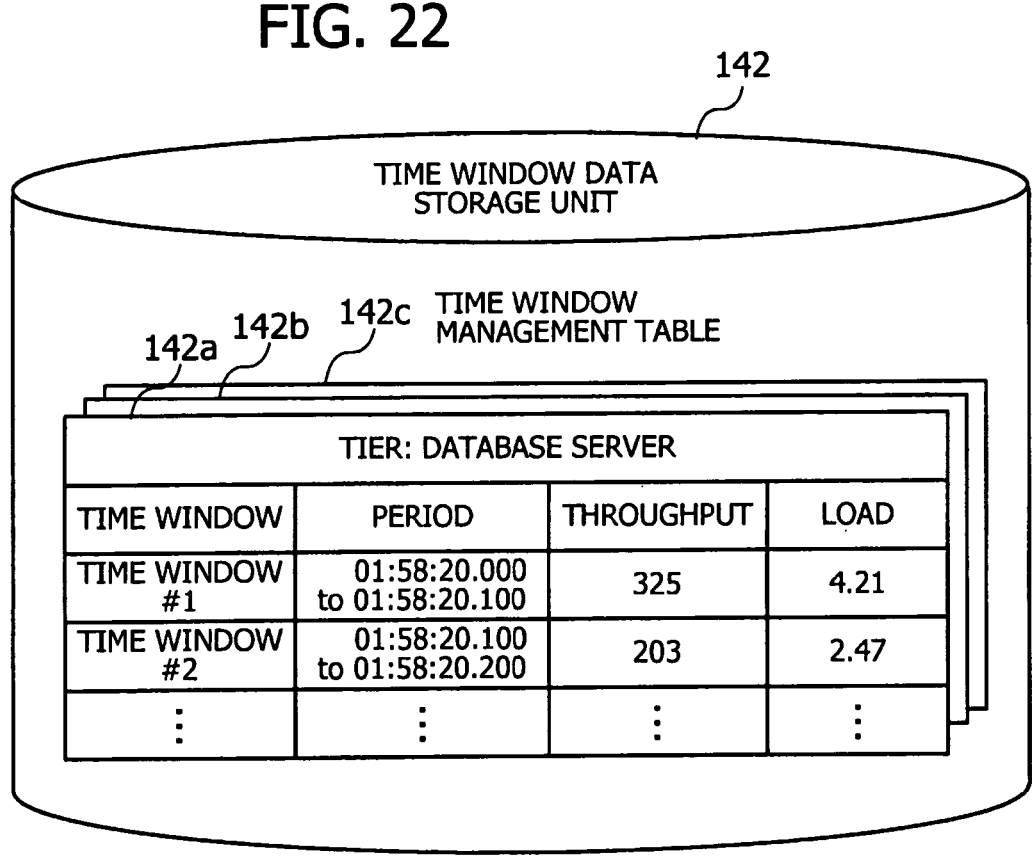
FIG. 22 illustrates an example data structure of a time window data storage unit.

FIG. 22 illustrates an example data structure of a time window data storage unit. The illustrated time window data storage unit 142 contains a plurality of time window management tables 142a, 142b, and 142c corresponding to different tiers. For example, the time window management table 142a corresponds to the database tier to which the database server 400 belongs.

The time window management table 142a has four data fields titled "Time Window," "Period," "Throughput," and "Load." The time window field contains the name of a time window. The period field provides details of the period of that time window. The throughput and load fields respectively contain throughput and load values calculated for the time window.

(b2) Calculation of Throughput and Load Values

This section will describe in detail how the throughput and load values are calculated.

(i) Calculation of Throughput Values

The throughput values are calculated as follows. The saturation point determination unit 144 executes this calculation for each individual time window, on the basis of processing times of the jobs that belong to that time window. During this course, the saturation point determination unit 144 applies appropriate weighting coefficients to those jobs, taking into consideration the difference between job categories, thereby calculating a normalized throughput.

The throughput normalization offers several advantages as will be described below. According to second embodiment, the analysis period is subdivided into short time windows to observe the relationships between load and throughput. Without normalization, the performance analysis could fail to determine correct relationships between load and throughput because the following two factors introduce some disturbance into the observation of those two variables, which degrades the credibility of the bottleneck isolation based on load-throughput correlation. The factors are:

1. Differences in hardware resource consumption among dissimilar kinds of jobs
2. Differences in hardware resource consumption among individual jobs of the same kind The former factor is particularly dominant in terms of the absolute amount of differences, since the shorter time windows mean smaller chances for different kinds of jobs to run together in a single time window. The latter factor, on the other hand, is expected to have a somewhat averaged distribution (e.g., normal distribution or the like) because of the similarity of jobs.

In consideration of the above, the second embodiment is configured to normalize the differences in hardware resource consumption among dissimilar kinds of jobs by using a set of data describing average processing time of each job category, which has been measured in a workload test. The second embodiment copes with the former factor in this way and can thus obtain correct throughput values. To achieve the normalization, the second embodiment determines how to weight different job categories. The information necessary for this determination is previously stored in the normalized throughput value storage unit 143.

FIG. 23 illustrates an example data structure of a normalized throughput value storage unit. The illustrated normalized throughput value storage unit 143 contains a normalized throughput value table 143a. This normalized throughput value table 143a has data fields titled "Job Category," "Average Processing Time in Low Workload Conditions," and "Normalized Throughput Value."

Specifically, the job category field of each table entry contains a job category name of jobs executed by a server in the web three-tier system. The next data field titled "Average Processing Time in Low Workload Conditions" indicates an average processing time of the corresponding job category, which assumes that a server executes a job of that category under low workload conditions. In the example of FIG. 23, the average processing times are represented in units of ms. For example, the normalized throughput value table 143a stores average processing times previously measured by an administrator of the web three-tier system when the system workload is low.

The normalized throughput value field contains a per-job throughput value which is normalized for each corresponding job category in the way described below. For example, one representative job category is selected for each tier. In the example of FIG. 23, job category W1 is selected as the representative job category of jobs executed by the web server 200. Likewise, job category A1 is selected as the representative job category of jobs executed by the application server 300, and job category D1 is selected as the representative job category of jobs executed by the database server 400. Those representative job categories are given a normalized per-job throughput value of 1.00.

On the other hand, the normalized per-job throughput values of non-representative job categories are calculated as the ratio of their average processing time in low workload conditions to that of the representative job category for the same tier. For example, the average processing time of job category W2 in low workload conditions is 0.604 times that of the representative job category W1 (i.e., 13.4 ms/22.2 ms=0.604). Accordingly the normalized per-job throughput value of job category W2 is set to 0.604.

With those normalized per-job throughput values, the data compilation unit 141 calculates an average throughput for each of the subdivided time windows. More specifically, the data compilation unit 141 weights throughput values on the basis of the average processing time of different job categories which were measured in low workload conditions. For example, the data compilation unit 141 first gives a base score of 1 to each job's throughput (from request to response). The data compilation unit 141 then calculates weighted scores of the executed jobs by weighting their base scores with relevant normalized per-job throughput values. Further, in the case where a job is executed across two or more time windows, the data compilation unit 141 allocates the score of that job among those time windows in proportion to each time window's share in the entire execution period of the job. In the case where a job is executed within a single time window, the whole score of that job is allocated to that time window. The data compilation unit 141 then adds the distributed scores to the respective throughput values of time windows.

The following example demonstrates how the throughput is calculated in the two time windows illustrated in FIG. 19. As seen in FIG. 19, the execution of jobs 61 to 66 involves interactions between tiers, and when a first tier delegates its job to a second tier, the first tier waits for a response from the second tier. Such response waiting times should be excluded from the execution period of this job in the first tier. Only the remaining, pure execution periods are subjected to the calculation of throughput.

Referring first to the tier of web server 200 in FIG. 19, the illustrated job 61 has two separate execution periods 61a and 61b, of which only the first execution period 61a belongs to time window #1. The second execution period 61b, on the other hand, belongs to time window #2. The first execution period 61a has a length (processing time) of 14 ms, while the second execution period 61b has a length of 11 ms. Thus the total processing time of this job 61 is 25 ms. The job 61 is categorized in job category W1, whose normalized per-job throughput value is 1.00 as seen in the normalized throughput value table 143a of FIG. 23. Accordingly, this score 1.00 of normalized throughput is allocated among time window #1 and time window #2 in proportion to the ratio of their processing times. More specifically, time window #1 earns a score of 0.56 (=1.00×14/25), while time window #2 earns a score of 0.44 (=1.00×11/25). Those two scores are added to the respective throughput values of time windows #1 and #2 for the tier of the web server 200.

Referring next to the tier of the application server 300 in FIG. 19, the job 62 is executed in intermittent execution periods 62a, 62b, 62c, 62d, and 62e. Of those five periods, only the first two execution periods 62a and 62b belong to time window #1, while the remaining three execution periods 62c, 62d, and 62e belong to time window #2. The first execution period 62a is 19 ms, the second execution period 62b is 9 ms, the third execution period 62c is 10 ms, the fourth execution period 62d is 12 ms, and the fifth execution period 61e is 21 ms in length. Thus the total processing time of this job 62 amounts to 71 ms. The job 62 is categorized in job category A1, whose normalized per-job throughput value is 1.00 as seen in the normalized throughput value table 143a of FIG. 23. Accordingly, this score 1.00 of normalized throughput is allocated among time window #1 and time window #2 in proportion to the ratio of their processing times. More specifically, time window #1 earns a score of 0.394 (=1.00× (19+9)/71), while time window #2 earns a score of 0.606 (=1.00×(10+12+21)/71). Those two scores are added to the respective throughput values of time windows #1 and #2 for the tier of the application server 300.

Referring lastly to the tier of the database server 400 in FIG. 19, four jobs 63 to 66 are executed. The first job 63 entirely belongs to time window #1 and is 9 ms in length. Further, the first job 63 is categorized in job category D1, whose normalized per-job throughput value is 1.00 as seen in the normalized throughput value table 143a of FIG. 23. Accordingly, this score 1.00 is added to the throughput value of time window #1 for the tier of the database server 400.

The second job 64 is executed across two time windows in the example of FIG. 19. The leading execution period 64a belongs to time window #1, and the trailing execution period 64b belongs to time window #2. The leading execution period 64a has a length (processing time) of 10 ms, while the trailing execution period 64b has a length of 24 ms. Thus the total processing time of this job 64 amounts to 34 ms. The job 64 is categorized in job category D2, whose normalized per-job throughput value is 3.72 as seen in the normalized throughput value table 143a of FIG. 23. Accordingly, this score 3.72 of normalized throughput is distributed to time window #1 and time window #2 in proportion to the ratio of their processing times. More specifically, time window #1 earns a score of 1.09 (=3.72×10/34), while time window #2 earns a score of 2.63 (=3.72×24/34). Those two scores are added to the respective throughput values of time windows #1 and #2 for the tier of the database server 400.

In the example of FIG. 19, the third job 65 entirely belongs to time window #2 and is 8 ms in length. This job 65 is categorized in job category D3, whose normalized per-job throughput value is 0.796 as seen in the normalized throughput value table 143a of FIG. 23. Accordingly, the whole score 0.796 is added to the throughput value of time window #2 for the tier of the database server 400. Likewise, the fourth job 66 entirely belongs to time window #2 and is 7 ms in length in the example of FIG. 19. This job 66 is categorized in job category D4, whose normalized per-job throughput value is 3.19 as seen in the normalized throughput value table 143a of FIG. 23. Accordingly, the whole score 3.19 is added to the throughput value of time window #2 for the tier of the database server 400.

From the above scores in the tier of the database server 400, the throughput in time window #1 is calculated to be 2.09, which is the total score of the whole job 63 and leading execution period 64a. The throughput in time window #2 is calculated to be 6.616, which is the total score of the trailing execution period 64b and whole jobs 65 and 66.

When a plurality of transactions are running concurrently in multiple tiers as illustrated in FIG. 20, the scores of jobs relating those transaction are added up for each time window, and for each different tier. The resulting total scores are output as the throughput value of each time window and each tier.

Figure 24:
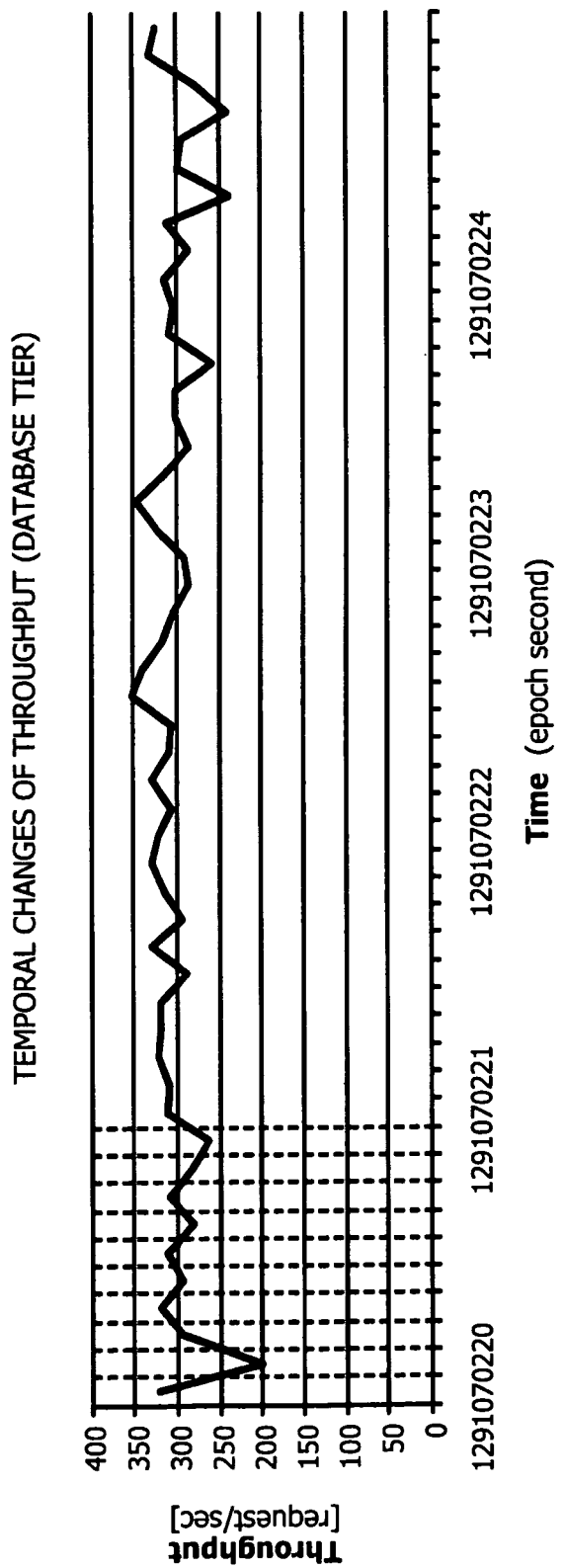
FIG. 24 depicts an example of temporal changes of throughput.

The above-described throughput values in successive time windows indicate temporal changes of the throughput. FIG. 24 depicts an example of such temporal changes of throughput. Specifically, FIG. 24 is a graph that indicates how the throughput of the database server 400 varies with time. The horizontal axis of this graph represents time, and the vertical axis represents throughput. Each tick of the horizontal axis corresponds to one time window.

(ii) Calculation of Load Values

The load values are calculated as follows. In the context of the second embodiment, the term "load" refers to the average number of jobs executed concurrently in a given time window. This load can be calculated as follows.

[Load]=[Total job processing time in time window]/[Time window length]

Here the "job processing time" in a tier only includes the period when the tier actually processes its jobs. It is noted that a tier other than the bottommost tier may delegate a part of its job to a lower tier and waits for a response from the lower tier. Such response waiting times have to be excluded from the job processing time of that tier.

Referring again to the example of FIG. 19, the load values of each tier are calculated below. In the tier of the web server 200, the load in time window #1 is 0.14 (=14/100), and that of time window #2 is 0.11 (=11/100). In the tier of the application server 300, the load in time window #1 is 0.28 (=(19+9)/100), and that of time window #2 is 0.43 (=(10+12+21)/100). In the tier of the database server 400, the load in time window #1 is 0.19 (=(9+10)/100), and that in time window #2 is 0.39 (=(24+8+7)/100).

The same calculation method applies to the cases where a plurality of transactions are running concurrently as in FIG. 20. That is, the processing times of a plurality of transaction jobs are added up for each time window, regardless of what kind of jobs they are. The resulting sum is then divided by the time window length.

Figure 25:
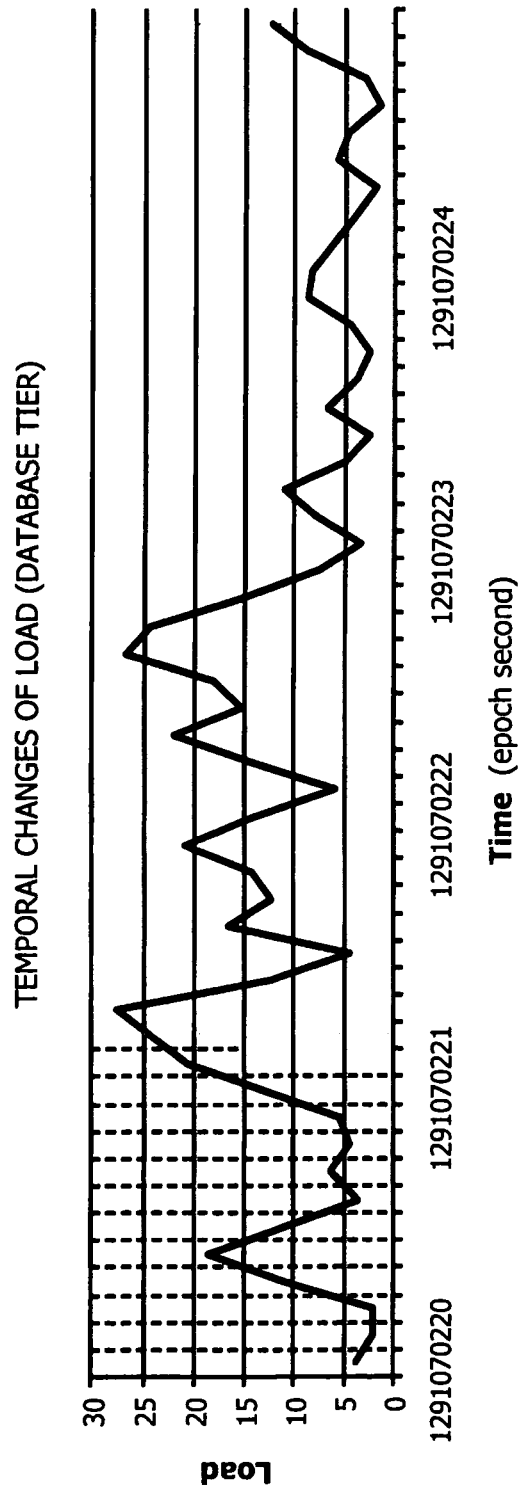
FIG. 25 depicts an example of temporal changes of load.

The load values calculated above for successive time windows form a time series indicating temporal changes of the load. FIG. 25 depicts an example of such temporal changes of load. Specifically, FIG. 25 is a graph that indicates how the load of the database server 400 varies with time. The horizontal axis of this graph represents time, and the vertical axis represents load. Each tick of the horizontal axis corresponds to one time window.

(b3) Calculation of Saturation Point

This section will describe a detailed process of calculating a saturation point. The saturation point determination unit 144 dynamically determines a saturation point depending on the relationship between throughput and load. For example, the saturation point determination unit 144 investigates the relationship between throughput values and load values calculated for time windows and determines a saturation point at which the throughput stops increasing with load.

Figure 26:
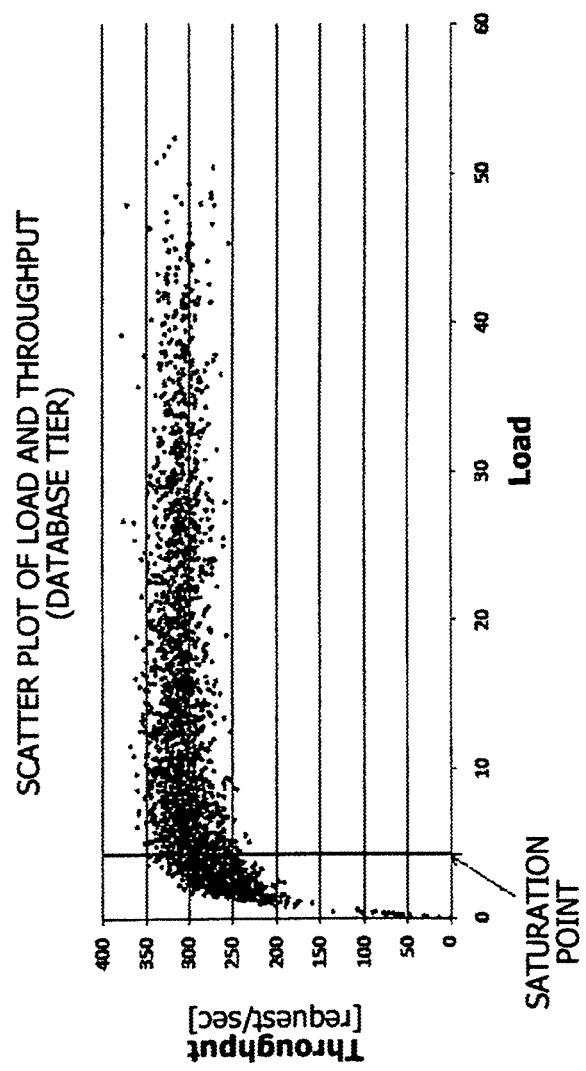
FIG. 26 is a scatter plot illustrating example relationships between load and throughput.

The presence of such a point of throughput saturation can be recognized without difficulty by producing a scatter plot representing the distribution of load-throughput pairs observed in different time windows. FIG. 26 is a scatter plot illustrating example relationships between load in the horizontal (X) axis and throughput in the vertical (Y) axis. The throughput and load of each time window is plotted as a point on this diagram. As can be seen from the scatter plot of FIG. 26, the throughput increases to some extent along with an increase of load, but stops increasing when the load reaches a certain level. The saturation point determination unit 144 determines this boundary line of the load as a saturation point.

Figure 27:
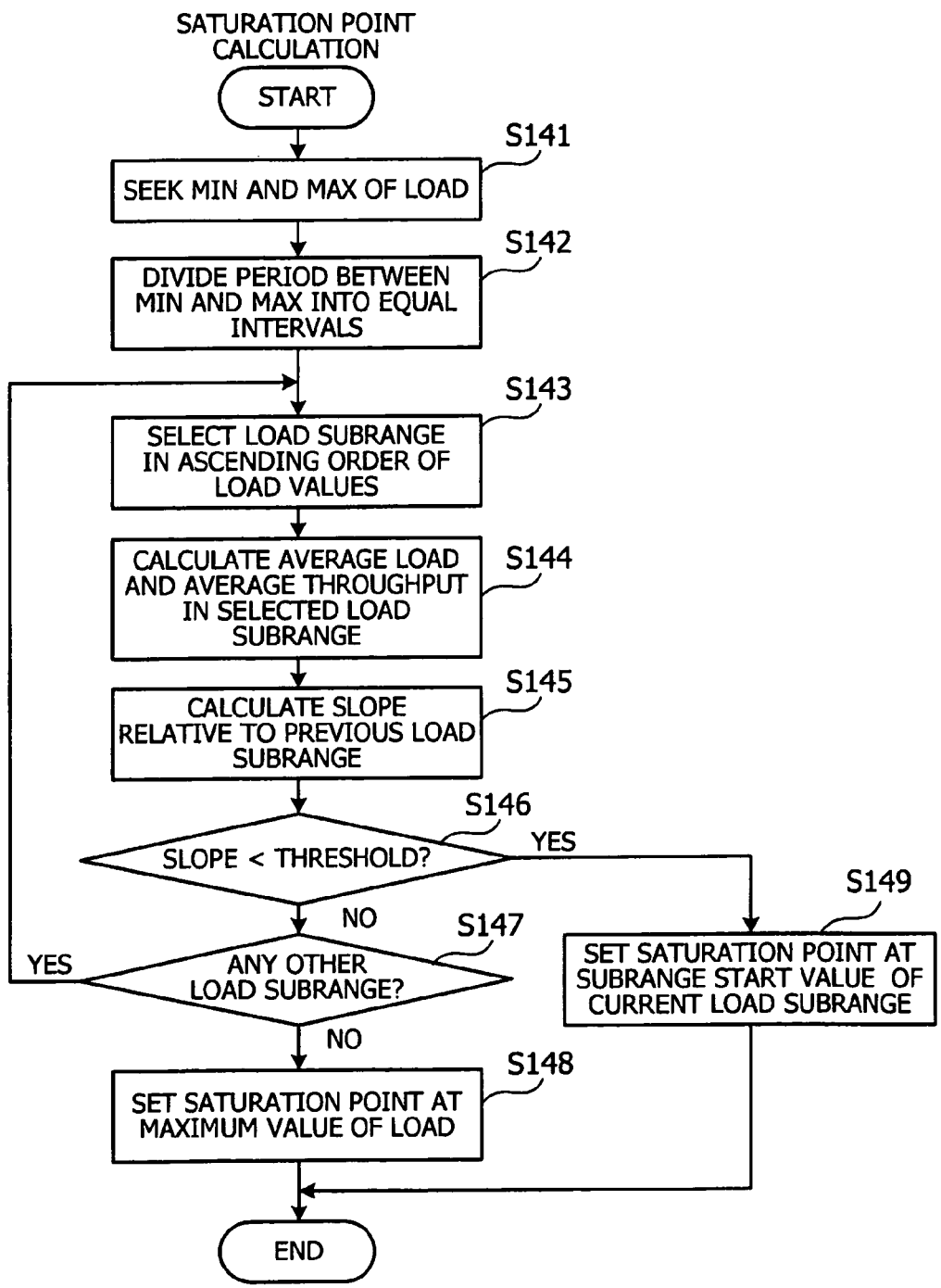
FIG. 27 is a flowchart illustrating an example procedure of saturation point calculation.

FIG. 27 is a flowchart illustrating an example procedure of saturation point calculation. Each step of FIG. 27 is described below in the order of step numbers.

(Step S141) The saturation point determination unit 144 seeks the minimum and maximum load values. For example, the saturation point determination unit 144 scans the load field of the time window management table of the currently selected tier, thereby extracting minimum and maximum load values.

(Step S142) The saturation point determination unit 144 subdivides the range between the extracted minimum value and maximum value into equal small intervals. The resulting small sections of load are referred to herein as "load subranges." Each load subrange is delimited by a lower limit value and an upper limit value. The former is referred to herein as a "subrange start value," and the latter is referred to herein as a "subrange end value."

For example, the saturation point determination unit 144 subdivides the range between minimum and maximum into a predetermined number (e.g., 100) of load subranges. Alternatively, the saturation point determination unit 144 may subdivide the same range into a variable number of fixed-length subranges (e.g., 0.1). For example, when the minimum load is 0 and the maximum load is 50, the range between 0 to 50 is subdivided into 100 subranges with a step size of 0.5.

(Step S143) The saturation point determination unit 144 selects a load subrange in ascending order of load values.

(Step S144) The saturation point determination unit 144 extracts time windows whose load values fall in the selected load subrange and calculates an average load and an average throughput in the extracted time windows.

(Step S145) The saturation point determination unit 144 calculates an increase rate (slope) of the throughput with respect to the load by comparing the currently selected load subrange with the previously selected load subrange (adjacent to the current one). Here the throughput slope is calculated by, for example, dividing the variation of average throughput relative to the immediately preceding load subrange by the variation of average load relative to the same. For example, the slope $\delta_i$ at the i-th selected load subrange is expressed as follows:

[Expression 1]

$$\delta_i = \begin{cases} \overline{tp_i}/\overline{ld_i}: & i = 1 \\ \dfrac{\overline{tp_i} - \overline{tp_{i-1}}}{\overline{ld_i} - \overline{ld_{i-1}}}: & 1 < i \leq 100 \end{cases} \quad (1)$$

$\overline{ld_i}$: average load $\overline{tp_i}$: average throughput (Step S146) The saturation point determination unit 144 determines whether the slope calculated at step S145 is smaller than a given threshold. This threshold may be obtained by, for example, multiplying the slope $\delta_1$ at a load subrange where the average load is minimum by a specified coefficient (e.g., 0.2) smaller than 1. If the slope is smaller than the given threshold, the saturation point determination unit 144 advances to step S149. If the slope is equal to or greater than the given threshold, the saturation point determination unit 144 advances to step S147.

(Step S147) The saturation point determination unit 144 determines whether there are any other load subranges that have not been subjected to the above processing. When such a pending load subrange is found, the saturation point determination unit 144 returns to step S143. When it is found that all load subranges have been finished, the saturation point determination unit 144 proceeds to step S148.

(Step S148) This step is reached because the slope is equal to or greater than the threshold in every load subrange. Accordingly the saturation point determination unit 144 sets a saturation point to the maximum value of load obtained at step S141 and terminates the process of saturation point calculation.

(Step S149) The saturation point determination unit 144 sets a saturation point to the subrange start value of the currently selected load subrange.

Suppose, for example, that the slope at the i-th load subrange does not fall below the threshold until the tenth subrange is reached, where the range of load between 0 to 50 is divided into 100 subranges with a step size of 0.5. The tenth load subrange ranges from 4.5 to 5.0, and the subrange start value, 4.5 (=0.5×9), is selected as the saturation point. As can be seen from this example, the saturation point determination unit 144 scans the subdivided load subranges, from the lowest to the highest, to determine whether the slope falls below a specified threshold (e.g., $0.2\delta_1$). When the slope does not fall below the threshold until the i-th subrange is reached, the subrange start value of the i-th load subrange is selected as the saturation point.

(b4) Bottleneck Isolation

Based on the saturation point selected above, a process of bottleneck isolation is executed in the way described below. Briefly, the analyzing unit 145 evaluates spare capacity of each tier from the ratio of time windows whose load values do not exceed the saturation point. When this ratio of a particular tier is smaller than a given value, the analyzing unit 145 recognizes the tier as a performance bottleneck of the system.

Referring again to the scatter plot of FIG. 26, each dot corresponds to a particular time window. The plotted time windows are divided into two groups, i.e., one group having load values below the saturation point, and the other group having load values exceeding the saturation point. In the former group of time windows, the tier is considered to have some amount of room in its processing capacity. The analyzing unit 145 therefore calculates the ratio of this group of time windows to the entire set of time windows, as an indicator of the tier's spare capacity. Suppose, for example, that the given time-series data is 180 seconds in length, which is divided into 1800 time windows with a step size of 100 ms. In the case where 385 out of 1800 time windows have small load values below the saturation point, it means that the tier had a spare capacity in 21.4% (=385/1800×100) of the time windows.

According to the second embodiment, the analyzing unit 145 has a first threshold to compare with the ratio of time windows whose load values do not exceed the saturation point. If the ratio of such time windows is smaller than the first threshold, the analyzing unit 145 determines that the tier is in a full-saturation state. In other words, the workload exceeds the tier's processing capacity. The analyzing unit 145 thus sends a notice that indicates the presence of a bottleneck in the tier in full-saturation state.

According to the second embodiment, the analyzing unit 145 also has a second threshold to compare with the ratio of time windows whose load values do not exceed the saturation point. The second threshold is higher than the first threshold noted above. If the ratio of such time windows is smaller than the second threshold, the analyzing unit 145 determines that the tier is in a quasi-saturation state. In other words, the tier is facing a workload partly exceeding the tier's processing capacity. The multi-tier system could experience a bottleneck when a plurality of tiers simultaneously fall into the quasi-saturation state.

Figure 28:
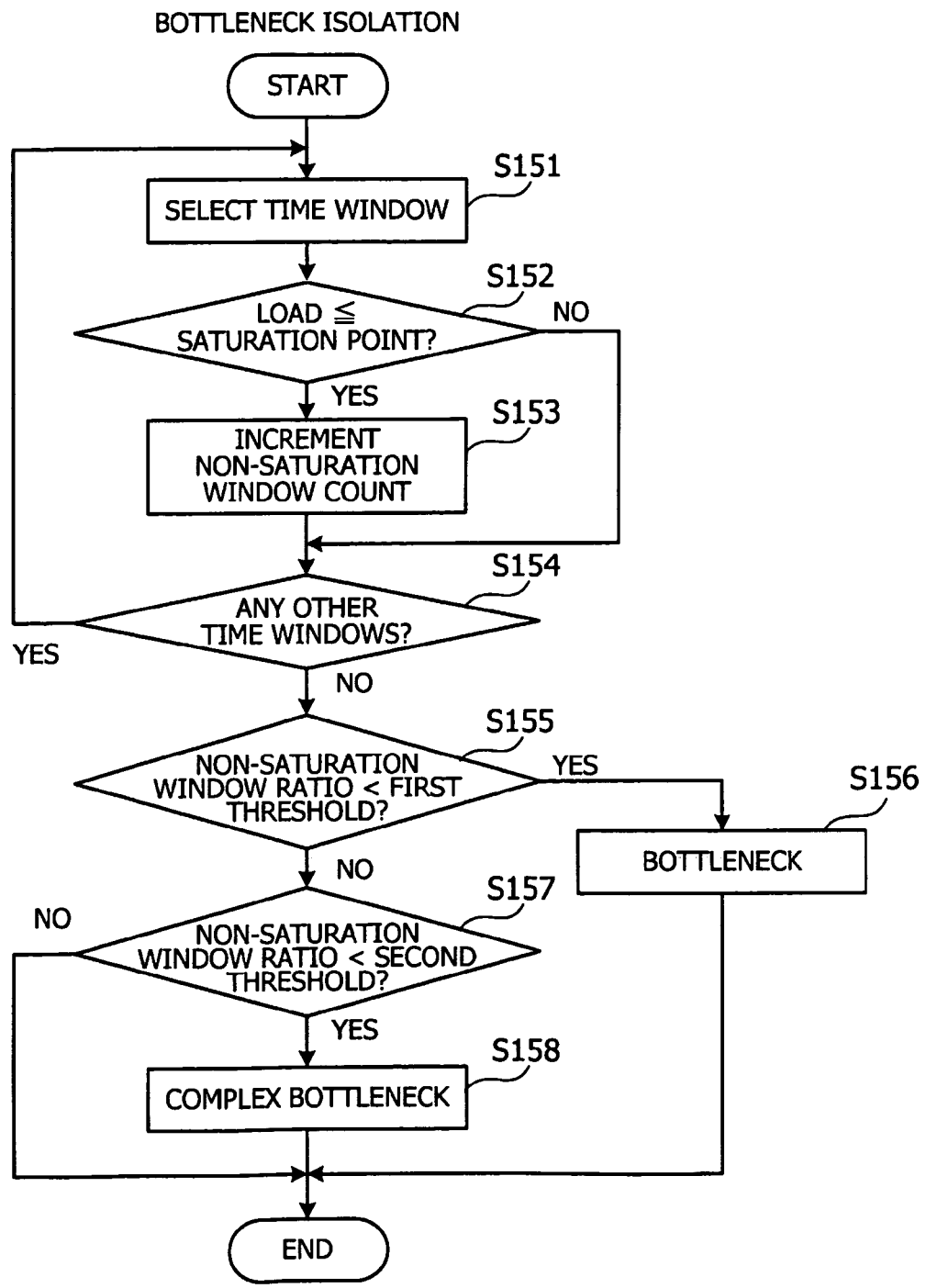
FIG. 28 is a flowchart illustrating an example procedure of bottleneck isolation.

The above-outlined bottleneck isolation is accomplished as follows. FIG. 28 is a flowchart illustrating an example procedure of bottleneck isolation. Each step of FIG. 28 is described below in the order of step numbers.

(Step S151) The analyzing unit 145 selects a time window. For example, the analyzing unit 145 selects time windows one by one, starting with the topmost entry of a time window management table (see FIG. 22) of the tier under analysis.

(Step S152) The analyzing unit 145 compares the load value in the selected time window with the saturation point. If the load value is equal to or smaller than the saturation point, the analyzing unit 145 proceeds to step S153. If the load is greater than the threshold, the analyzing unit 145 skips to step S154.

(Step S153) The analyzing unit 145 increments a counter of non-saturation windows. It is assumed here that this non-saturation window counter has been initialized to zero when the bottleneck isolation process is started.

(Step S154) The analyzing unit 145 determines whether there are any other time windows that have not been subjected to the above steps. When such a pending time window is found, the analyzing unit 145 returns to step S151. When no such pending time window is found, the analyzing unit 145 proceeds to step S155.

(Step S155) The analyzing unit 145 determines whether the ratio of non-saturation windows to the whole series of time windows is smaller than a first threshold. This first threshold has previously been given to the analyzing unit 145. For example, the analyzing unit 145 calculates the ratio by dividing the number of non-saturation time windows by the total number of time windows, and then compares the resulting ratio with the given first threshold. If the ratio of non-saturation windows is smaller than the first threshold, the analyzing unit 145 proceeds to step S156. If the ratio of non-saturation windows is equal to or greater than the first threshold, the analyzing unit 145 proceeds to step S157.

(Step S156) The analyzing unit 145 determines that the selected tier is causing a bottleneck of the system. The analyzing unit 145 outputs this determination result to, for example, a screen of the monitor 11 and then exits from this process of bottleneck isolation.

(Step S157) The analyzing unit 145 determines whether the ratio of non-saturation windows to the whole series of time windows is smaller than a second threshold. This second threshold is greater than the first threshold and has previously been given to the analyzing unit 145. If the ratio of non-saturation windows is smaller than the second threshold, the analyzing unit 145 proceeds to step S158. If the ratio of non-saturation windows is equal to or greater than the second threshold, the analyzing unit 145 exits from this process of bottleneck isolation.

(Step S158) The analyzing unit 145 determines that the currently selected tier could be a cause of a complex bottleneck of the system. This "complex bottleneck" means that the system is experiencing a bottleneck due to some combination of two or more tiers including this tier in question. The analyzing unit 145 outputs this determination result to, for example, a screen of the monitor 11 and then exits from this process of bottleneck isolation.

As can be seen from the above steps, the second embodiment isolates a bottleneck of a multi-tier system on the basis of the ratio of non-saturation time windows that have a certain amount of spare capacity. Referring now to FIGS. 29 to 32, the following section will describe how the server's spare capacity is evaluated on the basis of the ratio of non-saturated time windows.

Figure 29:
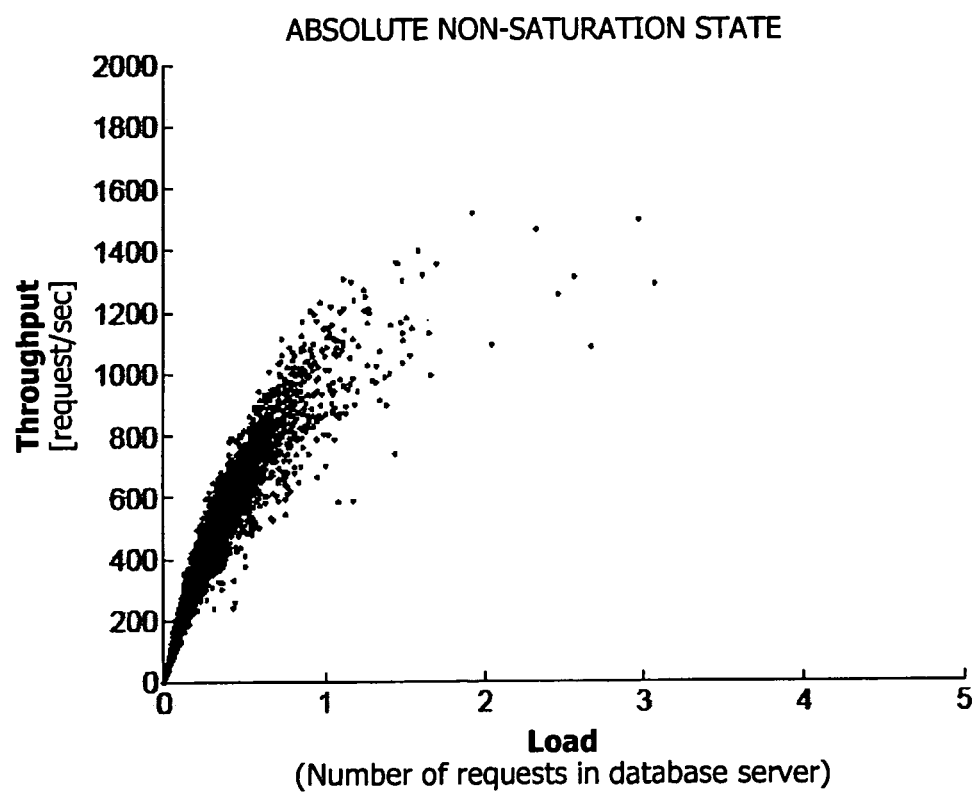
FIG. 29 is a scatter plot illustrating an example where the tier is in an absolute non-saturation state.

FIG. 29 is a scatter plot illustrating an example where the tier is in absolute non-saturation state. The term "absolute non-saturation state" refers to a state in which the tier's workload is so low that none of the time windows exceeds the saturation point. It may not be possible to determine a saturation point when every time window is plotted in a low load region as in the case seen in FIG. 29. That is, the processing steps discussed in FIG. 27 find that the slope exceeds a threshold in all load subranges, in which case the tier is concluded to be in the absolute non-saturation state. The analyzing unit 145 then outputs a piece of information indicating that the tier under analysis is in an absolute non-saturation state.

Figure 30:
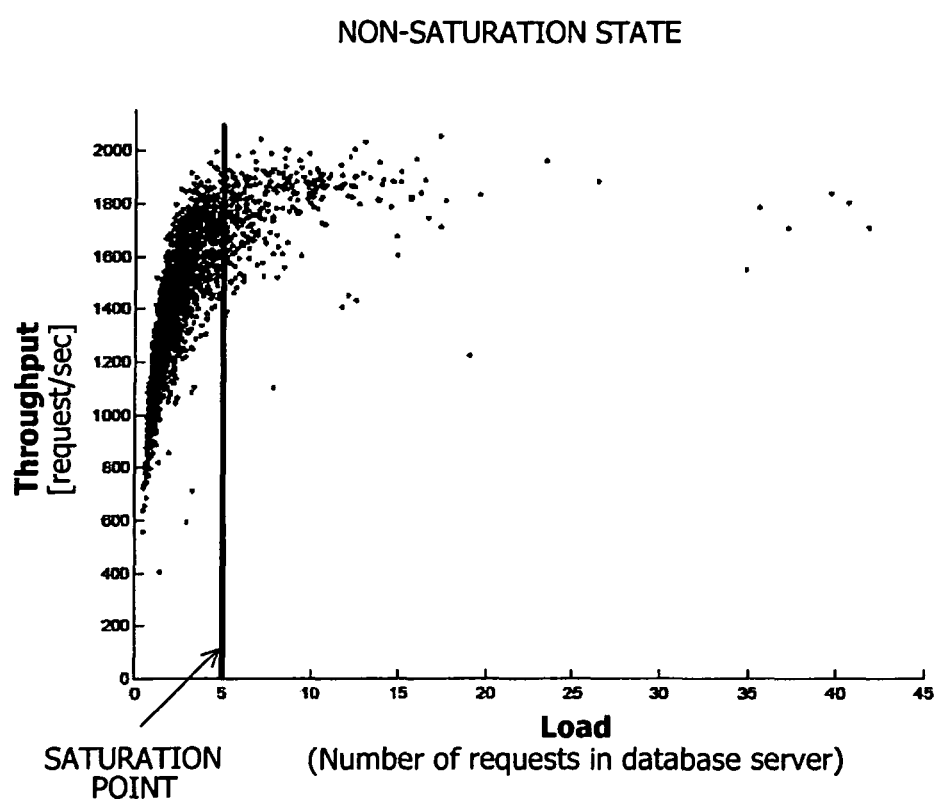
FIG. 30 is a scatter plot illustrating an example where the tier is in a non-saturation state.

FIG. 30 is a scatter plot illustrating an example where the tier is in a non-saturation state. The term "non-saturation state" refers to a state in which the ratio of time windows below the saturation point is equal to or greater than the second threshold. Suppose, for example, that the first and second thresholds are set to 0.2 (20%) and 0.7 (70%), respectively. In this case, the analyzing unit 145 determines that the tier is in a non-saturation state when 70% or more of its time windows are plotted below the saturation point. The analyzing unit 145 then outputs a piece of information indicating that the tier under analysis is in a non-saturation state.

Figure 31:
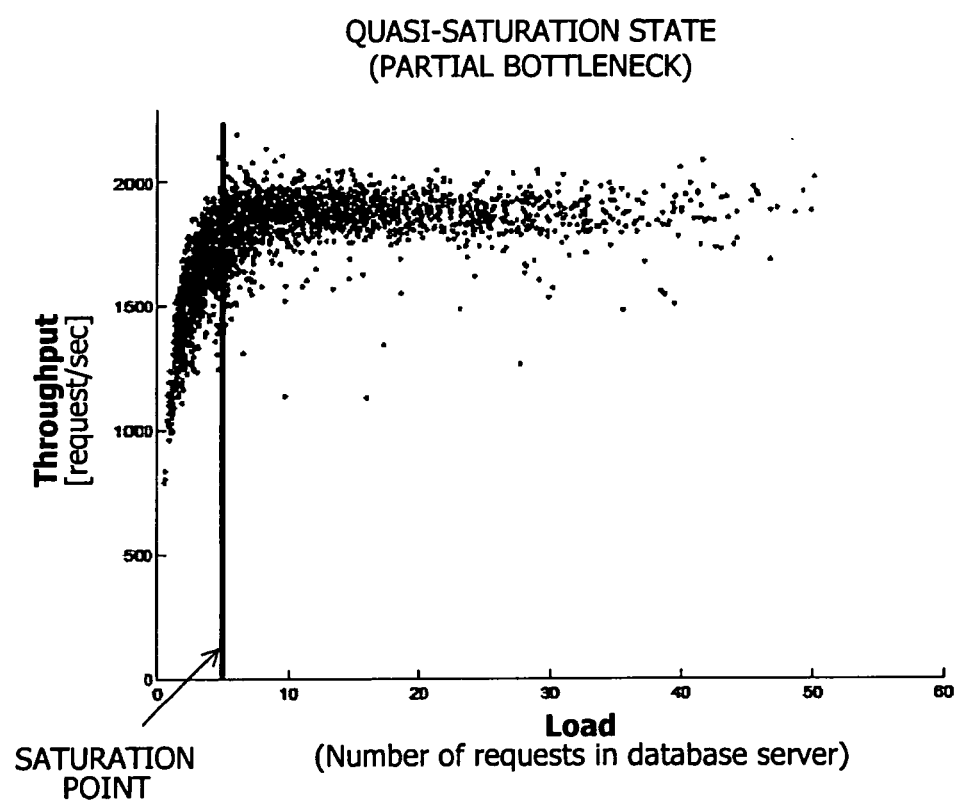
FIG. 31 is a scatter plot illustrating an example where the tier is in a quasi-saturation state.

FIG. 31 is a scatter plot illustrating an example where the tier is in a quasi-saturation state. The term "quasi-saturation state" refers to a state in which the ratio of time windows below the saturation point is equal to or greater than the first threshold, but below the second threshold. The tier in a quasi-saturation state is considered to have partly reached its performance limit. This indicates that the multi-tier system as a whole could be experiencing a bottleneck since a plurality of tiers simultaneously have fallen into quasi-saturation state. In the case where the first and second thresholds are respectively set to, for example, 0.2 (20%) and 0.7 (70%), the analyzing unit 145 determines that the tier is in a quasi-saturation state when 20% or more, but less than 70%, of its time windows are plotted below the saturation point. The analyzing unit 145 then outputs a piece of information indicating that the tier under analysis is in a quasi-saturation state (i.e., indicating the presence of partial bottleneck).

Figure 32:
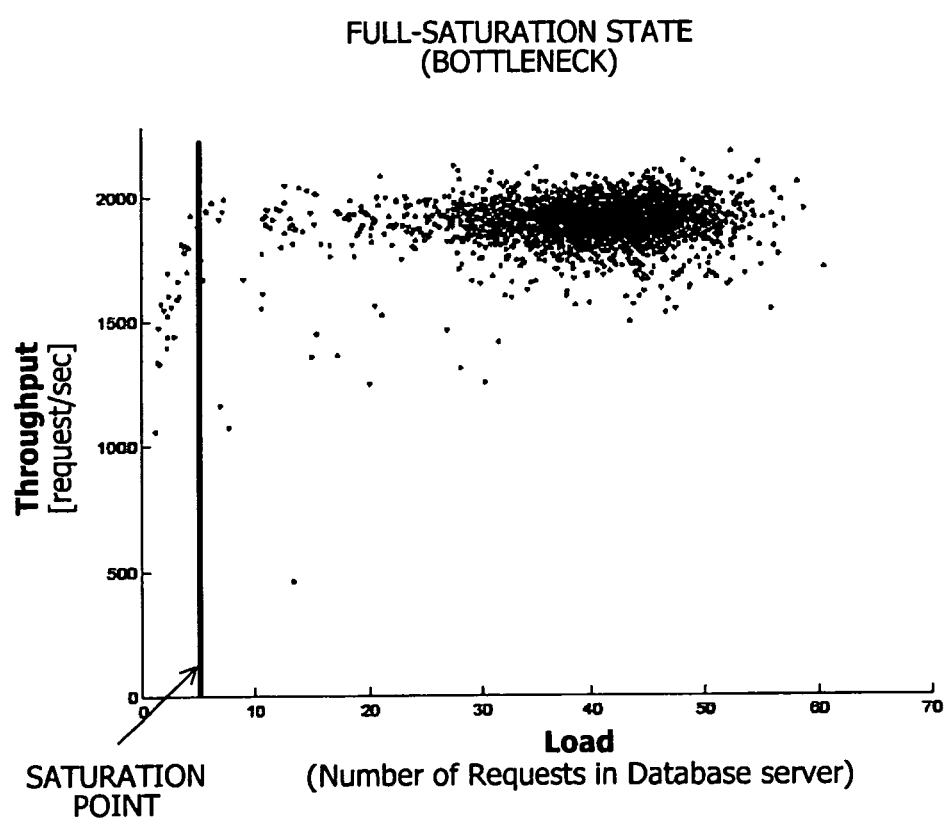
FIG. 32 is a scatter plot illustrating an example where the tier is in a saturation state.

FIG. 32 is a scatter plot illustrating an example where the tier is in a saturation state. The term "saturation state" refers to a state in which the ratio of time windows below the saturation point is smaller than the first threshold. The tier in a saturation state is considered to be a bottleneck in the multi-tier system. In the case where the first threshold is set to, for example, 0.2 (20%), the analyzing unit 145 determines that the tier is in a saturation state when less than 20% of its time windows are plotted below the saturation point. The analyzing unit 145 then outputs a piece of information indicating that the tier under analysis is in a saturation state (i.e., indicating the presence of a bottleneck).

As can be seen from the above explanation, the second embodiment calculates load and throughput values of jobs executed in each tier on the basis of precise message timestamps, determines their relationships in a dynamic fashion, and isolates performance bottlenecks of the system under analysis. The proposed techniques make it possible to isolate bottlenecks properly.

The second embodiment first divides a given analysis period into a plurality of short time windows and calculates load and throughput values for each time window and for each tier. The resulting load-throughput pairs of time windows are then analyzed in terms of the relationship between load and throughput. The second embodiment dynamically determines a saturation point of load values at which the throughput stops increasing with the load. Each tier's spare capacity is then evaluated according to the ratio of time windows whose load values exceed the saturation point. This evaluation is based on the nature of throughput of servers running on a tier. That is, there is an upper limit in the number (or parallelism) of jobs that a server can execute concurrently because of the limitations in its hardware components, operating system, and software implementations. Once the parallelism reaches that limit, the throughput would not increase any more.

To detect the occurrence of a bottleneck, the second embodiment relies on the observed relationships between load and throughput. This means that the second embodiment can detect a bottleneck regardless of what is really causing it. That is, a bottleneck of a particular tier can be detected even if it is caused by some other reasons than the aforementioned software limitation on the number of concurrent jobs.

There are a variety of factors in the multi-tier system which can affect the saturation point of throughput of a tier. For example, the saturation point is affected by differences in the kind and amount of hardware resources used, which depend on software implementations and job categories. Queuing at each level of the operating system and other software components also affects the saturation point. The mixture ratio of job categories may vary with time, and thus the saturation point may dynamically change during operation of the system. The saturation point could be influenced by such many internal factors, but it is very difficult to previously identify them through external observation of IP packets. The second embodiment uses relationships between load and throughput to isolate bottlenecks, thus making it possible to eliminate the need for information about internal factors affecting saturation points.

For example, the second embodiment works effectively in finding a tier (server) with a problem even in a situation where the system does not produce outcomes commensurate with an increase of the input in spite of the fact that individual system resources are still available. Such a symptom appears when a bottleneck is caused by a plurality of interrelated factors in a single tier. Those interrelated factors may involve a wide range of elements including computer hardware, operating system, software implementations, and user applications. It is therefore necessary to analyze individual resources, as well as their combinations, that could cause a bottleneck in each tier. However, the relationships between such resources are too complicated to analyze properly. The second embodiment uses relationships between load and throughput to isolate a tier that has a potential cause of bottleneck, thus making it possible to alleviate the workload of determining which resource is causing a bottleneck.

The second embodiment evaluate the spare capacity of each tier based on the load and throughput in time windows that are defined with a very small step size, thus enabling detection of a momentary bottleneck. Referring again to the example of FIG. 31, there are not a small number of time windows with load values exceeding the saturation point, while the server itself is not a persistent bottleneck. In those time windows, the tier may be producing a transient bottleneck, which may result in, for example, a moving bottleneck that appears alternately on a plurality of tiers at short intervals. The system as a whole is unable to produce outcomes commensurate with the increased amount of input load. The second embodiment detects such bottlenecks moving among the tiers, as well as how much those tiers are affected.

(c) Third Embodiment

This section describes a third embodiment. The third embodiment has a feature of excluding indirect external resource waiting times from the net processing times when calculating throughput in a time window. The third embodiment may be implemented on a system with the same structure discussed above in the second embodiment. Accordingly, the third embodiment will be described below with reference to the same components of the second embodiment illustrated in FIG. 4 and FIG. 6.

As have been discussed above, the performance saturation of a multi-tier system can be measured by analyzing relationships between load and throughput. However, there are some factors that could disrupt this load-throughput relationship. One of those factors is the time that a tier waits for some external resources indirectly, as opposed to the time that a tier waits for a response message from another tier. Such indirect waiting times may happen, depending on the implementations of software.

Figure 33:
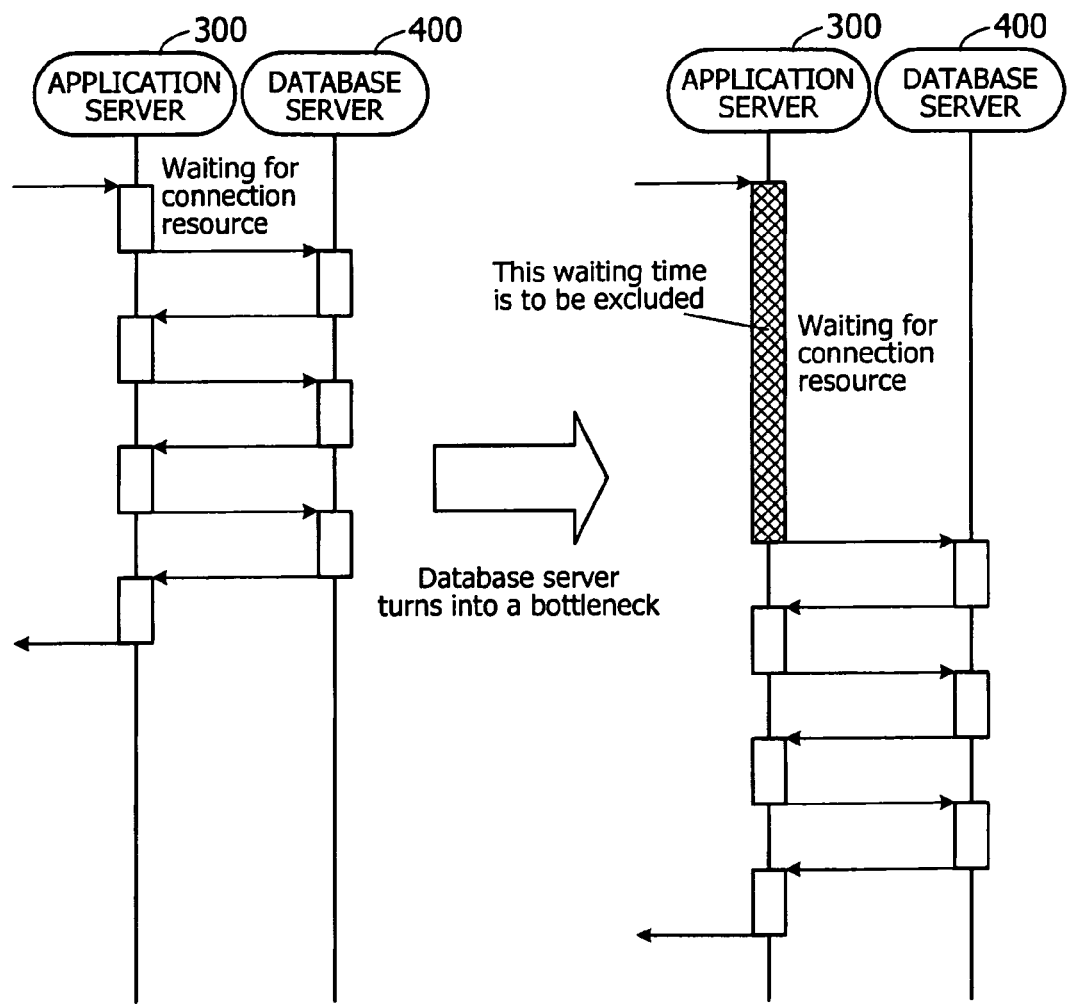
FIG. 33 illustrates an example of what factor may disrupt the relationship between load and throughput.

FIG. 33 illustrates an example of what factors may disrupt the relationship between load and throughput. Specifically, FIG. 33 depicts an implementation in which applications on the application server 300 have a pool of reusable database connections for communication with the database server 400. Implementations of this type are commonly seen as database connection pools.

For example, when those pooled database connections are used up, a thread in need of a new database connection has to wait for some other existing thread to finish the processing and release its database connection back to the pool. The former thread is unable to advance its processing if other threads happen to be waiting for a response from the database server 400. This means that the former thread is indirectly waiting for a response from the database server 400. Particularly when a bottleneck condition exists in the database server 400, the exponential growth of its response time brings about an extremely long waiting time before the application server 300 can find a vacant resource for database connection, as indicated by the hatched portion in FIG. 33.

The above-noted indirect waiting time is not part of the net processing time of the application server 300 because it is spent only in waiting for an external resource. Thus the calculation of throughput and load of the application server 300 is supposed to exclude such waiting times. The problem is, however, that those indirect waiting times cannot be observed as external behavior of the application server 300 since waiting for an external resource is an internal operation of applications.

The same applies also to the web server 200 and application server 300 when they wait for vacancies in a thread pool. There is, in general, an upper limit in the number of threads that the web server 200 and application server 300 are allowed to use concurrently. When all available threads are assigned to received requests, the subsequent requests have to wait until some threads become available again. This thread waiting time may indirectly include an extra waiting time due to a delay in the response from a lower tier, since such delay adds more life to the thread. The thread waiting time may grow to a significant length, particularly when there is a bottleneck in the lower tier.

Including the above-discussed indirect waiting times for external resources in the calculation of throughput and load results in very high load values, thus disturbing the relationship between load and throughput. To eliminate this disturbance of indirect waiting times from the calculation of load and throughput, the third embodiment is designed to remove every execution period when that execution period is known to involve an indirect waiting time for external resources. For instance, the very first execution period in a job on a non-lowest tier is likely to include an indirect waiting time for external resources. In the example of FIG. 33, the hatched box represents the first execution period of the application server 300. The third embodiment eliminates this entire period from the source data for load and throughput calculation. This method of course eliminates altogether the tier's true execution time in that same period, and the unnecessary elimination introduces some error into the analysis. However, the effect of such error is limited or even negligible in the entire process of performance analysis because both load and throughput values are reduced together by the elimination.

The third embodiment is implemented by modifying the steps of throughput calculation (step S132 in FIG. 21) and load calculation (step S133 in FIG. 21) discussed earlier in the second embodiment. The modifications are as follows.

(c1) Modified Throughput Calculation

The data compilation unit 141 subtracts the length of the first execution period of each job from the processing time when calculating a throughput. Referring again to the example of FIG. 19, the web server 200 starts executing a job 61 in time window #1. The data compilation unit 141 thus excludes this first execution period 61a from the net execution period of the job 61, not to consider its length in calculating a throughput of the web server 200. Similarly, the first execution period 62a in time window #1 is excluded from the net execution period of the job 62, not to consider its length in calculating a throughput of the application server 300.

In the case where a single job is executed across a plurality of time windows, the score of that job is distributed to those time windows in proportion to their respective shares of the processing time. The modified throughput calculation also applies the exclusion of topmost execution period to this distribution of throughput scores.

(c2) Modified Load Calculation

The data compilation unit 141 subtracts the length of the first execution period of each job from the processing time when calculating a load value.

As can be seen from the above description, the third embodiment removes the effect of indirect waiting times for external resources by excluding execution periods involving such waiting times from the source data of throughput and load calculation. This feature makes it possible to prevent such indirect waiting times from being included in the calculation as part of the tier's processing times and degrading the accuracy of observed load and throughput relationships. It is not uncommon for a system to experience a sudden and unusually large increase of the time that a tier indirectly waits for external resources (processing at a bottleneck tier), particularly when the system is facing a performance saturation. This indirect waiting time significantly raises load values while reducing throughput values, and thus spoils the accuracy of observed load and throughput relationships.

Figure 34:
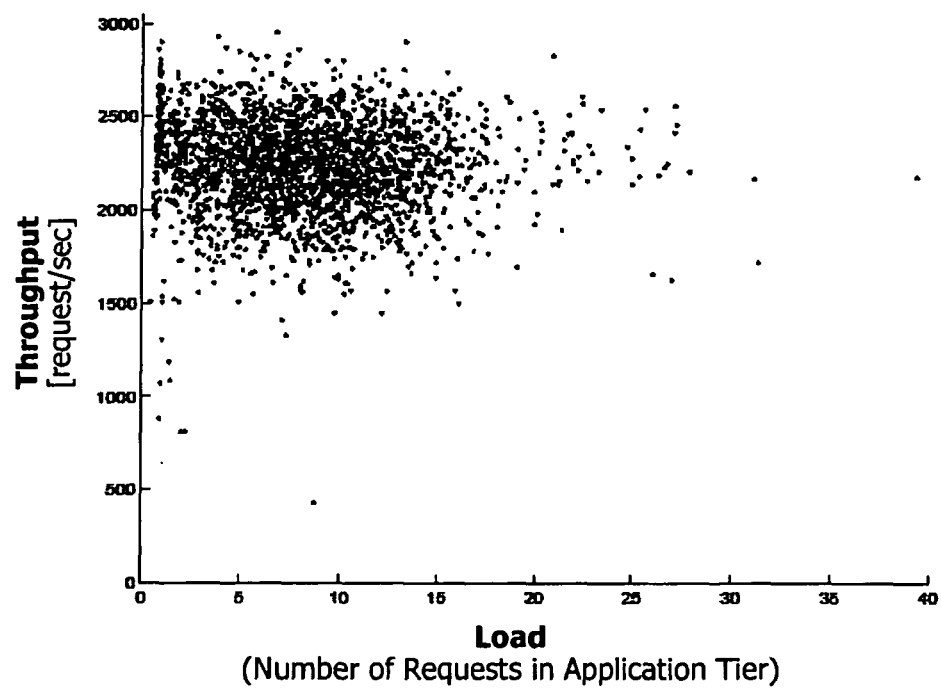
FIG. 34 is a scatter plot illustrating an example of throughput and load values observed in time windows in the case where indirect waiting times for external resources are not excluded.

FIG. 34 is a scatter plot illustrating an example of throughput and load values observed in time windows in the case where indirect waiting times for external resources are not excluded. This example is of the tier of the application server 300, in which the application server 300 waits for external resources. FIG. 34 illustrates a large number of time windows are plotted in a high-load region.

Figure 35:
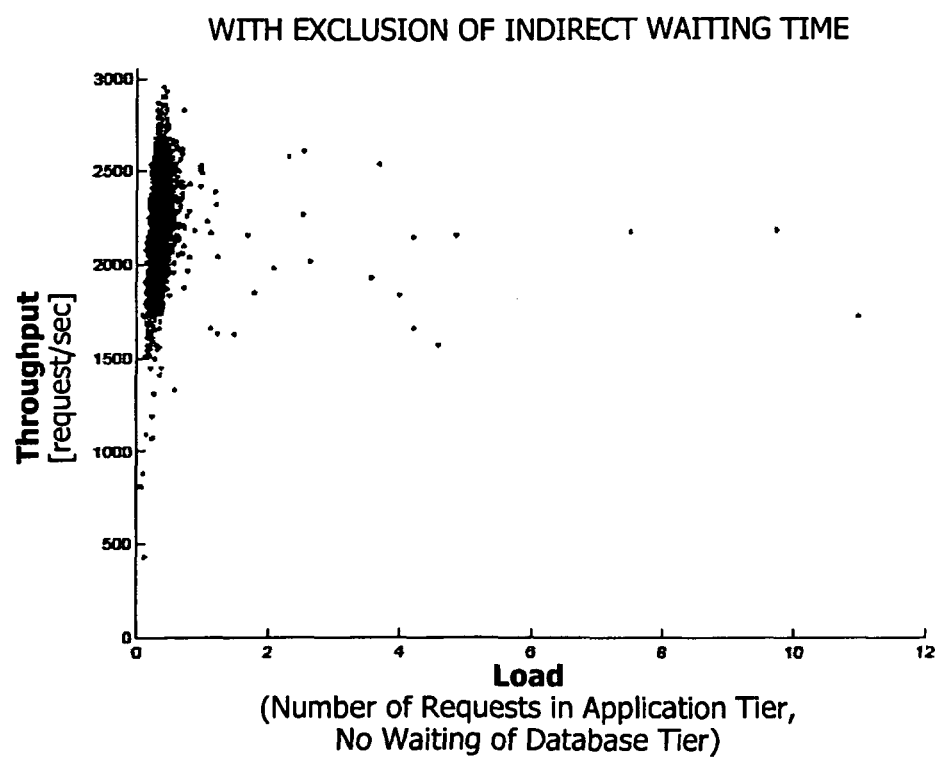
FIG. 35 is a scatter plot illustrating an example of throughput and load values observed in time windows in the case where indirect waiting times for external resources are excluded according to a third embodiment.

The effect of exclusion of indirect waiting times for external resources may be tested by using the same time-series data used to calculate throughput and load values in FIG. 34. The result is depicted in FIG. 35. FIG. 35 is a scatter plot illustrating an example of throughput and load values observed in time windows in the case where indirect waiting times for external resources are excluded. FIG. 35 demonstrates a significant reduction in the load values of time windows, compared to those in FIG. 34, as a result of exclusion of indirect waiting times.

Even in the situation where a server has to spend time waiting for external resources, the accuracy of throughput and load values can be maintained by nullifying the effect of such indirect waiting times as is done in the third embodiment. In other words, the proposed method contributes to more accurate performance analysis.

(d) Fourth Embodiment

This section describes a fourth embodiment which calculates a throughput on the basis of the number of output messages, instead of the number of executed jobs. The fourth embodiment may be implemented on a system with the same structure discussed in the second embodiment. Accordingly, the fourth embodiment will be described below with reference to the same components of the second embodiment illustrated in FIG. 6.

In the servers such as an application server 300, Java™ virtual machine (Java VM) may initiate a full garbage collection. Garbage collection is a memory management process that automatically releases memory areas in a heap when they are no longer used. Heap is a pool of unused memory area that programs can allocate dynamically. When a full garbage collection begins, other ongoing processes stop momentarily. A job may encounter this full garbage collection and stop in the middle of its processing. When this happens in the application server 300, the performance analyzer fails to observe the real behavior of that job correctly because the job appears as if it were continuing execution. As a result, the foregoing method of the second embodiment calculates throughput and load values based on such a superficial execution period, in spite of the fact that the job is actually stopped during the garbage collection.

Figure 36:
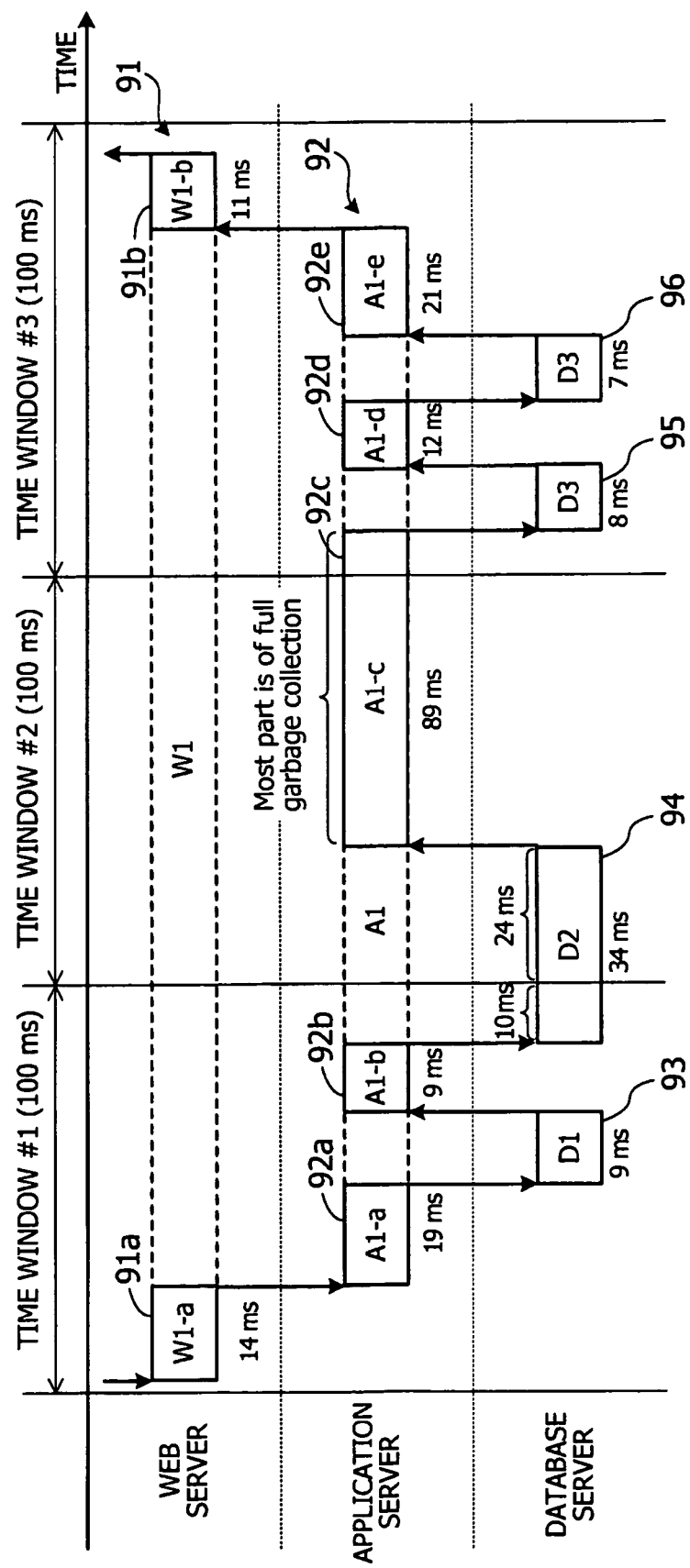
FIG. 36 illustrates a transaction which is stopped for a while by a full garbage collection.

FIG. 36 illustrates a transaction which is stopped for a while by a full garbage collection. In the example of FIG. 36, the application server 300 executes a job 92 in response to a request message from a job 91 running on the web server 200. The job 92 on the application server 300 sends four request messages to the database server 400. Upon receipt of those request messages, the database server 400 executes four jobs 93 to 96. The job 91 on the web server 200 includes two execution periods 91a and 91b. The job 92 on the application server 300 includes five execution periods 92a, 92b, 92c, 92d, and 92e.

It is assumed here that a full garbage collection occurs on the application server 300 during the execution period 92c. Since this full garbage collection stops the job 92 for a while, the apparent length of its third execution period 92c becomes longer than the actual processing time spent by the application server 300 for the job 92.

The behavior of the multi-tier system illustrated in FIG. 36 may be taken as a transient bottleneck at the tier of the application server 300 at the moment of full garbage collection. The fourth embodiment is supposed to detect such a transient bottleneck. To this end, the fourth embodiment is designed to estimate the throughput of a tier from the number of output messages produced by the tier. Those output messages include not only requests to a lower tier, but also responses to an upper tier. The fourth embodiment normalizes this output message count (i.e., the number of output messages), taking into account their dependence on the job categories, such that the normalized value will be proportional to the processing time of each job category in low workload conditions, and inversely proportional to the average per-job output message count of each job category. Normalized per-job throughput values in the fourth embodiment are also different from those in the second embodiment because of the difference in the method of throughput calculation.

Figure 37:
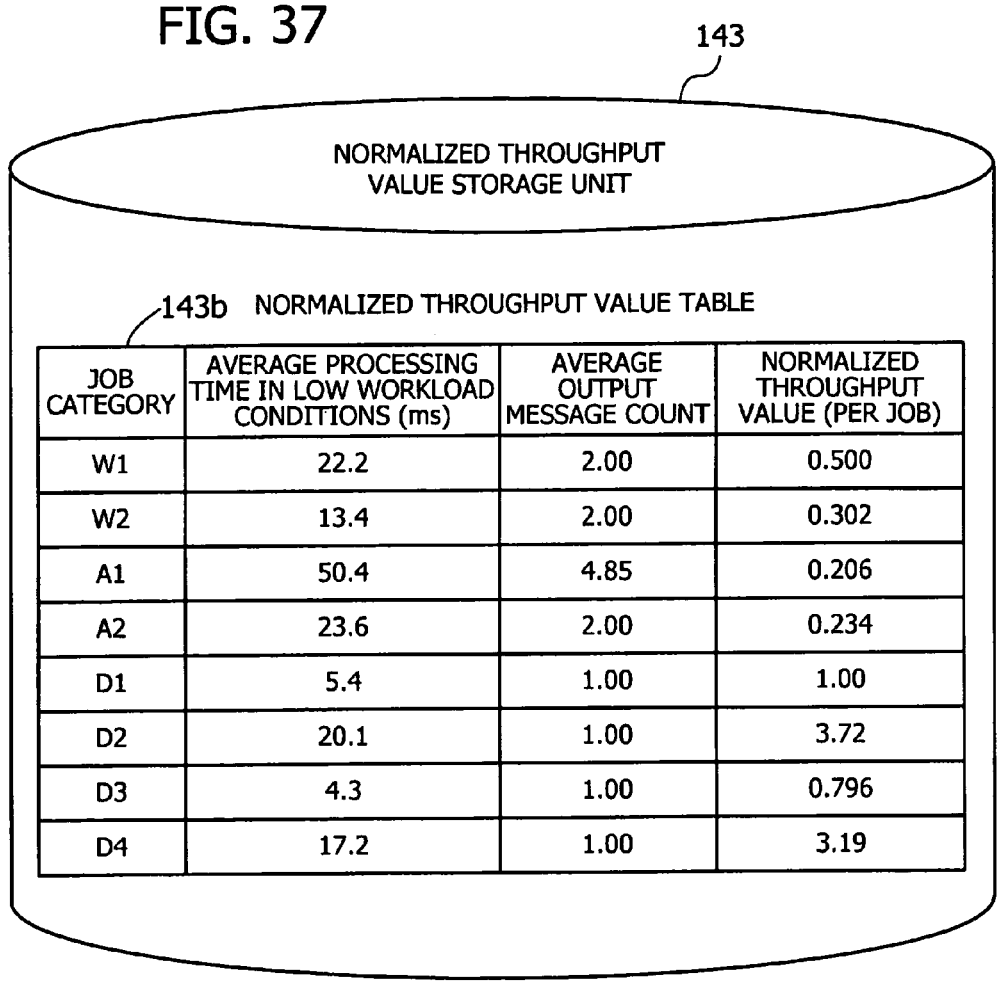
FIG. 37 illustrates an example data structure of a normalized throughput value storage unit according to a fourth embodiment.

FIG. 37 illustrates an example data structure of a normalized throughput value storage unit according to the fourth embodiment. The illustrated normalized throughput value storage unit 143 contains a normalized throughput value table 143b. This normalized throughput value table 143b has data fields titled "Job Category," "Average Processing Time in Low Workload Conditions," "Average Output Message Count," and "Normalized Throughput Value."

Specifically, the job category field of each table entry contains a job category name of jobs executed by a server in the web three-tier system. The next data field titled "Average Processing Time in Low Workload Conditions" indicates an average processing time of the corresponding job category, which assumes that a server executes a job of that category under low workload conditions. In the example of FIG. 37, the average processing times are represented in units of ms. For example, the normalized throughput value table 143b stores average processing times previously measured by an administrator of the web three-tier system when the system workload is low. The average output message count field indicates the average number of output messages produced by the jobs that belong to the corresponding job category. This average output message count includes both request messages and response messages.

The normalized throughput value field contains a per-message throughput value which is normalized for each corresponding job category. For example, one representative job category is selected for each tier. In the example of FIG. 37, job category W1 is selected as the representative job category of jobs executed by the web server 200. Likewise, job category A1 is selected as the representative job category of jobs executed by the application server 300, and job category D1 is selected as the representative job category of jobs executed by the database server 400. The normalized per-message throughput value of those representative job categories is obtained by dividing 1.00 by the average output message count. For example, the representative job category W1 of the web server 200 has an average output message count of 2. Accordingly, its normalized throughput value is calculated be 0.5 (=½).

On the other hand, the normalized per-message throughput values of non-representative job categories are obtained by calculating the ratio of their average processing time in low workload conditions to that of the representative job category for the same tier and then dividing the ratio by their average output message count. For example, the average processing time of job category W2 in low workload conditions is 0.604 times that of the representative job category W1 (i.e., 13.4 ms/22.2 ms=0.604). This ratio (0.604) is divided by the average output message count (2.00) of job category W2. The resulting quotient, 0.302, is the normalized per-message throughput value of job category W2.

According to the fourth embodiment, the per-message normalized throughput value of each job category is used to calculate a throughput value of each time window, as opposed to the foregoing throughput calculation (step S132 in FIG. 21) according to the second embodiment. In the case of a transaction illustrated in FIG. 36, the fourth embodiment calculates throughput values in the following way.

Referring first to the tier of the web server 200, the throughput in time window #1 is 0.500 since the job 91 of job category W1 issued one message in that time window. The throughput in time window #2 is zero because of the lack of output messages. The throughput in time window #3 is 0.500 since the job 91 of job category W1 issued one message in that time window.

Referring next to the tier of the application server 300, the throughput in time window #1 is 0.412 (=0.206×2) since the job 92 of job category A1 issued two messages in that time window. The throughput in time window #2 is zero because of the lack of output messages. The throughput in time window #3 is 0.618 (=0.206×3) since the job 92 of job category A1 issued three messages. These three output messages include two request message sent to the database server 400 in the lower tier, and one response message returned to the web server 200 in the upper tier.

Referring to the tier of the database server 400, the throughput in time window #1 is 1.00 since the job 93 of job category D1 issued one message in that time window. The throughput in time window #2 is 3.72 since the job 94 of job category D2 issued one message in that time window. The throughput in time window #3 is 1.59 (=0.796×2) since two jobs 95 and 96 of job category D3 issued two messages in that time window.

In the case where a plurality of transactions are executed concurrently, message-based throughput values are calculated for each tier in the above way and a sum total of throughput values are calculated for each time window similarly to the foregoing second embodiment. The resulting sum totals are treated as throughput values of those time windows.

Figure 38:
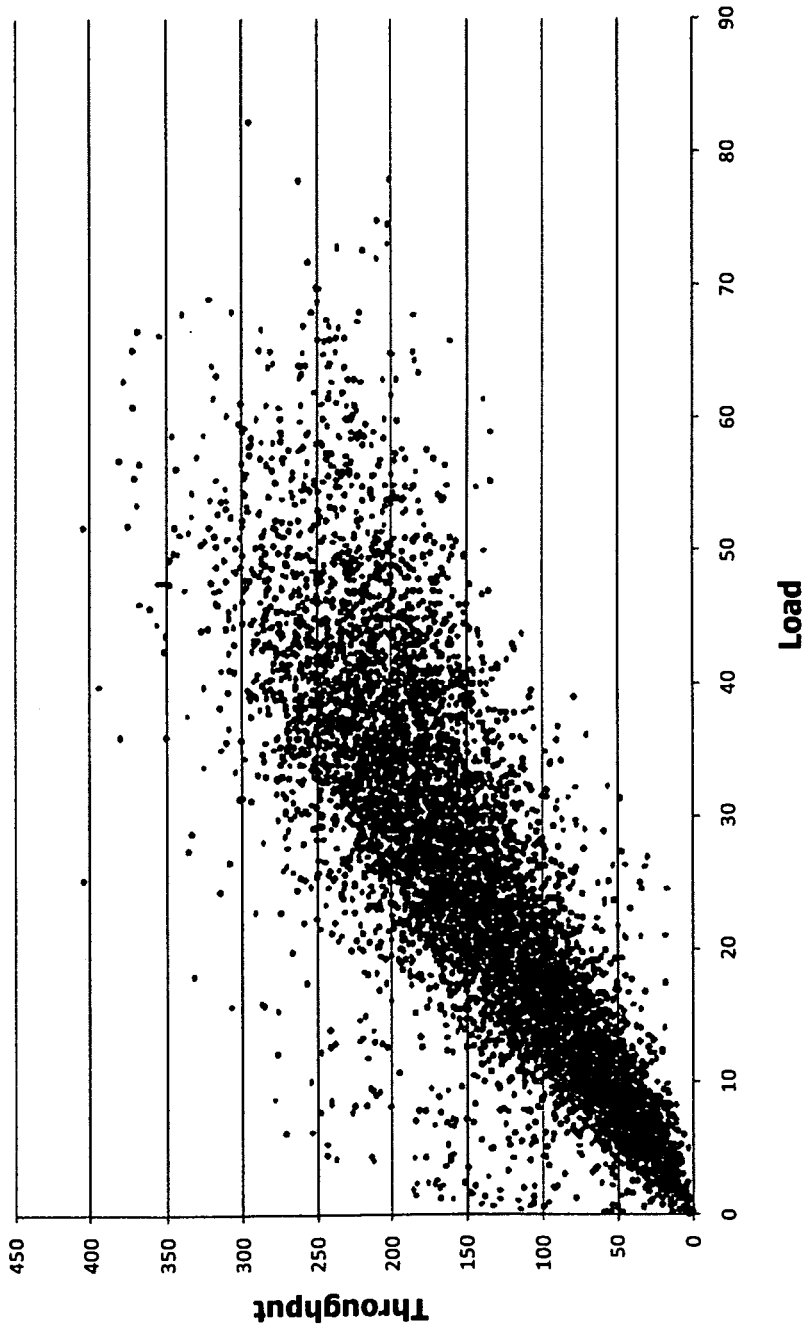
FIG. 38 is a scatter plot where the throughput axis represents normalized per-job throughput values.
Figure 39:
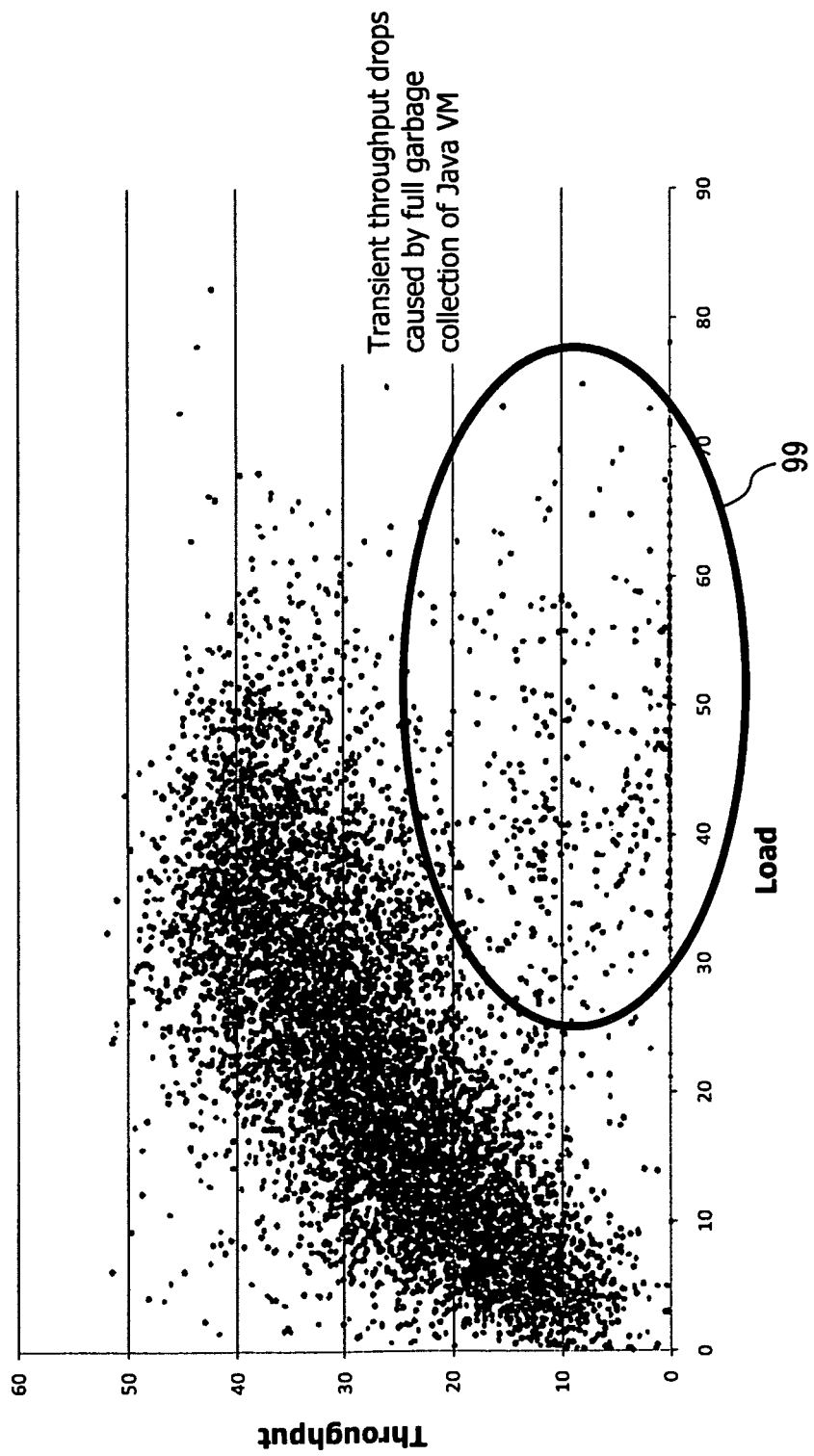
FIG. 39 is a scatter plot where the throughput axis represents normalized per-message throughput values.

The above method of throughput calculation prevents a throughput value from being assigned to a time period that is extended irrelevantly to actual execution of a job as in the case of an execution period 92c of the job 92 in time window #2. That is, no messages are output during the momentary stop of operation, and the proposed method interprets the absence of messages as zero throughput. This means that the proposed method can distinguish the true execution times of jobs running on the servers and correctly recognize them in terms of throughput. As a result, the proposed method can identify a time window experiencing a transient bottleneck due to full garbage collection or the like. With reference to FIGS. 38 and 39, the next section will compare two results of throughput calculation. That is, one is calculated on the basis of normalized per-job throughput values, and the other is calculated on the basis of normalized per-message throughput values.

FIG. 38 is a scatter plot where the throughput axis represents normalized per-job throughput values. This example scatter plot represents calculation results of the second embodiment, assuming that full garbage collection is invoked in the application server 300 during the analysis period. As can be seen in FIG. 38, the distribution of load and throughput values does not suggest any transient bottlenecks due to full garbage collection.

FIG. 39 is a scatter plot where the throughput axis represents normalized per-message throughput values. The example scatter plot of FIG. 39 represents the result of a throughput calculation according to the fourth embodiment using the same time series data used in that of FIG. 38. As can be seen from this result, the fourth embodiment permits a momentary stop of operation to directly appear on the throughput values. Therefore the scatter plot clearly indicates the presence of time windows whose throughput values falls to zero or a near-zero range because of occurrence of full garbage collection. The ellipse 99 seen in FIG. 39 indicates a group of such time windows experiencing an unusual transient drop of throughput due to full garbage collection or the like. The analyzing unit 145 can detect those time windows by searching the time window data storage unit 142 for time windows whose load values exceed a given saturation point, but whose throughput values are not greater than a predetermined threshold. The analyzing unit 145 may also be configured to output a scatter plot, like the one illustrated in FIG. 39, on the monitor 11, so that the system administrator can notice the presence of transient throughput drops.

The example illustrated in FIG. 39 as a whole exhibits a relatively wide scattering of throughput values. This symptom suggests that there are not only full garbage collection, but also minor garbage collections taking place on the server. Such activities cause momentary ups and downs of throughput.

The normalization of throughput values may be simplified or omitted in the case where, for example, all jobs fall in a single job category. For example, the throughput in a time window may be calculated as the number of messages transmitted during that time window. While a job may transmit two or more messages during its execution over a plurality of time windows, the throughput calculation takes into account the number of messages transmitted during each particular time window. For another example, the throughput of a job in a time window is calculated as the ratio of the number of messages transmitted from the job during that time window to the total number of messages transmitted from the job.

(e) Fifth Embodiment

This section describes a fifth embodiment in which a saturation point is calculated by using a technique that reduces the effect of variations in the observed data. The fifth embodiment may be implemented on a system with the same structure discussed in the second embodiment. Accordingly, the fifth embodiment will be described below with reference to the same components of the second embodiment illustrated in FIG. 6.

The foregoing second embodiment calculates a saturation point by using the method discussed in FIG. 27. However, the calculation method of the second embodiment may be affected by small variations in the given data and could mistakenly select a low saturation point if such variations temporarily push the slope down below the threshold before the true saturation is reached. In view of the above, the fifth embodiment proposes a method to improve the accuracy of saturation point calculation.

Specifically, the proposed method of the fifth embodiment uses statistical confidence intervals. A confidence interval indicates a numerical range of a given parameter in terms of probabilities. In the performance analysis of a multi-tier system, the throughput and load of a server in a tier are nearly directly proportional when the load is relatively low. The distribution of the slope has a small statistical dispersion in that low-load range. However, as the server's performance approaches its upper limit (bottleneck), the proportional relationship between load and throughput is lost abruptly, and the slope begins to exhibit increased dispersions. It is noted that an increase in the dispersion leads to a wider statistical confidence interval of the slope. The fifth embodiment takes advantage of this characteristics of confidence intervals to make it possible to calculate a saturation point without being affected by small variations of data.

Figure 40:
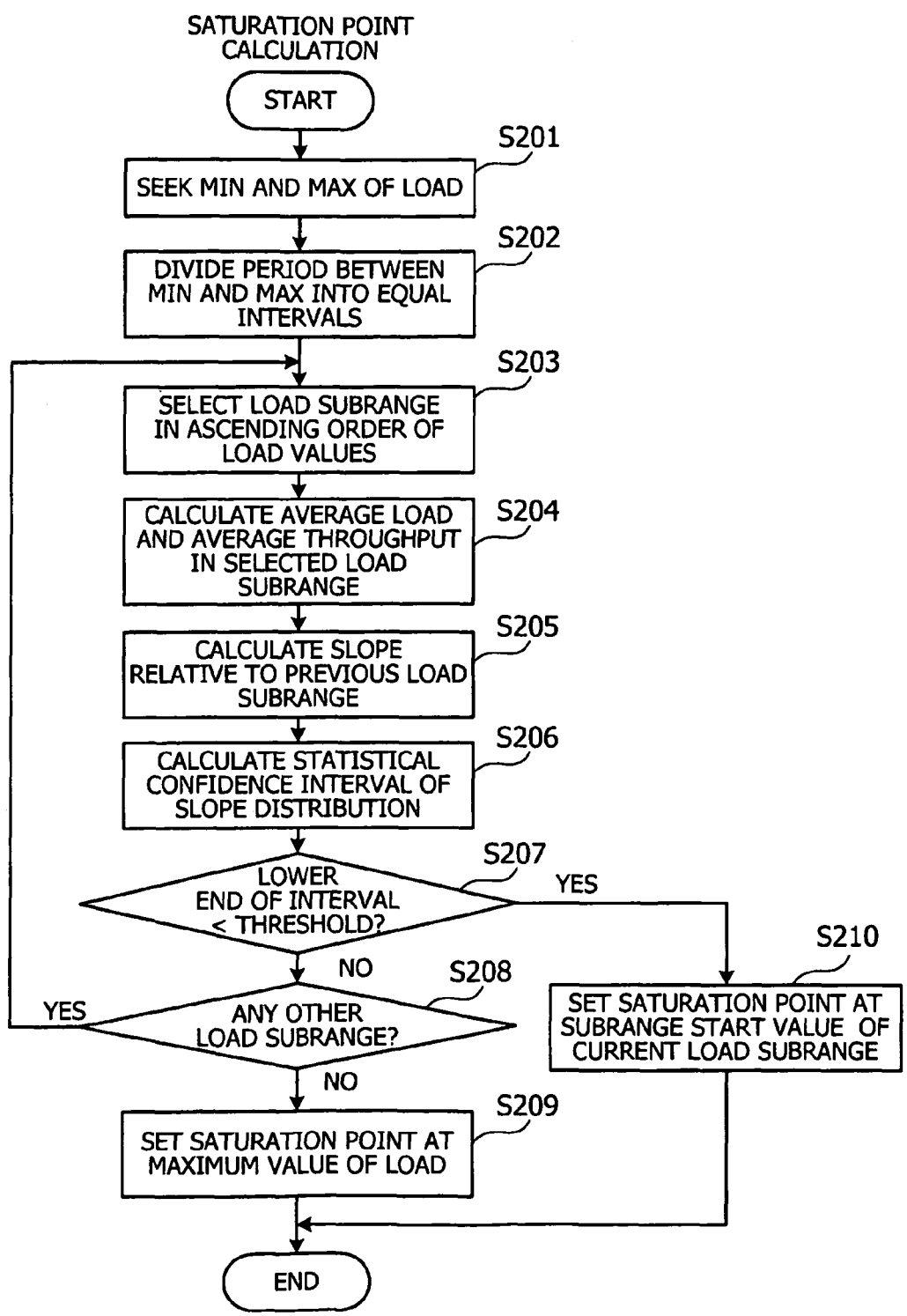
FIG. 40 is a flowchart illustrating an example procedure of saturation point calculation according to a fifth embodiment.

FIG. 40 is a flowchart illustrating an example procedure of saturation point calculation according to the fifth embodiment. Each step of FIG. 40 is described below in the order of step numbers. steps S201 to step S205 in this flowchart of FIG. 40 perform the same processing as step S141 to step S145 of FIG. 27 discussed in the second embodiment. The following description will thus focus on step S206 and subsequent steps. It is assumed here that the load values range from 0 (min) to 50 (max), and that step S202 divides this range into 100 subranges with a step size of 0.5.

(Step S206) The saturation point determination unit 144 calculates a statistical confidence interval of the distribution of slopes. For example, the saturation point determination unit 144 calculates a slope $\delta_i$ between adjacent load subranges, based on the variations of average load and average throughput. Specifically, the saturation point determination unit 144 uses formula (1) to perform this calculation, as is done at step S145 of FIG. 27.

Then, by using the calculated slopes in $n_k$ subranges ($n_k$ is an integer in the range of $1 < n_k \leq 100$) from the lowermost one, the saturation point determination unit 144 calculates a statistic confidence interval expressed as follows:

[Expression 2]

$$\frac{1}{n_k} \times \sum_{i=1}^{n_k} \delta_i \pm 1.96 \times \sqrt{\frac{1}{n_k - 1} \times \sum_{i=1}^{n_k} \left(\delta_i - \frac{1}{n_k} \sum_{j=1}^{n_k} \delta_j\right)^2} \qquad (2)$$

where the value "1.96" is a constant for the 95% confidence level.

(Step S207) The saturation point determination unit 144 determines whether the lower end of the confidence interval is lower than a predetermined threshold. This threshold is obtained by, for example, multiplying the slope $\delta_1$ at a load subrange where the average load is minimum by a specified coefficient (e.g., 0.2) smaller than 1. If the lower end of the confidence interval is lower than the given threshold, the saturation point determination unit 144 advances to step S210. If the lower end is equal to or higher than the given threshold, the saturation point determination unit 144 advances to step S208.

(Step S208) The saturation point determination unit 144 determines whether there are any other load subranges that have not been subjected to the above processing. When such a pending load subrange is found, the saturation point determination unit 144 returns to step S203. When it is found that all load subranges have been finished, the saturation point determination unit 144 proceeds to step S209.

(Step S209) This step is reached because the lower end of the confidence interval is equal to or higher than the threshold in every load subrange. Accordingly the saturation point determination unit 144 sets a saturation point at the maximum value of load obtained at step S201 and terminates the process of saturation point calculation.

(Step S210) The saturation point determination unit 144 sets a saturation point at the subrange start value of the currently selected load subrange.

The above process determines $n_k$ at which the lower end of the confidence interval obtained with expression (2) is below a predetermined threshold for the first time. The saturation point is then set at the subrange start value of that load subrange. Suppose for example, that the saturation point determination unit 144 finally finds that the lower end of confidence interval is below the threshold when $n_k = 10$, after failing to do so with $1 < n \leq 9$. The range of load values 0 to 50 has been subdivided into 100 subranges with a step size of 0.5. The tenth load subrange ranges from 4.5 to 5.0, and the subrange start value, 4.5 (=0.5×9), is selected as the saturation point.

As can be seen from the above, the fifth embodiment calculates a statistical confidence interval of slopes while varying the selection of load subranges by successively adding subranges from the lowest ones. When the calculated confidence interval falls below a predetermined threshold at its lower end, the load value at that time is selected as the saturation point. This method makes it possible to automatically determine, without being disturbed by local variations of slopes, a saturation point at which the load-throughput relationship exhibits a change.

In contrast, the saturation point calculation of the second embodiment (see FIG. 27) simply tracks the load-throughput curve from the minimum point of load until a change in the slope is found at a certain load value. This method could detect a false change in the slope which is actually a fluctuation caused by non-uniform hardware resource consumption of jobs, which exists even in the same job category. The fifth embodiment of FIG. 40, on the other hand, proposes a saturation point calculation process that calculates a statistical confidence interval of slope values to determine a saturation point on the criterion of whether the confidence interval exceeds a specified threshold at its lower end. This process automatically determines a saturation point at which the load-throughput relationship exhibits a change, without being disturbed by local variations of slopes.

(f) Sixth Embodiment

This section describes a sixth embodiment The sixth embodiment calculates a remaining processing capacity of each tier. This feature enables capacity planning, i.e., estimation of each tier's maximum processing performance. The sixth embodiment may be implemented on a system with the same structure discussed in the second embodiment. Accordingly, the sixth embodiment will be described below with reference to the same components of the second embodiment illustrated in FIG. 6.

The foregoing second embodiment uses a bottleneck isolation method of FIG. 28, which calculates the ratio of non-saturation windows (time windows whose load values is equal to or greater than the saturation point). In those non-saturation windows, the system have some spare capacity in terms of its processing performance. The sixth embodiment more specifically evaluates such spare capacity of a tier, or the ratio of the remaining processing capacity with respect to the system's maximum processing performance.

Figure 41:
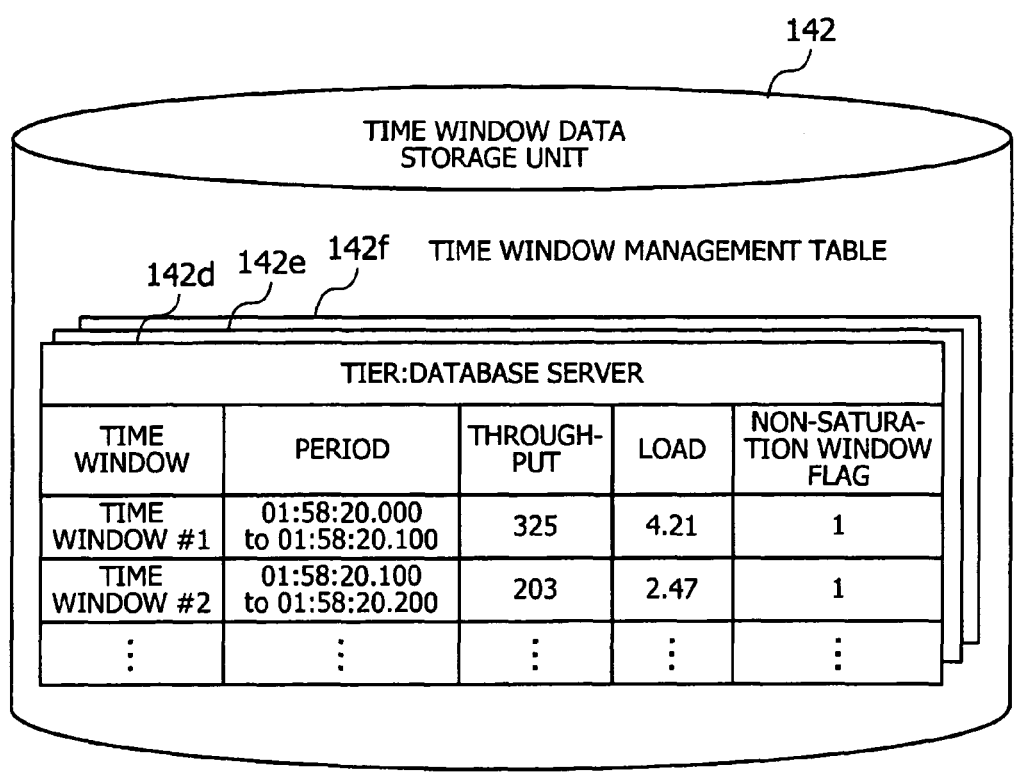
FIG. 41 illustrates an example data structure of a time window data storage unit according to a sixth embodiment.

According to the sixth embodiment, the time window data storage unit 142 is configured to store a flag for each time window to indicate whether it is a non-saturation window. FIG. 41 illustrates an example data structure of a time window data storage unit according to the sixth embodiment. The illustrated time window data storage unit 142 contains a plurality of time window management tables 142d, 142e, and 142f corresponding to different tiers. For example, the time window management table 142d corresponds to the tier to which the database server 400 belongs.

The illustrated time window management table 142d has five data fields titled "Time Window," "Period," "Throughput," "Load," and "Non-Saturation Window Flag."The time window field contains the name of a time window. The period field provides details of the period of that time window. The throughput and load fields respectively contain throughput and load values calculated for the time window. The non-saturation window flag field contains a flag indicating whether the time window is a non-saturation window. This flag is referred to as a "non-saturation window flag." For example, the non-saturation window flag is set to one when its corresponding time window is a non-saturation window. Otherwise, the flag remains zero, which is an initial value of non-saturation window flags.

By using the above time window management tables 142d, 142e, and 142f, the analyzing unit 145 calculates a spare capacity of the server of each tier. For example, the analyzing unit 145 executes a spare capacity calculation process in place of the bottleneck isolation process (step S124) in the flowchart of FIG. 16 discussed in the second embodiment. Or alternatively, the analyzing unit 145 may execute a spare capacity calculation process in addition to the bottleneck isolation of step S124.

Figure 42:
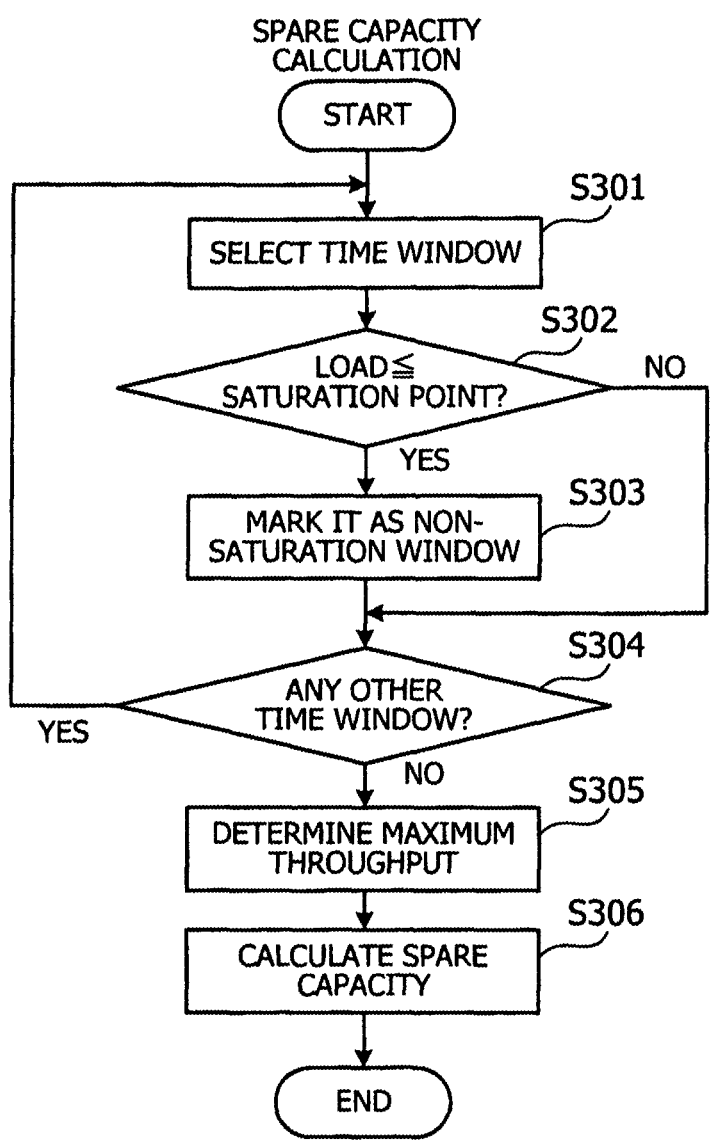
FIG. 42 is a flowchart illustrating an example procedure of spare capacity calculation.

FIG. 42 is a flowchart illustrating an example procedure of spare capacity calculation. Each step of FIG. 42 is described below in the order of step numbers.

(Step S301) The analyzing unit 145 selects one of the time windows of the tier under analysis. For example, the analyzing unit 145 consults one of the time window management tables 142d, 142e, and 142f which corresponds to the tier under analysis and selects time windows one by one, starting with its topmost table entry.

(Step S302) The analyzing unit 145 compares the load value in the selected time window with the saturation point. Specifically, the above-noted time window management table has an entry corresponding to the selected time window. The analyzing unit 145 compares the load value in this entry with the saturation point determined by the saturation point determination unit 144. If the load value is equal to or smaller than the saturation point, the analyzing unit 145 advances to step S303. If the load value is greater than the saturation point, the analyzing unit 145 skips to step S304.

(Step S303) The analyzing unit 145 marks the selected time window as a non-saturation window by setting its non-saturation flag. For example, the analyzing unit 145 enters a value of one to the non-saturation flag field of an entry of the above-noted time window management table which corresponds to the selected time window.

(Step S304) The analyzing unit 145 determines whether there are any other time windows that have not been subjected to the above steps. When such a pending time window is found, the analyzing unit 145 returns to step S301. When no such pending time window is found, the analyzing unit 145 proceeds to step S305.

(Step S305) The analyzing unit 145 determines the maximum throughput of the tier. For example, the analyzing unit 145 examines each time window included in the load subrange starting from the saturation point until the largest throughput value is found in those windows.

(Step S306) The analyzing unit 145 calculates a spare capacity, which is expressed as follows.

[Expression 3]

$$\frac{\sum_{k=1}^{n}(tp_{max}-tp_k)}{tp_{max}\times n}\times\frac{n}{TWnum_{all}} \quad (3)$$

where n is an integer not less than zero which represents the number of non-saturation time windows, $tp_{max}$ is the maximum throughput observed at the saturation point, $tp_k$ represents throughput in the k-th non-saturation time window (k is an integer in the range from 1 to n), and $TWnum_{all}$ is the total number of time windows constituting the given analysis period.

The above expression (3) gives the average ratio of difference between the maximum throughput and each non-saturation window's throughput to the maximum throughput, multiplied by the share of non-saturation windows among the whole series of time windows. This calculation yields a remaining processing capacity of the tier under analysis.

Figure 43:
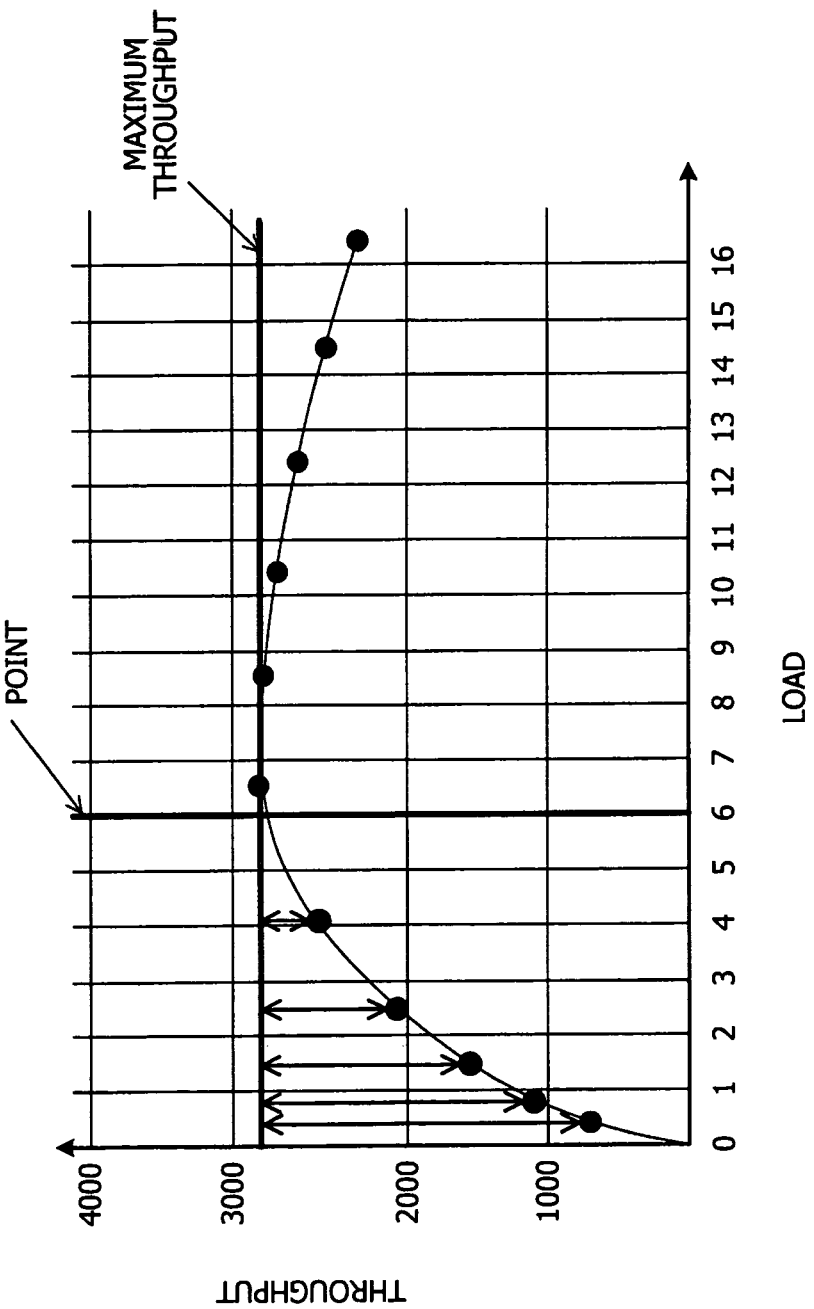
FIG. 43 explains spare capacity calculation.

FIG. 43 explains spare capacity calculation by way of example. For simplicity purposes, the example of FIG. 43 assumes that the total number of time windows is 11 as indicated by the black dots. There are five non-saturation time windows below the saturation point, and the maximum throughput is observed to be 2800. In this case, the above expression (3) gives the following value.

(Sum of differences)/(2800×5)×5/11 where the "differences" are indicated by the bidirectional arrows in FIG. 43. It has to be noted here that the above calculation of spare capacities excludes time windows above the saturation point even though their throughput values are smaller than the maximum throughput. In other words, the calculation domain is divided into two regions by the line at the saturation point, so that the remaining processing capacity with respect to the maximum throughput is calculated only in the region below the saturation point. Referring to the example of FIG. 43, the throughput falls below the maximum throughput in the time windows having a load value of 10 or above. In those time windows, the system is considered to be experiencing a throughput drop due to an excessive workload. Since there is no remaining processing capacity in the system under such overloaded conditions, the calculation rejects these time windows from consideration.

If the whole series of time windows were subjected to the average calculation of differences between maximum throughput and observed throughput, the sum of remaining processing capacities would be disturbed by the false data in a region above the saturation point where the throughput drops due to overload. The sixth embodiment forces the remaining processing capacity to be zero in such time windows, thereby improving the accuracy of spare capacity calculation.

The sixth embodiment also enables estimation of remaining processing performance of a tier which is not fully saturated yet, but in a quasi-saturation state. This features makes it possible to take proactive measures before the system falls into full saturation of performance. The same feature also makes it possible to estimate the amount of extra load that would bring the second weakest tier into a bottleneck after the first tier is saved from its saturation problem by scaling out with additional servers.

(g) Seventh Embodiment

This section describes a seventh embodiment, which automatically determines an optimal length of time windows. The seventh embodiment may be implemented on a system with the same structure discussed in the second embodiment. Accordingly, the seventh embodiment will be described below with reference to the same components of the second embodiment illustrated in FIG. 6.

The foregoing second embodiment normalizes variations in the hardware resource consumption among difference job categories, while it expects that the averaging effect would work for such variations among different jobs within a category. For better averaging effect, it is desired to set a longer interval of time windows because a larger number of jobs can be included in a longer time window. A long interval of time windows, on the other hand, allows a wider variation of load values within a time window, which makes it difficult to achieve accurate measurement of load-throughput relationships. The seventh embodiment thus determines an appropriate time window length, such that the intra-category differences in hardware resource consumption will fall within a tolerable range. This feature is achieved by a method described below.

Specifically, the seventh embodiment is based on the nearly directly proportional relationship between load and throughput in a range where the load is low. The relationship between load and throughput, however, would be disturbed if the window length is too short to average away the intra-category variations in hardware resource consumption of jobs. This fact can be utilized in determining an appropriate time window length that is long enough to average away such variations. For example, the process of this window length selection is executed before step S121 in the tier performance analysis of FIG. 16 discussed in the second embodiment.

Figure 44:
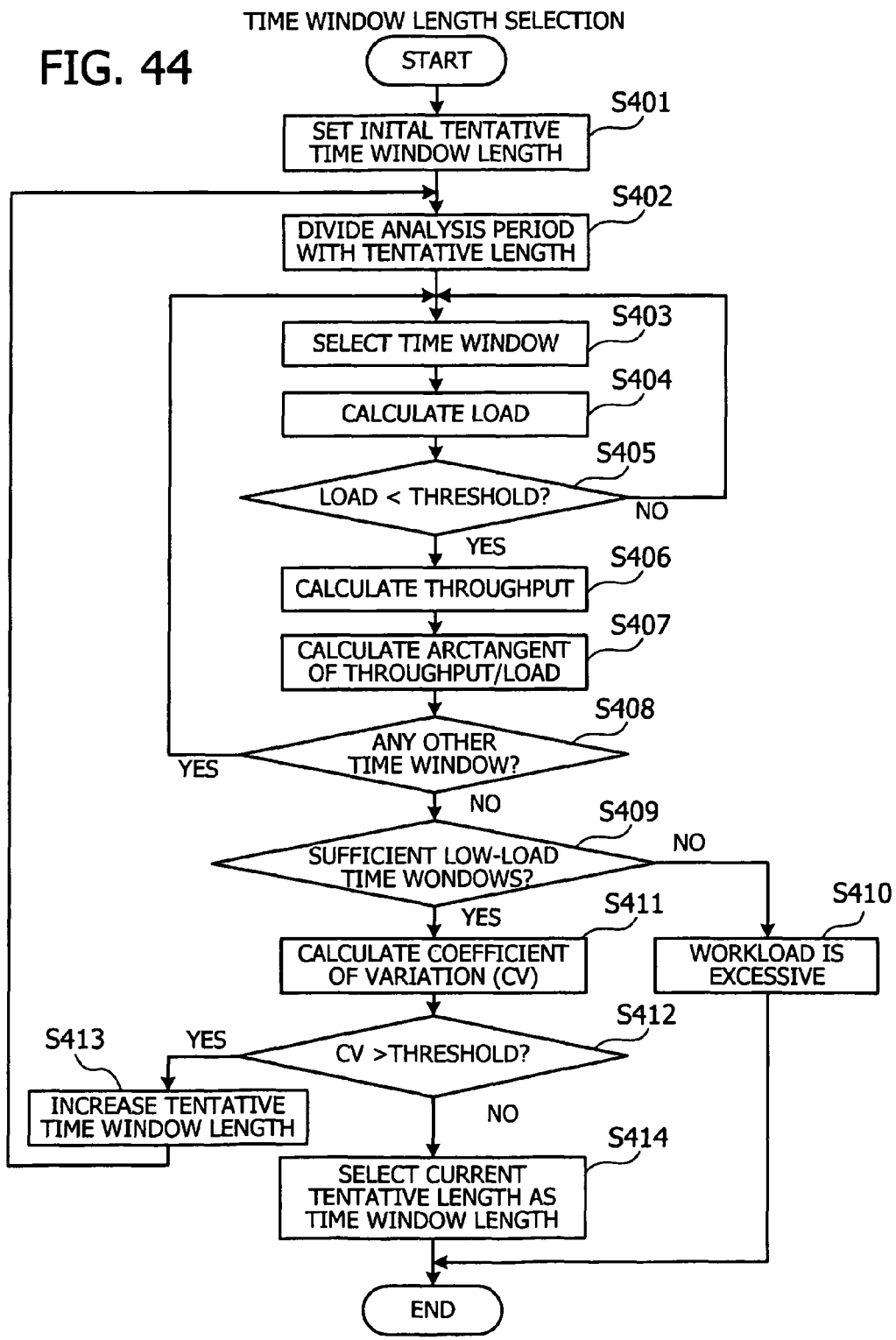
FIG. 44 is a flowchart illustrating an example procedure of window length selection according to a seventh embodiment.

FIG. 44 is a flowchart illustrating an example procedure of window length selection. Each step of FIG. 44 is described below in the order of step numbers.

(Step S401) The data compilation unit 141 sets an initial value of time window length as a tentative time window length. This initial value is supposed to be sufficiently smaller than the expected order of window length. For example, the tentative time window length is set to 10 ms.

(Step S402) The data compilation unit 141 divides a given analysis period into a plurality of time windows each with the tentative time window length.

(Step S403) The data compilation unit 141 selects one of the time windows which have not been subjected to the processing of steps S404 to S407.

(Step S404) The data compilation unit 141 calculates a load value in the selected time window.

(Step S405) The data compilation unit 141 determines whether the calculated load value is smaller than a predetermined threshold. Here the data compilation unit 141 is previously given a threshold of, for example, 0.5 or 1.0. If the load value is smaller than the threshold, the data compilation unit 141 proceeds to step S406. Otherwise, the data compilation unit 141 returns to step S403.

(Step S406) The data compilation unit 141 calculates a throughput value in the selected time window.

(Step S407) Let i be the ordinal number of the time window whose load values has been determined to be smaller than the threshold. For this i-th time window, the data compilation unit 141 calculates an angle $\theta_i$ that is the arctangent of the ratio of throughput to load.

$$\theta_i = \tan^{-1}(tp_i/ld_i)$$

(Step S408) The data compilation unit 141 determines whether there are any other time windows that have not been subjected to the processing of steps S404 to S407. When a pending time window is found, the data compilation unit 141 returns to step S403 to continue the process. When there is no pending process, the data compilation unit 141 proceeds to step S409.

(Step S409) The data compilation unit 141 determines whether there are a sufficient number of time windows whose load values are smaller than the threshold. For example, the data compilation unit 141 evaluates the ratio of such low-load time windows to the whole set of time windows. If the low-load time windows has at least a predetermined ratio, the data compilation unit 141 determines that there are a sufficient number of time windows whose load values are smaller than the threshold, and proceeds to step S411. Otherwise, the data compilation unit 141 proceeds to step S410, determining that the number of low-load time windows is insufficient.

(Step S410) Since the number of low-load time windows is insufficient, the data compilation unit 141 concludes that the load values are too large to determine the time window length, thus terminating the current process of window length selection. When this is the case, the data compilation unit 141 selects a predetermined value (e.g., 100 ms) as the time window length and uses this value in the subsequent processing (i.e., step S121 in FIG. 16). Or alternatively, the data compilation unit 141 may borrow a time window length determined for other tier and uses the borrowed length in the subsequent processing.

(Step S411) The data compilation unit 141 calculates a coefficient of variation (CV) which indicates relative dispersion of a given variable, $\theta_i$ in the present case. Specifically, CV is calculated by dividing the standard deviation of angle $\theta_i$ obtained at step S407 by the mean value of the same. This calculation is expressed as follows.

[Expression 4]

$$CV = \frac{\sqrt{\frac{1}{m-1} \times \sum_{i=1}^{m}\left(\theta_i - \frac{1}{m}\sum_{j=1}^{m}\theta_j\right)^2}}{\frac{1}{m}\sum_{j=1}^{m}\theta_j} \quad (4)$$

where m is the number of time windows which have been allowed to undergo step S406.

(Step S412) The data compilation unit 141 determines whether the coefficient of variation CV is larger than a predetermined threshold (e.g., 0.1). If CV is larger than the threshold, the data compilation unit 141 proceeds to step S413. If not, the data compilation unit 141 proceeds to step S414.

(Step S413) The data compilation unit 141 extends the tentative time window length in a predetermined way. For example, data compilation unit 141 calculates a new tentative time window length by adding 10 ms to the current tentative time window length. The data compilation unit 141 then returns to step S402 to calculate a variation coefficient with the new tentative time window length.

(Step S414) Now that the coefficient of variation has reached the threshold, the data compilation unit 141 selects the current tentative time window length as the time window length.

The above steps make it possible to determine an optimal time window length, based on the knowledge that the throughput simply increases with load (the amount of jobs) in a range where the load is low (e.g., not greater than 1). The proposed method thus measures their correlation only in that low-load range. If the distribution of measurements is within a specified range, the method determines that the resulting time window length is not too short and appropriate enough to smooth out the intra-category variations of jobs in hardware resource consumption. Conversely, if the measurements of load-throughput correlation exhibit a large dispersion, the method takes it as an influence of intra-category variations of jobs in hardware resource consumption, and thus chooses a longer time window.

The seventh embodiment enables automatic setup of time window lengths on the basis of collected data, thus eliminating the need for adjusting time windows before starting the analysis. An inappropriate setup of time windows would lead the analysis to a wrong result. The seventh embodiment prevents this from happening.

(h) Eighth Embodiment

This section describes an eighth embodiment, which extracts, for the purpose of optimization, average processing times in low workload conditions out of the time-series data collected in a given analysis period. The eighth embodiment may be implemented on a system with the same structure discussed in the second embodiment. Accordingly, the eighth embodiment will be described below with reference to the same components of the second embodiment illustrated in FIG. 6.

The second embodiment normalizes throughput values by using average processing times calculated from data that has previously been collected from the system in low workload conditions (see FIG. 23). In contrast, the eighth embodiment extracts average processing times, not from separately collected data, but from the time series data to be subjected to the performance analysis.

Figure 45:
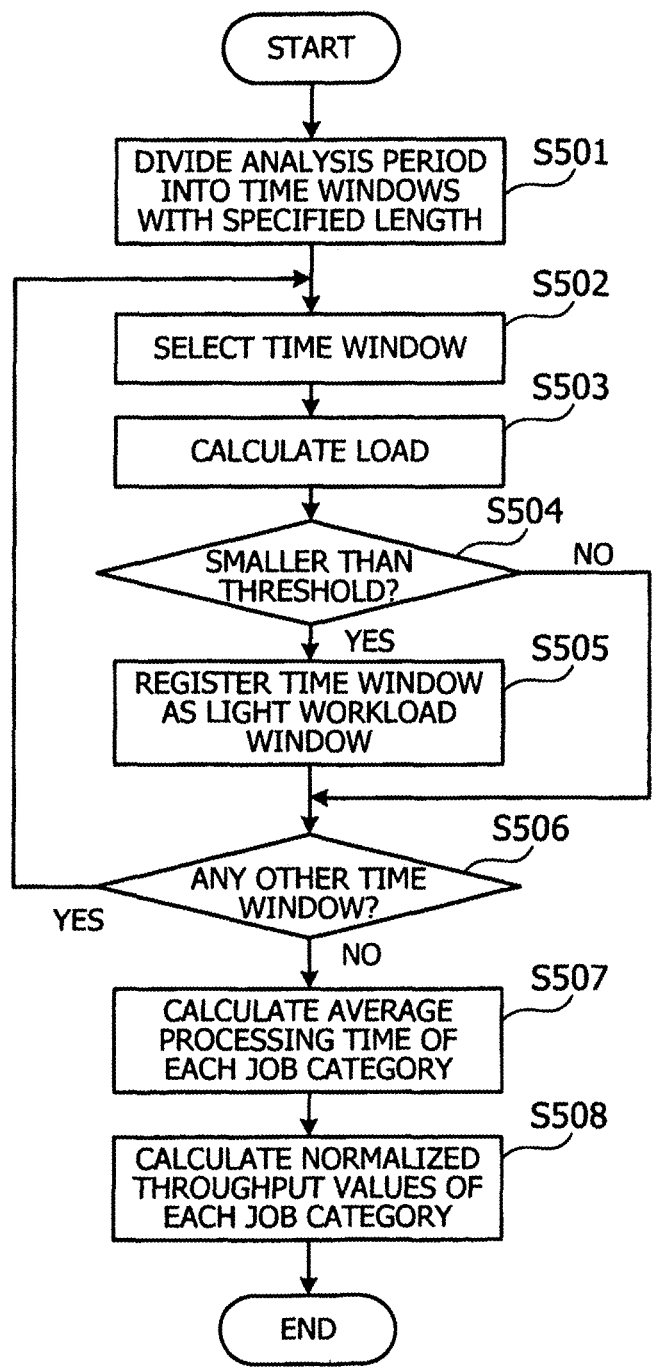
FIG. 45 is a flowchart illustrating an example procedure of average processing time calculation in low workload conditions according to an eighth embodiment.

FIG. 45 is a flowchart illustrating an example procedure of average processing time calculation in low workload conditions. For example, this process is executed after step S113 of FIG. 9 discussed in the second embodiment. Each step of FIG. 45 is described below in the order of step numbers.

(Step S501) The data compilation unit 141 divides a given analysis period into a plurality of time windows each with a specified length.

(Step S502) The data compilation unit 141 selects one of the time windows which have not been subjected to the processing of steps S503 to S505.

(Step S503) The data compilation unit 141 calculates a load value in the selected time window. For example, the data compilation unit 141 first calculates a sum of processing times in the selected time window, for the jobs executed in the tier under analysis. The data compilation unit 141 then divides the sum by the time window length to obtain a load value in the time window.

(Step S504) The data compilation unit 141 determines whether the calculated load value is smaller than a predetermined threshold. Here the data compilation unit 141 is previously given a threshold of, for example, 0.5 or 1.0. If the load value is smaller than the threshold, the data compilation unit 141 proceeds to step S505. Otherwise, the data compilation unit 141 skips to step S506.

(Step S505) The data compilation unit 141 registers the selected time window with a list of low workload windows. For example, this low workload window list is created in RAM 103.

(Step S506) The data compilation unit 141 determines whether there are any other time windows which have not been subjected to the processing of steps S503 to S505. When such a pending time window is found, the data compilation unit 141 returns to step S502. When there is no more pending time window, the data compilation unit 141 proceeds to step S507.

(Step S507) The data compilation unit 141 calculates an average processing time of each job category by using data of jobs executed in the time windows enumerated in the low workload window list. The data compilation unit 141 stores the processing times calculated for different job categories in the normalized throughput value storage unit 143.

(Step S508) The data compilation unit 141 calculates a normalized per-job throughput value of each job category by using relevant average processing times. For details of this calculation of normalized per-job throughput values, refer to the description of the second embodiment. The data compilation unit 141 stores the calculated normalized per-job throughput values in the normalized throughput value storage unit 143.

The process described above may be modified in the case where the throughput is calculated based on the number of output messages as in the foregoing fourth embodiment. In this case, the processing at step S508 is changed such that the data compilation unit 141 calculates normalized per-message throughput values for each job category, instead of calculating normalized per-job throughput values. For details of this calculation method, refer to the description of the fourth embodiment.

Figure 46:
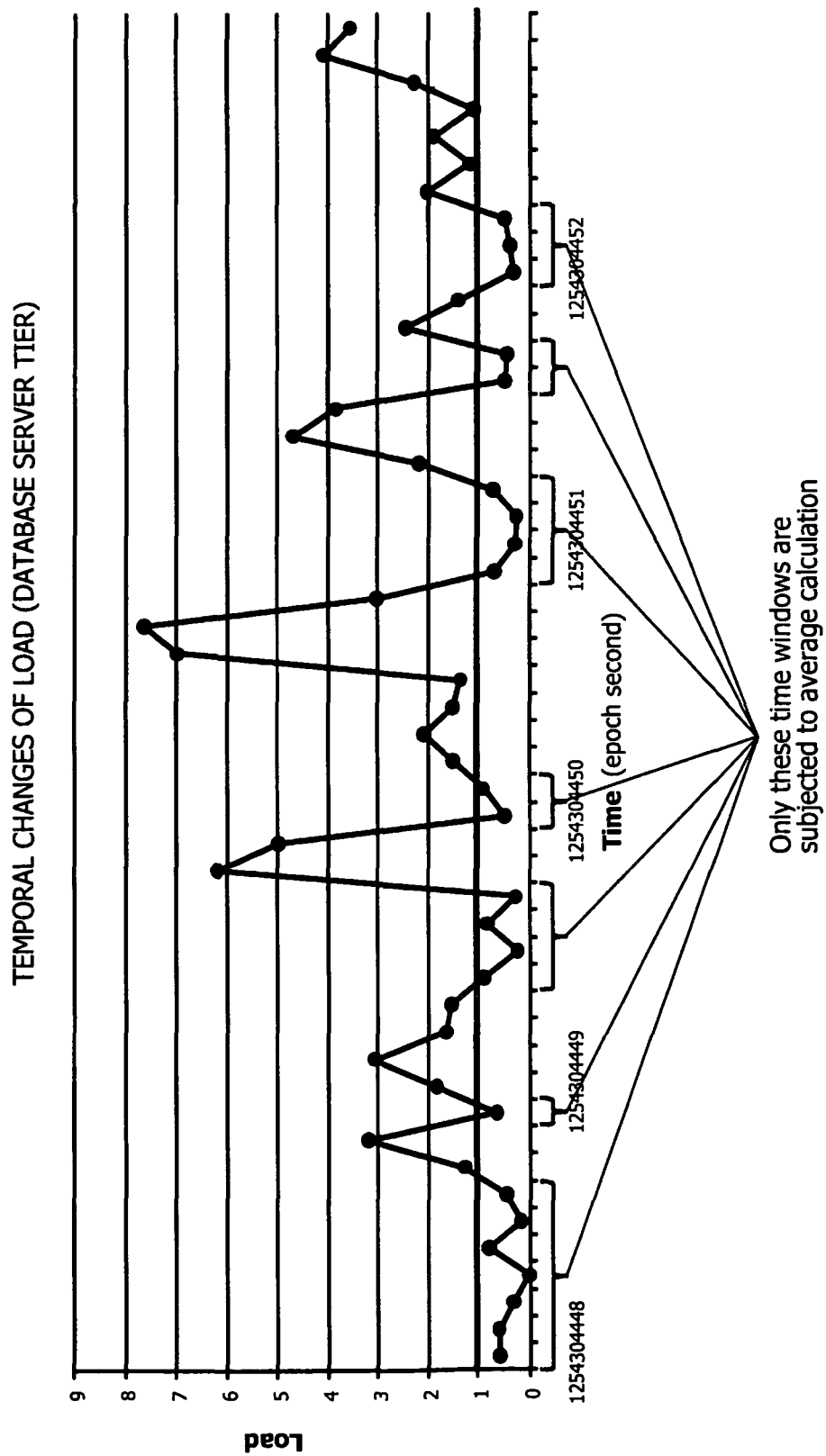
FIG. 46 illustrates an example of time windows extracted as falling below a given threshold.

Average processing times of different job categories are calculated in the above way, on the basis of time series data collected in the analysis period. FIG. 46 illustrates an example of time windows extracted as falling below a given threshold. Here the time-series data is collected in the 5-second analysis period, which is divided into 50 time windows with a length of 0.1 seconds. The example of FIG. 46 includes 23 time windows whose load values are not greater than 1.0, and the jobs included only in those 23 time windows are eligible for the calculation of average processing times of each job category. Since those time windows are lightly loaded and unlikely to experience job-to-job contention, the processing times calculated from data collected in such conditions are considered to be close to the true processing times of jobs.

If the threshold of load values is lowered to 0.5, then the number of eligible time windows drops to 14. With a lower threshold, the calculated average processing times will have a higher accuracy because of the reduced chance of job-to-job contention. With a too low threshold, however, there arises a possibility of missing some job categories because of the reduced number of samples for calculation of their average processing times.

The method proposed in the eighth embodiment method is based on the knowledge that the load values tend to change wildly, and that if a good length of time-series data is collected, the data is likely to contain a reasonable number of samples of low load conditions. The method is also based on the concept that the samples collected from those low-load time windows make it possible to yield nearly ideal average processing times because the reduced chance of job contention The average processing time of each job category is calculated in the above-described way from time series data collected in the analysis period, without the need for the administrator to collect data in low workload conditions only for the purpose normalization. Actually the average processing times of jobs may vary in a dynamic fashion. The proposed method enables the performance analysis to reflect such dynamic characteristics of the system load because all necessary information for the analysis can be extracted from a single set of time series data, rather than from some other data collected previously. The workload of the system in full operation is different from that when the measurement of average response times is conducted for the purpose of normalization. The proposed method prevents the performance analysis from degrading due to such different tendencies of system workload.

(i) Ninth Embodiment

This section will describe a ninth embodiment, which is designed to detect a transient throughput drop. The ninth embodiment may be implemented on a system with the same structure discussed in the second embodiment. Accordingly, the ninth embodiment will be described below with reference to the same components of the second embodiment illustrated in FIG. 6.

Java™ virtual machine on the application server 300 may stop its operation for a very short time due to its full garbage collection, causing an abrupt and considerable drop of throughput in the tier of the application server 300. Such a transient throughput drop can be detected by a procedure described below. This detection process is executed by the analyzing unit 145, for example, in place of the foregoing bottleneck isolation at step S124 of FIG. 16 discussed in the second embodiment. Alternatively, the analyzing unit 145 may be configured to execute both the detection of transient throughput drop described below and the bottleneck isolation of step S124.

Figure 47:
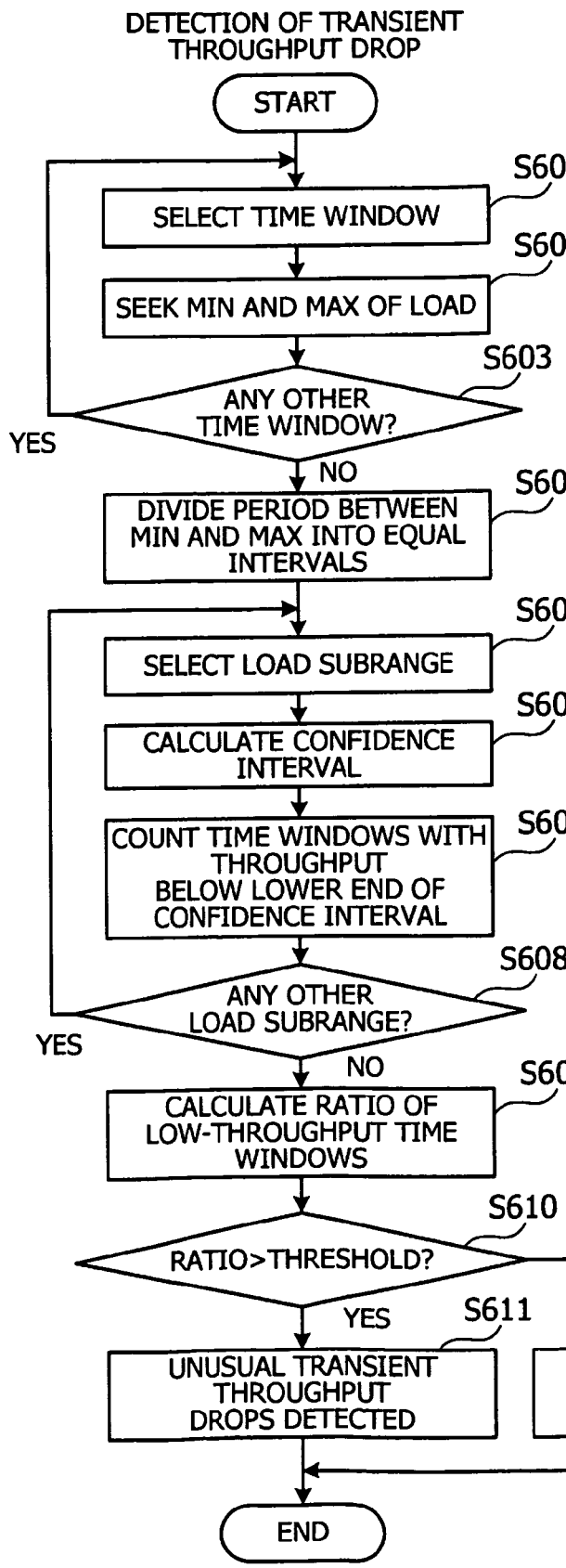
FIG. 47 is a flowchart illustrating an example procedure of transient throughput drop detection according to a ninth embodiment.

FIG. 47 is a flowchart illustrating an example procedure of transient throughput drop detection. Each step of FIG. 47 is described below in the order of step numbers.

(Step S601) The analyzing unit 145 selects a time window. For example, the analyzing unit 145 selects time windows one by one, starting with the topmost entry of a time window management table (see FIG. 22) of the tier under analysis.

(Step S602) The saturation point determination unit 144 seeks the minimum and maximum load values in the selected time window.

(Step S603) The analyzing unit 145 determines whether there are any other time windows which have not been subjected to the processing of step S602. When such a pending time window is found, the analyzing unit 145 returns to step S601. When no such pending time window is found, the analyzing unit 145 advances to step S604.

(Step S604) The analyzing unit 145 subdivides the range between the extracted minimum value and maximum value into equal intervals. For example, the analyzing unit 145 subdivides this minimum-to-maximum range into a predetermined number (e.g., 100) of subranges, or into a variable number of fixed-length intervals (e.g., 0.1). In the case where the load values are distributed as in the scatter plot of FIG. 26, the range of 0 to 50 is divided into 100 subranges with the step size of 0.5 (neglecting load values over 50 for simplicity of explanation). The resulting subranges are referred to as "load subranges."

(Step S605) The analyzing unit 145 selects one of the load subranges which has not been subjected to the processing of steps S606 to S607.

(Step S606) The analyzing unit 145 calculates a statistical confidence interval of throughput values. For example, the analyzing unit 145 calculates the average and standard deviation of throughput values in all time windows whose load values fall within the selected load subrange, and obtains a confidence interval expressed as follows, assuming a confidence level of 95%.

[Expression 5]

$$\frac{1}{n} \times \sum_{i=1}^{n} tp_i \pm 1.96 \times \sqrt{\frac{1}{n-1} \times \sum_{i=1}^{n} \left(tp_i - \frac{1}{n}\sum_{j=1}^{n} tp_j\right)^2} \quad (5)$$

where the value "1.96" is a constant for the 95% confidence level.

(Step S607) The analyzing unit 145 counts the number of time windows whose throughput values are smaller than the lower end of the confidence interval.

(Step S608) The analyzing unit 145 determines whether there are any other load subranges which have not been subjected to the processing of steps S606 to S607. When such a pending load subrange is found, the analyzing unit 145 returns to step S605. When no such pending time window is found, the analyzing unit 145 proceeds to step S609.

(Step S609) The analyzing unit 145 calculates the ratio of the number of time windows counted at step S607 to the total number of time windows. In the case of a 95% confidence interval (i.e., when the confidence interval is calculated at the 95% confidence level), the analyzing unit 145 calculates the ratio of time windows having smaller throughput values outside the 95% confidence interval.

(Step S610) The analyzing unit 145 determines whether the ratio calculated at step S609 is greater than a given threshold. Here the threshold is previously determined as a value that is larger than the statistical probability that throughput values in time windows may fall below the lower end of the confidence interval. For example, the threshold is set to 5% in the case of 95% confidence interval, since the noted statistical probability amounts to 2.5% with that confidence interval. If the calculated ratio of low-throughput time windows exceeds this threshold, the analyzing unit 145 advances to step S611. If does not, the analyzing unit 145 advances to step S612.

(Step S611) The analyzing unit 145 determines that the tier under analysis is experiencing unusual transient throughput drops. The analyzing unit 145 outputs this determination result to, for example, a screen of the monitor 11 and then exits from this process of transient throughput drop detection.

(Step S612) The analyzing unit 145 determines that there are no unusual transient throughput drops. The analyzing unit 145 outputs this determination result to, for example, a screen of the monitor 11 and then exits from this process of transient throughput drop detection.

The above steps permit the analyzing unit 145 to detect an unusual transient throughput drop in a tier by calculating the ratio of time windows having low throughput values below the confidence interval and testing whether it exceeds a predetermined threshold. For example, this detection processing detects a transient throughput drop in the application server 300 which happens regardless of load values as in the case of a full garbage collection process invoked by Java™ VM.

Figure 48:
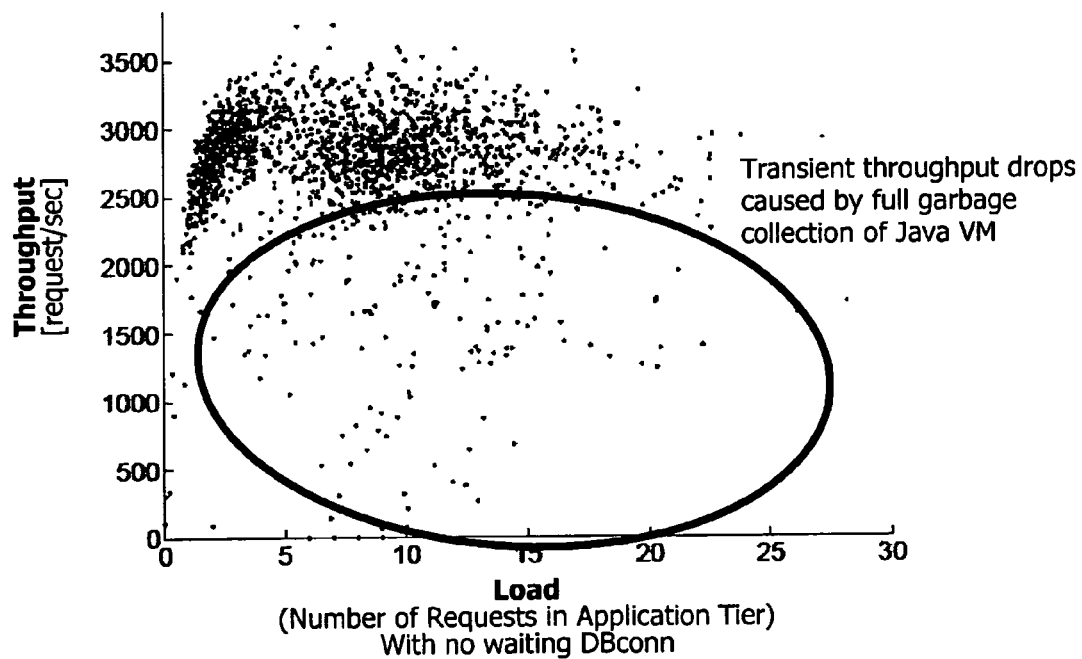
FIG. 48 is an example scatter plot illustrating where unusual transient throughput drops are detected according to the ninth embodiment.

FIG. 48 is an example scatter plot illustrating where unusual transient throughput drops are detected according to the ninth embodiment. The scatter plot of FIG. 48 indicates unusual transient throughput drops produced as a result of full garbage collection of Java™ VM or other events. The above-described method easily detects such throughput drops.

The ninth embodiment works more effectively when it is combined with the fourth embodiment. As demonstrated in FIGS. 38 and 39, the fourth embodiment makes transient throughput drops more apparent in the load-throughput plots. Now that those throughput drops are fully manifest in the source data, the ninth embodiment can detect them in a mechanical manner.

(j) Other Embodiments

As discussed in earlier sections, the second embodiment captures IP packets flowing over the network and reconstructs protocol messages from those packets. Reconstruction of messages, however, is not limited by this specific method. For example, messages can be reconstructed from log records of jobs executed by each server in the multi-tier system.

It is noted, however, that the method based on captured IP packets is advantageous in terms of being free from problems of inaccuracy of computers' internal clocks. It is difficult to synchronize the clocks in different servers constituting a multi-tier system, and a certain amount of error is inevitable. However, the ability of determining precise timings of messages transmitted from different servers is important in the reproduction of a message flow from received packets. The reproducibility of message flows depends on the accuracy and consistency of time bases used to capture data. In the case of a method that uses log records of individual servers on the tiers, their time stamps have to be accurate and consistent since they otherwise would make it difficult to sort the different servers' log records in the temporal order. By contrast, the above-noted method captures IP packets at a single device, which enables determination of the temporal order of transmitted packets and is thus capable of reproducing messages correctly.

The method based on captured IP packets is also advantageous in terms of storage and transport of source data for the analysis. This is unlike the server log-based method which has to store log data in each server constituting a multi-tier system and transport the stored log data from those servers to an analyzer apparatus. The former method, on the other hand, neither needs to store log data in the servers nor produces extra packet traffic on the network.

The functions of the embodiments described above are implemented on a computer. In this implementation, the instructions describing the functions of an information processing apparatus 1 or analysis server 100 are encoded in and provided as a computer program(s). A computer system executes the program to provide the processing functions discussed in the preceding sections. The program may be encoded in a computer-readable, non-transitory medium. Such computer-readable, non-transitory media include magnetic storage devices, optical discs, magneto-optical storage media, semiconductor memory devices, and other tangible storage media. Magnetic storage devices include hard disk drives (HDD), flexible disks (FD), and magnetic tapes, for example. Optical disc media include DVD, DVD-RAM, CD-ROM, CD-RW and others. Magneto-optical storage media include magneto-optical discs (MO), for example.

Portable storage media, such as DVD and CD-ROM, may be used for distribution of program products. Network-based distribution of software programs may also be possible, in which case several master program files are made available on a server computer for downloading to other computers via a network.

A computer stores necessary software components in its local storage unit, which have previously been installed from a portable storage medium or downloaded from a server computer. The computer executes programs read out of the local storage unit, thereby performing the programmed functions. Where appropriate, the computer may execute program codes read out of a portable storage medium, without installing them in its local storage device. Another alternative method is that the computer dynamically downloads programs from a server computer when they are demanded and executes them upon delivery.

The processing functions discussed in the preceding sections may also be implemented wholly or partly by using a digital signal processor (DSP), application-specific integrated circuit (ASIC), programmable logic device (PLD), or other electronic circuit.

The above sections have exemplified several embodiments and their variations. The described components may be replaced with other components having equivalent functions or may include other components or processing operations. Where appropriate, two or more components and features provided in the embodiments may be combined in a different way. It is noted, however, that either the second embodiment or the fourth embodiment is to be chosen for the method of calculating throughput values. It is also noted that either the second embodiment or the fifth embodiment is to be chosen for the method of determining a saturation point.

The techniques discussed in the above-described embodiments enable evaluation of how much spare capacity remains in a device under analysis in terms of processing performance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A computer-readable, non-transitory medium storing a program that causes a computer to execute a procedure comprising:

retrieving data from a storage unit which indicates processing periods of processes executed by a target apparatus during a plurality of time windows constituting an analysis period;

calculating, based on the retrieved data, a total processing time for each time window by adding up processing times spent for execution of the processes in said each time window;

calculating, based on the retrieved data, a total progress quantity for each time window by adding up progress quantities of the processes executed in said each time window, the progress quantity of a process executed in a time window being calculated as a ratio of a portion of the process that is executed in the time window to the entire process invoked in response to a processing request therefor, the ratio being weighted according to a processing time, in low workload conditions, of a process category to which the executed process belongs;

determining, based on the total processing time and total progress quantity of each time window, a threshold of the total processing times at which a ratio of an increase of the total progress quantity to an increase of the total processing time is equal to or smaller than a predetermined value;

detecting time windows whose total processing times are equal to or longer than the threshold;

calculating a ratio of the time windows whose total processing times are equal to or longer than the threshold to a whole set of the time windows;

determining that a maximum processing capacity of the target apparatus has been reached in the analysis period, when the calculated ratio is equal to or greater than a predetermined value; and upon determining that the maximum processing capacity of the target apparatus has been reached in the analysis period, scaling out with additional servers before the target apparatus falls into full saturation of performance.

2. The computer-readable, non-transitory medium according to claim 1, wherein the calculating of the total processing time and the calculating of the total progress quantity exclude a topmost execution period of a process from the processing time of the process, when that process includes transmission of a processing request to other apparatus.

3. The computer-readable, non-transitory medium according to claim 1, the procedure further comprising:

obtaining a minimum value and a maximum value among the total processing times in each time window, and dividing a range between the minimum value and the maximum value into a plurality of subranges of the total processing times;

calculating, for each subrange, an average processing time and an average progress quantity by averaging the total processing times and total progress quantities in the time windows whose total processing times fall within said each subrange;

calculating, for each two adjacent subranges, a slope representing an increase of the average progress quantity with respect to an increase of the average processing time; and determining the threshold based on the slope in each two adjacent subranges.

4. The computer-readable, non-transitory medium according to claim 1, the procedure further comprising:

obtaining a minimum value and a maximum value among the total processing times in each time window, and dividing a range between the minimum value and the maximum value into a plurality of subranges of the total processing times;

calculating, for each subrange, respective averages of the total processing times and total progress quantities in the time windows whose total processing times fall within said each subrange, and calculating a slope from the averages of the total processing times and total progress quantities;

calculating repetitively a statistical confidence interval of the slopes calculated for a set of subranges while expanding the set of subranges by adding thereto a new subrange selected in ascending order of the total processing time, until the lower end of the calculated statistical confidence interval falls below a predetermined value; and selecting the total processing time of the last-added subrange as the threshold.

5. The computer-readable, non-transitory medium according to claim 1, the procedure further comprising:

evaluating a spare capacity of the target apparatus as a sum of differences between a maximum total process progress quantity and the total progress quantity in each time window whose total processing time is shorter than the threshold.

6. The computer-readable, non-transitory medium according to claim 1, the procedure further comprising:

dividing the analysis period into a plurality of time windows each having a length determined as the shortest possible time window length which makes variations of a variable indicating relationships between the total processing time and total progress quantity in selected time windows fall below a predetermined limit, the selected time windows being selected as having a total processing time shorter than a predetermined value.

7. The computer-readable, non-transitory medium according to claim 1, the procedure further comprising:

extracting time windows whose total processing times are equal to or shorter than a predetermined value;

calculating an average processing time of each process category, from the data of processes executed in the extracted time windows; and determining a weight of the ratio representing the progress quantity of a process, according to the average processing time calculated for the process category to which the process belongs.

8. The computer-readable, non-transitory medium according to claim 1, the procedure further comprising:

determining minimum and maximum values of the total processing time calculated for the plurality of time windows and dividing a range between the minimum value and the maximum value into a plurality of subranges;

calculating, for each subrange, a statistical confidence interval of a distribution of the total progress quantities in the time windows whose total processing times fall in that subrange;

calculating a ratio of the time windows whose total progress quantities are equal to or smaller than the lower end of the statistical confidence interval, with respect to a whole series of the time windows; and determining, when the calculated ratio exceeds a threshold, that the target apparatus has encountered a transient performance drop during the analysis period.

9. A method executed by a computer to perform an analysis, the method comprising:

retrieving data from a storage unit which indicates processing periods of processes executed by a target apparatus during a plurality of time windows constituting an analysis period;

calculating, executed by a processor, based on the retrieved data, a total processing time for each time window by adding up processing times spent for execution of the processes in said each time window;

calculating, executed by the processor, based on the retrieved data, a total progress quantity for each time window by adding up progress quantities of the processes executed in said each time window, the progress quantity of a process executed in a time window being calculated as a ratio of a portion of the process that is executed in the time window to the entire process invoked in response to a processing request therefor, the ratio being weighted according to a processing time, in low workload conditions, of a process category to which the executed process belongs;

determining, executed by the processor, based on the total processing time and total progress quantity of each time window, a threshold of the total processing times at which a ratio of an increase of the total progress quantity to an increase of the total processing time is equal to or smaller than a predetermined value;

detecting, executed by the processor, time windows whose total processing times are equal to or longer than the threshold;

calculating, executed by the processor, a ratio of the time windows whose total processing times are equal to or longer than the threshold to a whole set of the time windows;

determining, executed by the processor, that a maximum processing capacity of the target apparatus has been reached in the analysis period, when the calculated ratio is equal to or greater than a predetermined value; and upon determining that the maximum processing capacity of the target apparatus has been reached in the analysis period, scaling out with additional servers before the target apparatus falls into full saturation of performance.

10. An information processing apparatus comprising:
a processor configured to perform a procedure include:
retrieving data from a storage unit which indicates processing periods of processes executed by a target apparatus during a plurality of time windows constituting an analysis period;

calculating, based on the received data, a total processing time for each time window by adding up processing times spent for execution of the processes in said each time window;

calculating, based on the received data, a total progress quantity for each time window by adding up progress quantities of the processes executed in said each time window, the progress quantity of a process executed in a time window being calculated as a ratio of a portion of the process that is executed in the time window to the entire process invoked in response to a processing request therefor, the ratio being weighted according to a processing time, in low workload conditions, of a process category to which the executed process belongs;

determining, based on the total processing time and total progress quantity of each time window, a threshold of the total processing times at which a ratio of an increase of the total progress quantity to an increase of the total processing time is equal to or smaller than a predetermined value; and detecting time windows whose total processing times are equal to or longer than the threshold;

calculating a ratio of the time windows whose total processing times are equal to or longer than the threshold to a whole set of the time windows;

determining that a maximum processing capacity of the target apparatus has been reached in the analysis period, when the calculated ratio is equal to or greater than a predetermined value; and upon determining that the maximum processing capacity of the target apparatus has been reached in the analysis period, scalinq out with additional servers before the target apparatus falls into full saturation of performance.

* * * * *